US011875016B2

(12) United States Patent
Ryan et al.

(10) Patent No.: US 11,875,016 B2
(45) Date of Patent: Jan. 16, 2024

(54) DEVICES, METHODS, AND GRAPHICAL USER INTERFACES FOR DISPLAYING MEDIA ITEMS SHARED FROM DISTINCT APPLICATIONS

(71) Applicant: Apple Inc., Cupertino, CA (US)

(72) Inventors: Nicole R. Ryan, San Francisco, CA (US); Chia Yang Lin, San Francisco, CA (US); Graham R. Clarke, Scotts Valley, CA (US); Aaron Moring, Fremont, CA (US); William A. Sorrentino, III, Mill Valley, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/745,788

(22) Filed: May 16, 2022

(65) Prior Publication Data
US 2022/0365638 A1    Nov. 17, 2022

Related U.S. Application Data

(60) Provisional application No. 63/189,648, filed on May 17, 2021.

(51) Int. Cl.
G06F 3/0482         (2013.01)
G06F 3/04817        (2022.01)

(52) U.S. Cl.
CPC ........ G06F 3/0482 (2013.01); G06F 3/04817 (2013.01)

(58) Field of Classification Search
CPC ............... G06F 3/0482; G06F 3/04817; G06F 3/04842; G06F 3/0488
See application file for complete search history.

(56) References Cited

U.S. PATENT DOCUMENTS 8,805,406 B1 *   8/2014  Casaburi ............... H04W 4/21
                                                  455/456.1
10,129,573 B1   11/2018  Sahasrabudhe et al.
(Continued)

FOREIGN PATENT DOCUMENTS

WO    WO 2019/217009 A1    11/2019

OTHER PUBLICATIONS

Notice of Allowance, dated Dec. 2, 2022, received in U.S. Appl. No. 17/481,206, 5 pages.
(Continued)

*Primary Examiner* — Cao H Nguyen
(74) *Attorney, Agent, or Firm* — Morgan, Lewis & Bockius LLP

(57) ABSTRACT

A computer system receives, by a first application, a plurality of shared media items and receives a request to display a view of a media application that includes the media library that includes a first plurality of media items. The computer system displays a collection of media items in the media application that are selected based on first criteria. Displaying the collection of media items includes displaying a second plurality of media items selected from the media library based on the first criteria. In accordance with a determination that a first shared media item from a set of one or media items that have not been added to the media library meets display criteria, the display criteria including the first criteria, displaying the first shared media item in the collection of media items concurrently with the second plurality of media items.

58 Claims, 47 Drawing Sheets

(56) References Cited

U.S. PATENT DOCUMENTS

| | | |
|---|---|---|
| 10,476,827 B2 | 11/2019 | Lieb et al. |
| 2005/0266835 A1 | 12/2005 | Agrawal et al. |
| 2008/0165153 A1 | 7/2008 | Platzer et al. |
| 2013/0318207 A1 | 11/2013 | Dotter |
| 2014/0040742 A1 | 2/2014 | Park et al. |
| 2014/0181842 A1 | 6/2014 | Kim et al. |
| 2014/0282263 A1 | 9/2014 | Pennington et al. |
| 2014/0365919 A1 | 12/2014 | Shaw et al. |
| 2015/0067534 A1 | 3/2015 | Choi et al. |
| 2015/0081791 A1 | 3/2015 | Jacobs |
| 2015/0172250 A1 | 6/2015 | Sharma et al. |
| 2016/0057576 A1 | 2/2016 | Kessler et al. |
| 2016/0063276 A1 | 3/2016 | Pycock |
| 2016/0357752 A1 | 12/2016 | Jon et al. |
| 2017/0286614 A1 | 10/2017 | Morris et al. |
| 2018/0124129 A1 | 5/2018 | Geisler et al. |
| 2018/0270180 A1 | 9/2018 | Chen |
| 2018/0332086 A1 | 11/2018 | De Napoli Ferreira et al. |
| 2018/0337918 A1 | 11/2018 | Chang et al. |
| 2019/0073102 A1* | 3/2019 | Shaw .................... G06F 3/0488 |
| 2019/0146995 A1 | 5/2019 | Lewis et al. |
| 2019/0339822 A1* | 11/2019 | Devine .................. G06V 40/16 |
| 2019/0394276 A1 | 12/2019 | Dachille et al. |
| 2020/0106610 A1* | 4/2020 | Doddavula ............. H04L 63/12 |
| 2020/0133478 A1 | 4/2020 | Chaudhri et al. |
| 2020/0204647 A1 | 6/2020 | Forster |
| 2020/0217009 A1 | 7/2020 | Luo et al. |
| 2020/0288194 A1 | 9/2020 | Lewis et al. |
| 2022/0365666 A1 | 11/2022 | Weskamp et al. |
| 2022/0365831 A1 | 11/2022 | Weskamp et al. |
| 2023/0133548 A1 | 5/2023 | Weskamp et al. |

OTHER PUBLICATIONS

International Search Report and Written Opinion, dated Nov. 9, 2022, received in International Patent Application No. PCT/US2022/029664, 36 pages.

International Search Report and Written Opinion, dated Nov. 14, 2022, received in International Patent Application No. PCT/US2022/028574, which corresponds with U.S. Appl. No. 17/745,788, 31 pages.

Anoymous, "Dispatcher Phoenix Sample Workflows", https://web.archive.org/web/20210117061328/https://sec.kmbs.us/version2/products/dppe/samples.html, Jan. 17, 2021, 18 pages.

Guinness, "What Do the Little Checkmarks in WhatApp Mean?", http://web.archive.org/web/20201202104027/https://www.howtogeek.com/284629/what-do-the-little-checkmarks-in-whatsapp-mean, Dec. 14, 2016, 5 pages.

Hardwick, "How to Stop WhatsApp Auto-Saving Images and Video to Your iPhone's Camera Roll", https://www.macrumors.com/how-to-stop-Whatsapp-saving-images-in-iphone-camera-roll, Jun. 22, 2018, 18 pages.

Krose, "Chatapp Telegram photos and videos are not showin the Google photo gallerty. (Or other gallery apps)", https://support.google.com/photos/thread/10416012/chatapp-telegram-photos-and-videos-are-not-shownin-the-google-photo-gallery-or-other-gallery-apps?, Jan. 20, 2020, 4 pages.

Lloyd, "WikiHow.com How to Delete Photoes on Facebook Messenger", https://web.archive.org/web/20200919045804/https.//www.wikihow.tech/Delete-Photos-on-Facebook-Messenger, Jul. 8, 2018, 32 pages.

Tibbetts, "Allow or Deny App Access to Documents, Pictures, and Video Folders in Windows 10", https://web.archive.org/web/20210210105818/https://www.majorgeeks.com/com/content/page/allow_or_deny_app_access_to_documents_pictures_and_video_folder_in_windows_10, Jan. 3, 2020, 3 pages.

Tillman, "What is Apple Shared with You and How Does it Work in Apps?", https://www.pocket-lint.com/apps/news/apple/157265-what-is-apple-shared-with-you-and-how-does-it-work-in-apps, Sep. 21, 2022, 25 pages.

Office Action, dated Oct. 3, 2022, received in U.S. Appl. No. 17/481,212, 33 pages.

Invitation to Pay Additional Fees, dated Aug. 8, 2022, received in International Patent Application No. PCT/US2022/028574, which corresponds with U.S. Appl. No. 17/745,788, 22 pages.

Bosnjak, "A New "Activity" Tab Appears in the YouTube Android App", https://www.androidheadlines.com/2017/10/a-new-activity-tab-appears-in-the-YouTube-android_app.html, Oct. 5, 2022, 9 pages.

Bray, "Google Drive: Shared with Me", https://www.youtube.com/watch?v=ENnCIZn9fxw, Apr. 7, 2016, 3 pages.

Northville Tech, "Save WhatsApp Photos to iPhone Camera Roll", https://youtube.GLOiejvnvRI?t=61, Feb. 6, 2020, 3 pages.

Youtube, "NEW Youtube Messaging Feature—Share Videos with Friends", https://www.youtube.com/watch?v=3s90jN6iVJ8, May 26, 2018, 3 pages.

Office Action, dated Jan. 21, 2022, received in U.S. Appl. No. 17/481,206, 66 pages.

Final Office Action, dated May 10, 2022, received in U.S. Appl. No. 17/481,206, 74 pages.

Albers, "Method and Apparatus Maintaining a To_Be_Visited Site Bookmark File", U.S. Application No. 2002/0107946, filed on Aug. 8, 2002, 15 pages.

Mobitrix.com: 4 Easy Ways to Save Photos from WhatsApp, (https://web.archive.org/web/20210508020734//www.mobitrix.com/whatsapp/how-to-save-photos-from-whatsapp.html), May 8, 2021, 7 pages.

Mobiletrans.wondershare.com: How to save Whatsapp Photos on Android: A Complete Guide., https://web.archive.org/web20201115134750/https://mobiletrans.wondershar.com/whatsapp/how-to-save-whatsapp-photos-on-android.html, Nov. 15, 2020, 9 pages.

Final Office Action, dated Mar. 23, 2023, received in U.S. Appl. No. 17/481,212, 36 pages.

Office Action, dated May 25, 2023, received in U.S. Appl. No. 18/089,404, 35 pages.

U.S. Appl. No. 10/019,136 B1, filed Jul. 10, 2018, Ozog.

Notice of Allowance, dated Nov. 15, 2023, received in U.S. Appl. No. 17/481,212 (7824), 10 pages.

* cited by examiner

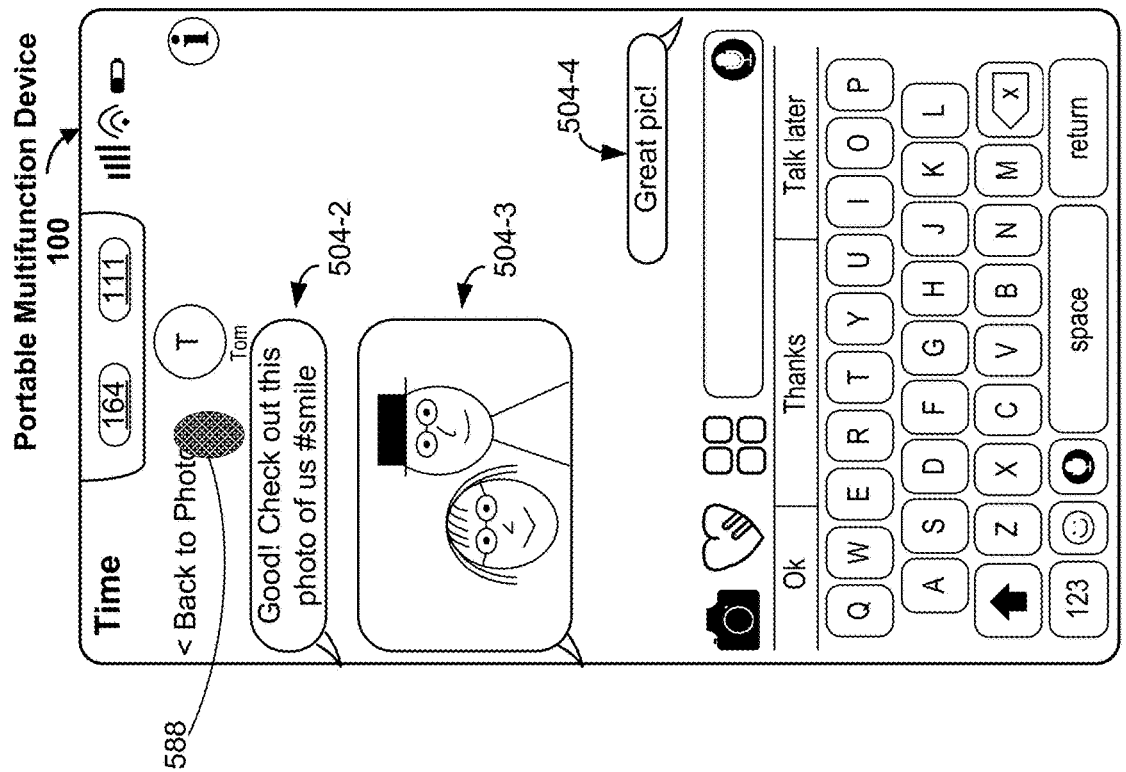

712 Displaying the first shared media item that is visually distinguished from the second plurality of media items comprises displaying the first shared media item with changed appearance of at least a portion of a border region of the first shared media item.

714 Displaying the first shared media item that is visually distinguished from the second plurality of media items comprises displaying the first shared media item with a content obscuring effect applied to at least a portion of the first shared media item.

716 Displaying the first shared media item that is visually distinguished from the second plurality of media items comprises displaying the first shared media item with a graphical element that is overlaid on at least a portion of the first shared media item.

718 Receive a sequence of one or more user inputs including a user input selecting a media item in the displayed collection of media items.
In response to receiving the sequence of one or more user inputs, displaying an enlarged representation of the media item and a plurality of controls for performing operations associated with the media item, wherein:
    in accordance with a determination that the media item is a media item in the second plurality of media items selected from the media library, the plurality of controls displayed with the enlarged representation of the media item include a first set of controls; and
    in accordance with a determination that the media item is a shared media item from the set of one or more media items that have not been added to the media library, the plurality of controls displayed with the enlarged representation of the media item include a second set of controls distinct from the first set of controls.

720 The first set of controls includes a control for marking the media item as a favorite and/or a control for deleting the media item.

Figure 7B (B)

722 The second set of controls includes an indication that the selected media item is a shared media item.

723 While displaying the enlarged representation of the media item and the plurality of controls for interacting with the media item, receive an input selecting the control for adding the media item to the media library. In response to receiving the input selecting the control for adding the media item to the media library, add the media item to the media library and cease to display the indication that the selected media item is a shared media item.

724 The second set of controls includes a control for adding the media item to the media library.

726 While displaying the enlarged representation of the media item and the plurality of controls for interacting with the media item, receive an input selecting the control for adding the media item to the media library. In response to receiving the input selecting the control for adding the media item to the media library, add the media item to the media library.

727 Cease display of one or more controls for performing operations associated with the media item that were displayed prior to receiving the input selecting the control for adding the media item to the library.

728 Cease display of the control for adding the media item to the media library.

729 Display one or more controls for performing operations associated with the media item in the media library that were not displayed prior to receiving the input selecting the control for adding the media item to the library.

732 Display, concurrently with the enlarged representation of the media item, information about a source of the media item.

734 While concurrently displaying the enlarged representation of the media item and the information about a source of the media item, detect an input directed to a selectable user interface object that includes the information about the source of the media item. In response to detecting an input directed to the selectable user interface object that includes the information about the source of the media item, initiate a process for displaying, in the communication application, a communication history for a conversation that the shared item was shared.

Ⓒ

736 The media application includes a plurality of sections. While displaying a first section of the plurality of sections of the media application, automatically display the first shared media item in the first section of the plurality of sections of the media application.

738 In response to a user input requesting to display the plurality of shared media items, display the set of one or more media items that have not been added to the media library.

740 The set of one or more media items that have not been added to the media library that are displayed in response to the user input requesting to display the plurality of shared media items are displayed without a visually distinguished appearance.

742 In response to the user input requesting to display the plurality of shared media items, displaying the plurality of shared media items, including the set of the one or more media items that have not been added to the media library and a set of one or more media items that have been added to the media library.

744 Media items in the set of the one or more media items that have not been added to the media library are visually distinguished from media items in the set of one or more media items that have been added to the media library based on a visual feature that is separate from content of the media items.

746 The display criteria include relevance criteria.

---

748 The display criteria include location criteria indicating that a user of the computer system was located at a same location corresponding to the shared media item.

---

750 The display criteria include user identification criteria that indicates if a user of the computer system appears in the media item.

---

752 Receive, by the first application, a request to delete a communication thread in which the first media item that has not been added to the media library was shared. In response to receiving the request to delete the communication thread, forgoing display of the first shared media item in the collection of media items when the collection of media items is displayed.

---

754 The display criteria include recency criteria to display media items that have been shared within a predetermined threshold amount of time.

Figure 7E

DEVICES, METHODS, AND GRAPHICAL USER INTERFACES FOR DISPLAYING MEDIA ITEMS SHARED FROM DISTINCT APPLICATIONS

RELATED APPLICATIONS

This claims priority to U.S. Provisional Patent Application No. 63/189,648, filed on May 17, 2021, which is hereby incorporated by reference in its entirety.

TECHNICAL FIELD

This relates generally to electronic devices with touch-sensitive surfaces, including but not limited to electronic devices with touch-sensitive surfaces that display media items in an application, including media items that are shared using an application distinct from the application that displays the media items.

BACKGROUND

The use of computer systems for sharing and storing media items has increased significantly in recent years. Devices allow users to share many different types of media items with other individuals using a variety of methods, including using different communication applications of a user's device. While it is easy to send and receive media items using communication applications, typically, a separate media application is used to view, edit, and save media items that are shared with the user so that the user is enabled to access and view the shared media items on the user's device within the media application.

But methods for transferring media items from a communication application in which the media items are shared to a media application in which the shared media items are to be displayed are cumbersome and inefficient. For example, using a sequence of inputs to select one or more user interface objects and perform one or more actions on the selected user interface objects is tedious and creates a significant cognitive burden on a user. In addition, these methods take longer than necessary, thereby wasting energy. This latter consideration is particularly important in battery-operated devices.

SUMMARY

Accordingly, there is a need for electronic devices with faster, more efficient methods and interfaces for automatically displaying media items from a communication application in which media items are shared in a distinct media application for viewing and saving the media items. For example, electronic devices that automatically display the shared media items in the media application without requiring user input, improve the user experience and allow the user to view and save media items that have been shared with the user within the media application without the user requesting to individually transfer each media item from the communication application to the media application. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touch-sensitive surface, implemented, for example, with a touch pad. In some embodiments, the device has a touch-sensitive display (also known as a "touch screen" or "touch-screen display") that includes a touch-sensitive surface. In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at a computer system that is in communication with a display generation component and one or more input devices. The method includes receiving, by a first application, a plurality of shared media items and after receiving the plurality of shared media items, receiving, via the one or more input devices, a request to display a view of a media application. The media application includes a media library that includes a first plurality of media items, and the plurality of shared media items includes a set of one or more media items that have not been added to the media library. The method includes, in response to receiving the request to display the view of the media application, displaying, via the display generation component, a collection of media items in the media application that are selected based on first criteria. Displaying the collection of media items includes displaying a second plurality of media items selected from the media library based on the first criteria and, in accordance with a determination that a first shared media item from the set of one or media items that have not been added to the media library meets display criteria, the display criteria including the first criteria, displaying the first shared media item in the collection of media items concurrently with the second plurality of media items, wherein the first shared media item is visually distinguished from the second plurality of media items based on a visual feature that is separate from content of the first shared media item.

In accordance with some embodiments, a method is performed at a computer system that is in communication with a display generation component and one or more input devices. The method includes receiving, by a first application, a plurality of shared media items. The method includes, after receiving the plurality of shared media items, receiving, via the one or more input devices, a request to search a media library of a second application that is different from the first application for media items in the media library that meet search criteria. The method further includes, in response to receiving the request to search the media library, concurrently displaying, via the display generation component, two or more media items that meet the search criteria. The two or more media items include: one or more media items from the media library of the second application that meet the search criteria, and one or more of the shared media items that are not stored within the media library of the second application and that meet the search criteria.

In accordance with some embodiments, an electronic device includes a display, a touch-sensitive surface, optionally one or more sensors to detect intensities of contacts with the touch-sensitive surface, optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a computer readable storage medium has stored therein instructions, which, when executed by an electronic device with a display, a touch-sensitive surface, optionally one or more sensors to detect intensities of contacts with the touch-sensitive surface, and optionally one or more tactile output generators, cause the device to perform or cause performance of the operations of any of the methods described herein. In accordance with some embodiments, a graphical user interface on an electronic device with a display, a touch-sensitive surface, optionally one or more sensors to detect intensities of contacts with the touch-sensitive surface, optionally one or more tactile output generators, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, a touch-sensitive surface, optionally one or more sensors to detect intensities of contacts with the touch-sensitive surface, and optionally one or more tactile output generators; and means for performing or causing performance of the operations of any of the methods described herein. In accordance with some embodiments, an information processing apparatus, for use in an electronic device with a display, a touch-sensitive surface, optionally one or more sensors to detect intensities of contacts with the touch-sensitive surface, and optionally one or more tactile output generators, includes means for performing or causing performance of the operations of any of the methods described herein.

Thus, electronic devices with displays, touch-sensitive surfaces, optionally one or more sensors to detect intensities of contacts with the touch-sensitive surface, optionally one or more tactile output generators, optionally one or more device orientation sensors, and optionally an audio system, are provided with improved methods and interfaces for displaying shared media items in a media application, thereby increasing the effectiveness, efficiency, and user satisfaction with such devices. Such methods and interfaces may complement or replace conventional methods for displaying shared media items in a media application.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 7A-7E are flow diagrams of a process for concurrently displaying media items in an application with shared media items that are received via a distinct application in accordance with some embodiments.

DESCRIPTION OF EMBODIMENTS

Accordingly, a method is provided for automatically displaying media items from a communication application in which media items are shared in a distinct media application for viewing and saving the media items. For example, electronic devices that automatically display the shared media items in the media application without requiring user input, improves the user experience and allows the user to view and save media items that have been shared with the user within the media application without the user requesting to individual transfer each media item from the communication application to the media application.

Figure 2:
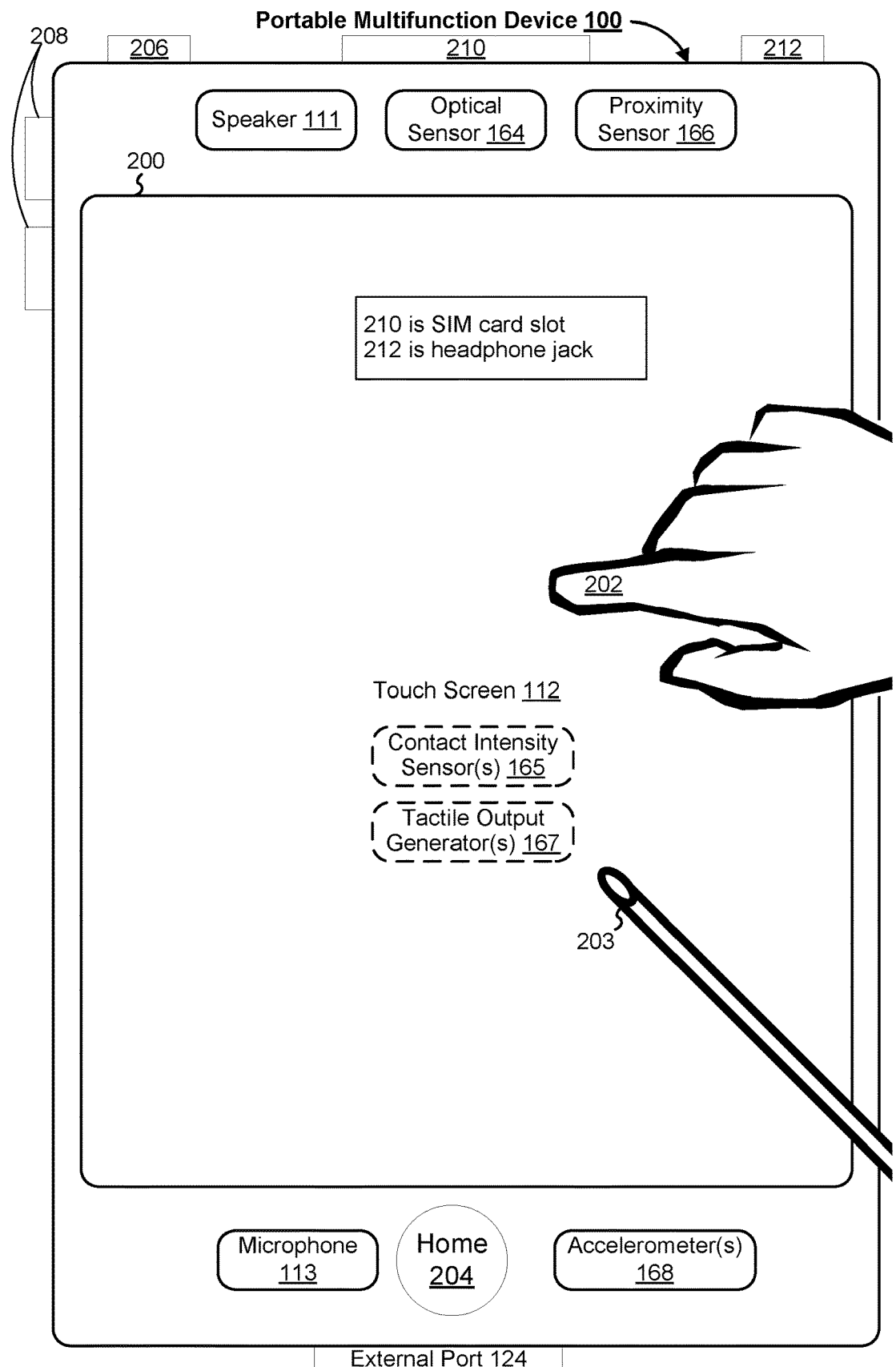
FIG. 2 illustrates a portable multifunction device having a touch screen in accordance with some embodiments.
Figure 3:
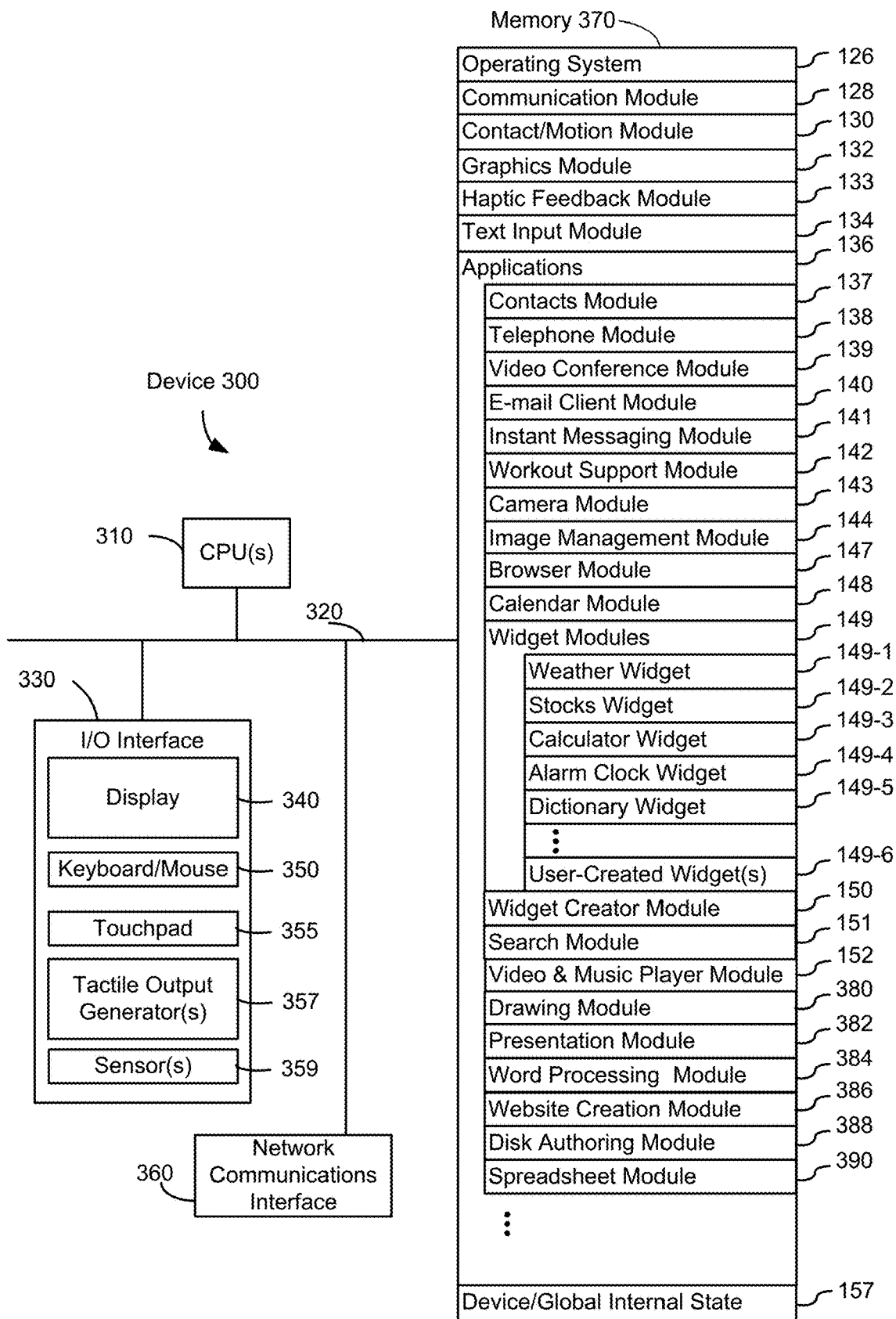
FIG. 3 is a block diagram of an example multifunction device with a display and a touch-sensitive surface in accordance with some embodiments.
Figure 4A:
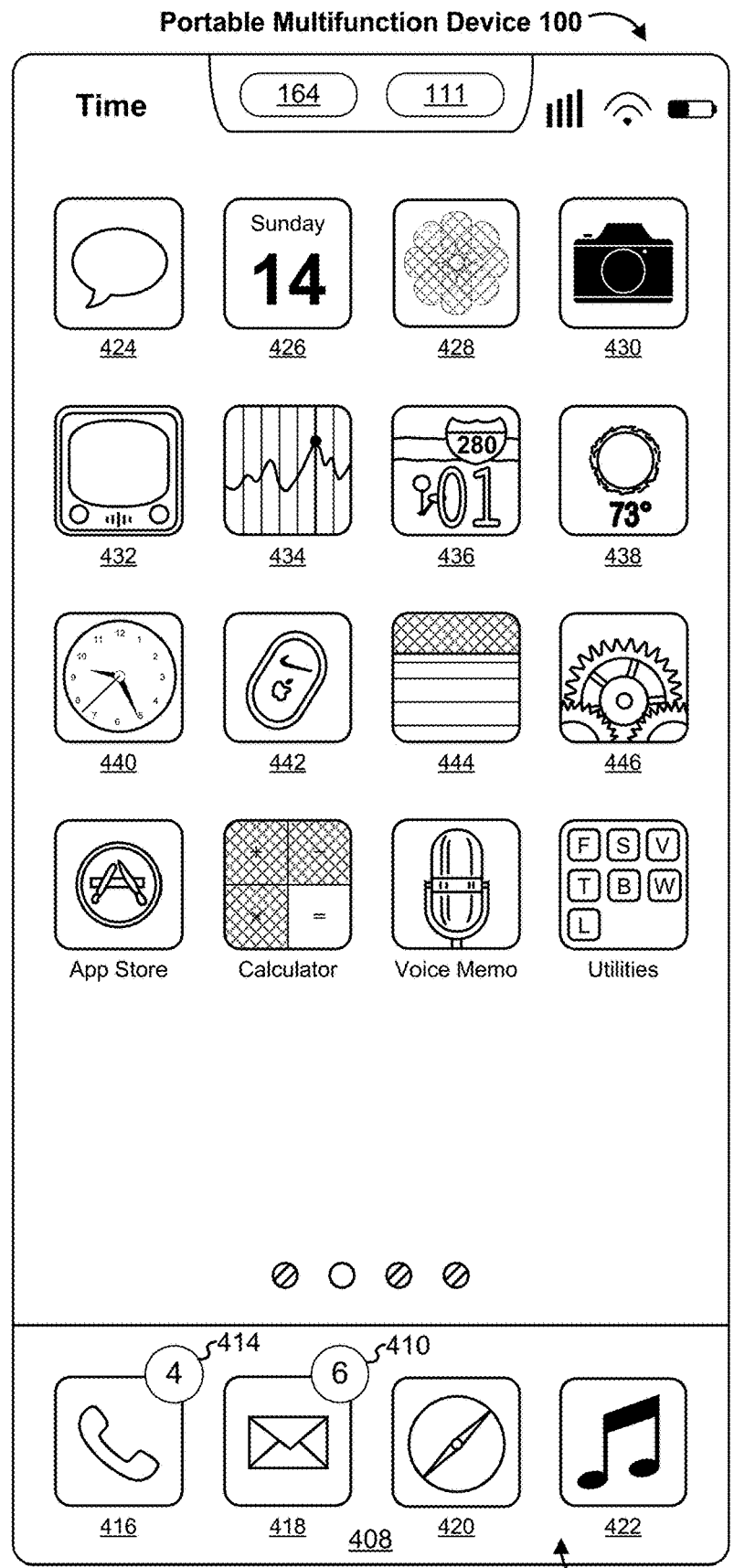
FIG. 4A illustrates an example of a user interface that includes a menu of applications on a portable multifunction device, in accordance with some embodiments.
Figure 4B:
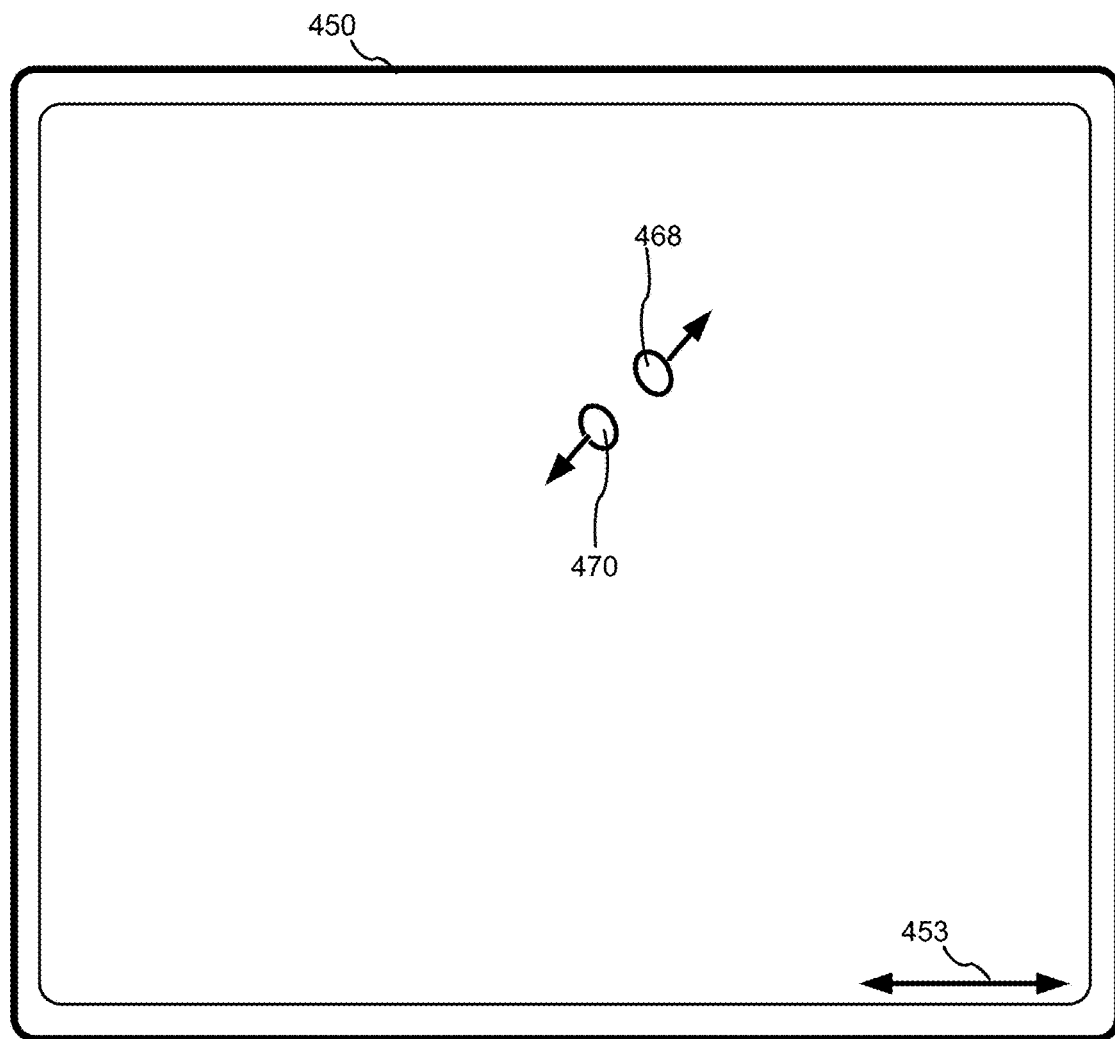
FIG. 4B illustrates an example user interface for a multifunction device with a touch-sensitive surface that is separate from the display in accordance with some embodiments.
Figure 4B:
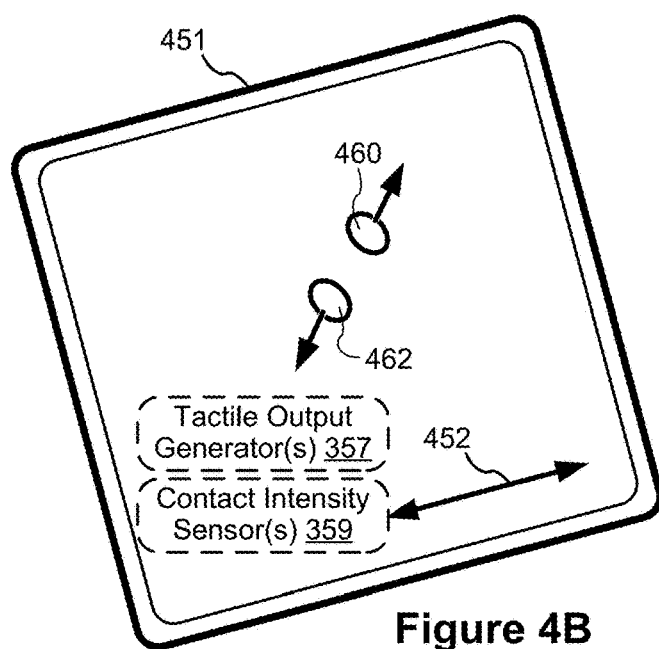
Figure 5A:
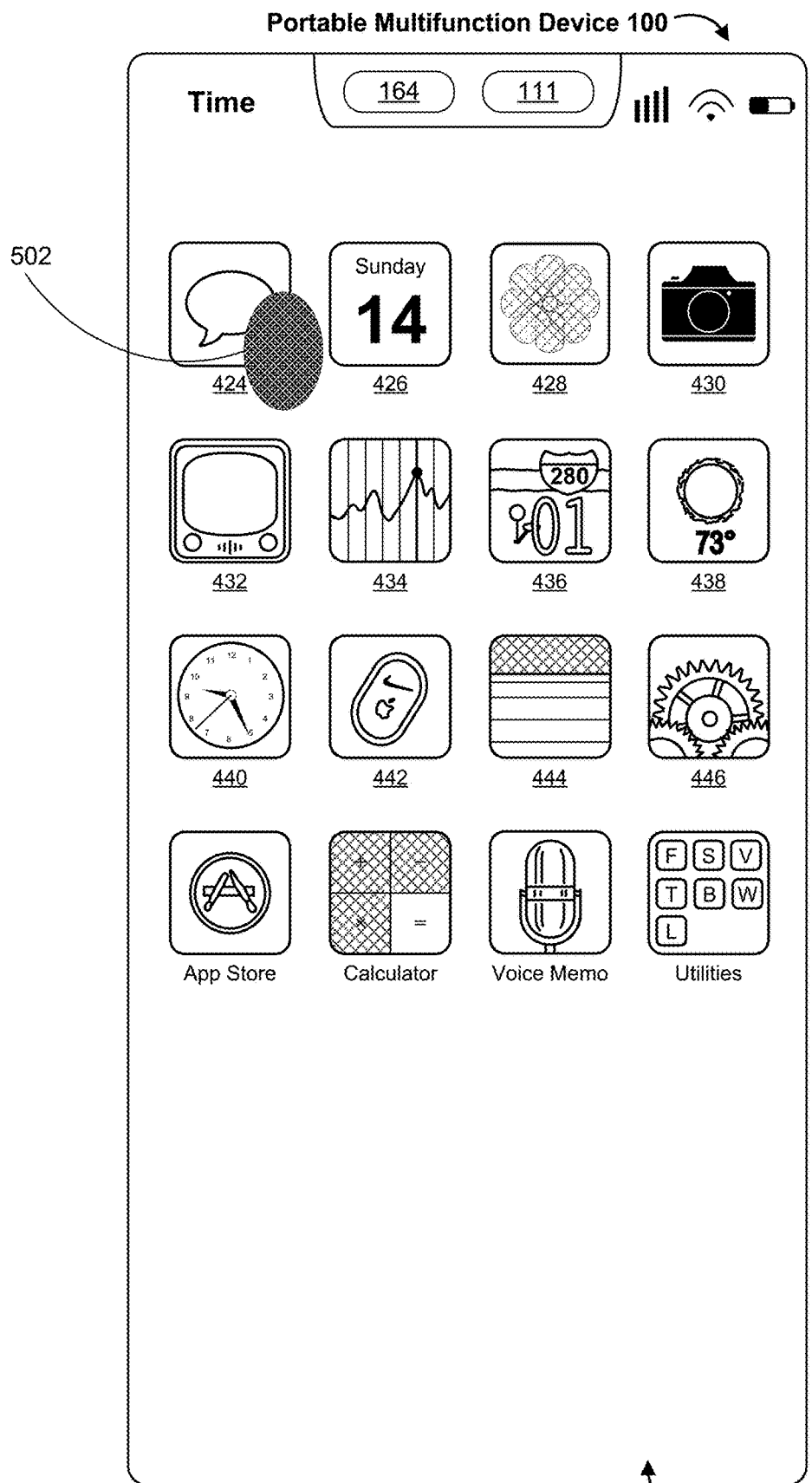
FIGS. 5A-5AQ illustrate example user interfaces for concurrently displaying media items in an application with shared media items that are received via a distinct application, in accordance with some embodiments.
Figure 8A:
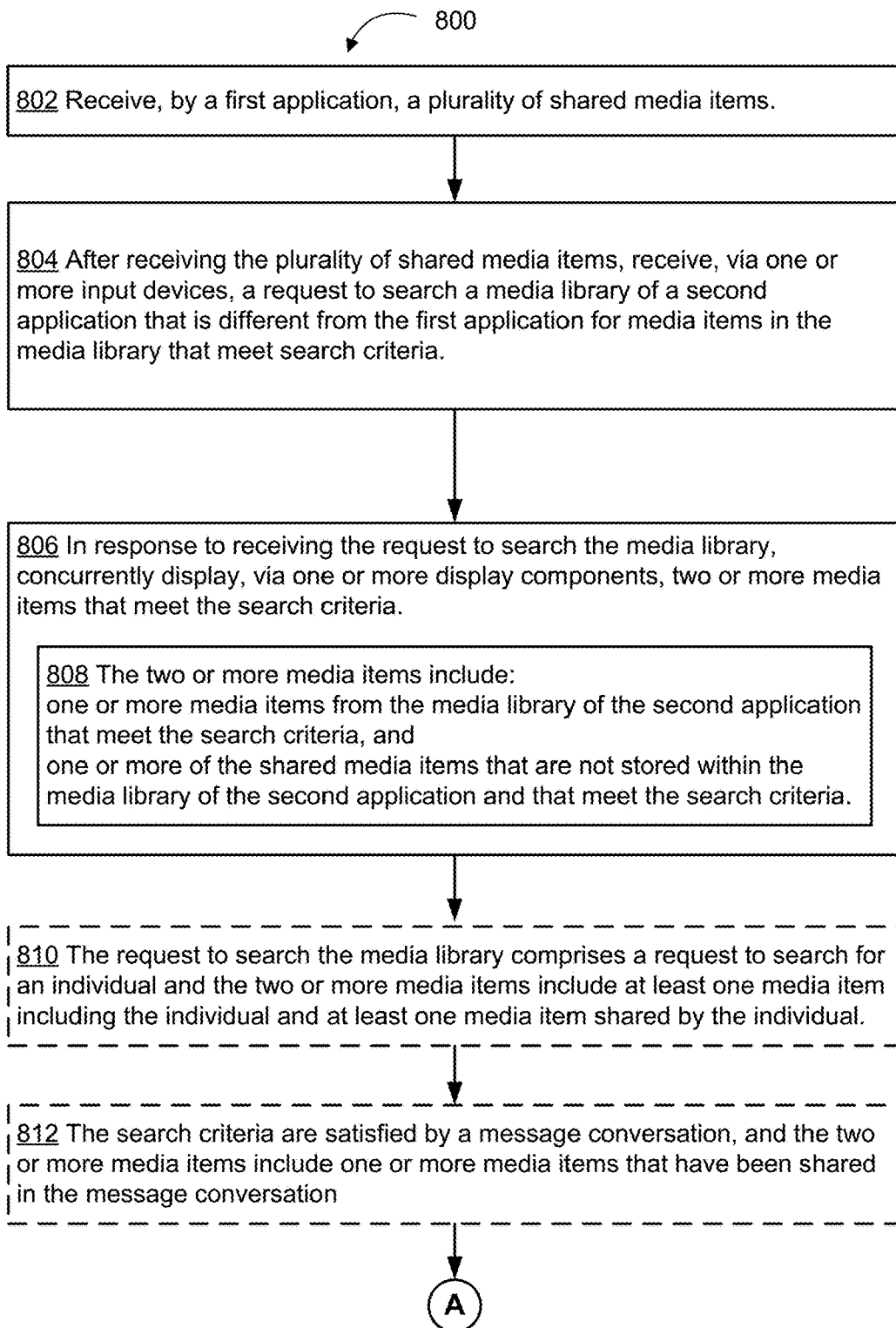
FIGS. 8A-8B are flow diagrams of a process for displaying search results for media items in an application, including concurrently displaying media items saved in the application with shared media items that are received via a distinct application in accordance with some embodiments.
Figure 8B:
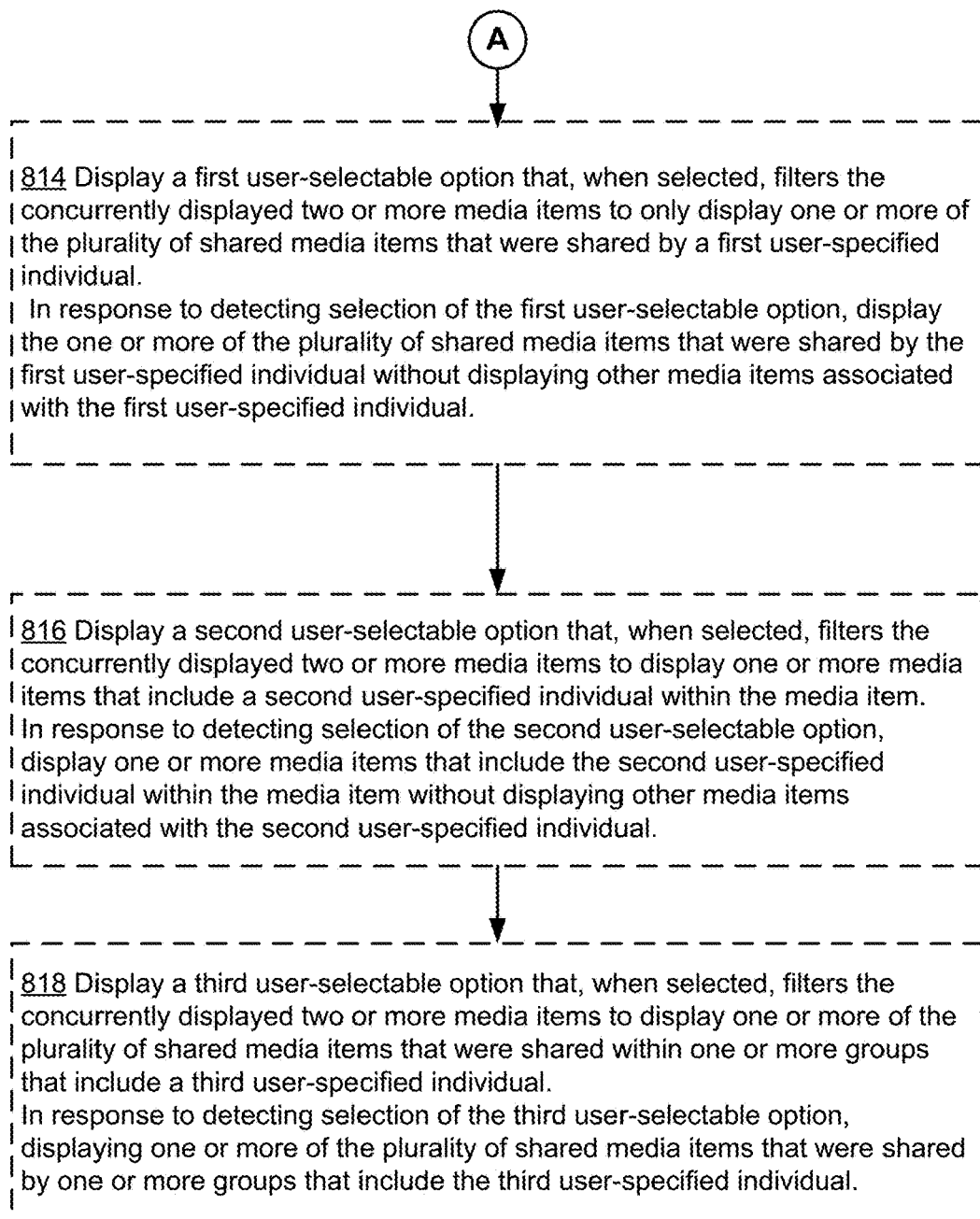

Below, FIGS. 1A-1B, 2, and 3 provide a description of example devices. FIGS. 4A-4B, 5A-5AQ and 6A-6P illustrate example user interfaces for concurrently displaying media items in an application with shared media items that are received via a distinct application. FIGS. 7A-7E illustrate a flow diagram of a method of concurrently displaying media items in an application with shared media items that are received via a distinct application. FIGS. 8A-8B illustrate a flow diagram of a method of displaying search results, including concurrently displaying media items in an application with shared media items that are received via a distinct application. The user interfaces in FIGS. 5A-5AQ and 6A-6P are used to illustrate the processes in FIGS. 7A-7E, and 8A-8B.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
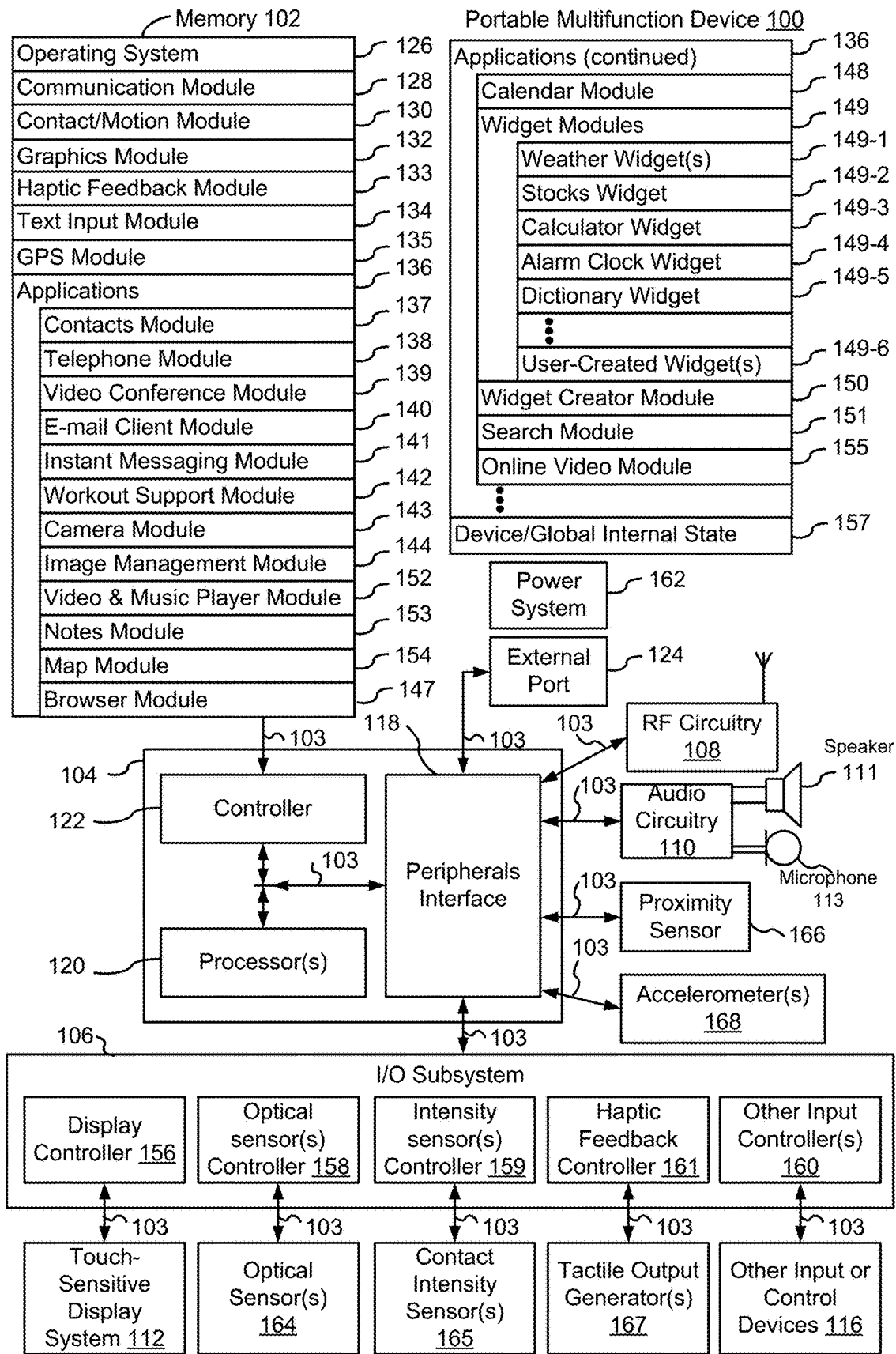
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a tactile output pattern specifies characteristics of a tactile output, such as the amplitude of the tactile output, the shape of a movement waveform of the tactile output, the frequency of the tactile output, and/or the duration of the tactile output.

When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device. Thus, the waveform, frequency and amplitude can be adjusted to indicate to the user that different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device. Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, California.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. In some embodiments, tactile output generator(s) 167 include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, California. In some embodiments, the external port is a Lightning connector that is the same as, or similar to and/or compatible with the Lightning connector used in some iPhone®, iPod Touch®, and iPad® devices from Apple Inc. of Cupertino, California.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have a criteria that is met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 167 at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which is, optionally, made up of a video player module and a music player module;
  notes module 153;
  map module 154; and/or
  online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
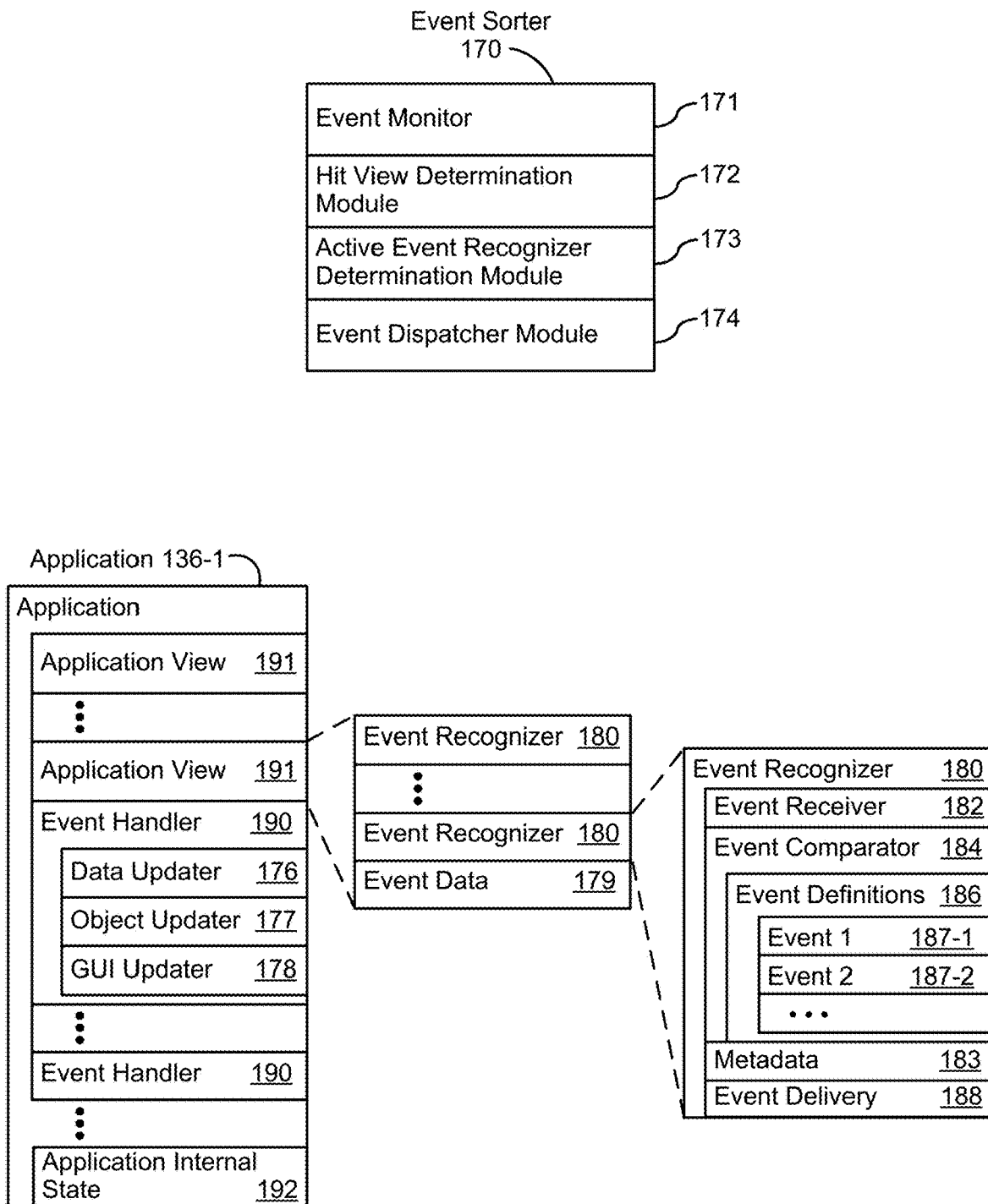
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on the touch-screen display.

In some embodiments, device 100 includes the touch-screen display, menu button 204 (sometimes called home button 204), push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 167 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) for wireless communication(s), such as cellular and Wi-Fi signals;
- Time;
- a Bluetooth indicator;
- a Battery status indicator; Tray 408 with icons for frequently used applications, such as:
    - Icon 416 for telephone module 138, labeled "Phone," which optionally includes an indicator 414 of the number of missed calls or voicemail messages;
    - Icon 418 for e-mail client module 140, labeled "Mail," which optionally includes an indicator 410 of the number of unread e-mails;
    - Icon 420 for browser module 147, labeled "Browser;" and
    - Icon 422 for video and music player module 152, labeled "Music;" and
- Icons for other applications, such as:
    - Icon 424 for IM module 141, labeled "Messages;"
    - Icon 426 for calendar module 148, labeled "Calendar;"
    - Icon 428 for image management module 144, labeled "Photos;"
    - Icon 430 for camera module 143, labeled "Camera;"
    - Icon 432 for online video module 155, labeled "Online Video;"
    - Icon 434 for stocks widget 149-2, labeled "Stocks;"
    - Icon 436 for map module 154, labeled "Maps;"
    - Icon 438 for weather widget 149-1, labeled "Weather;"
    - Icon 440 for alarm clock widget 149-4, labeled "Clock;"
    - Icon 442 for workout support module 142, labeled "Workout Support;"
    - Icon 444 for notes module 153, labeled "Notes;" and
    - Icon 446 for a settings application or module, which provides access to settings for device 100 and its various applications 136.

It should be noted that the icon labels illustrated in FIG. 4A are merely examples. For example, other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3A or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device). In some embodiments, a focus indicator (e.g., a cursor or selection indicator) is displayed via the display device to indicate a current portion of the user interface that will be affected by inputs received from the one or more input devices.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms (milliseconds) in duration (e.g., 40, 100, or 120 ms, depending on the magnitude of the second intensity threshold, with the delay time increasing as the second intensity threshold increases). This delay time helps to avoid accidental recognition of deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

Figure 4C:
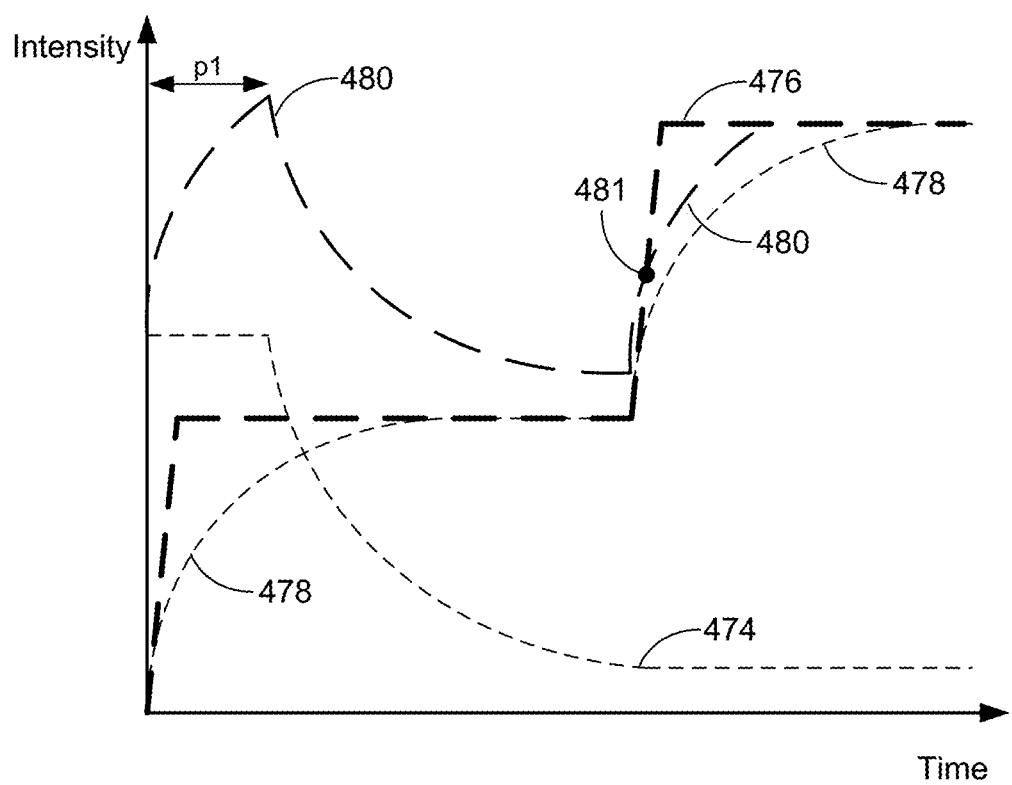
FIGS. 4C-4E illustrate examples of dynamic intensity thresholds in accordance with some embodiments.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

Figure 4D:
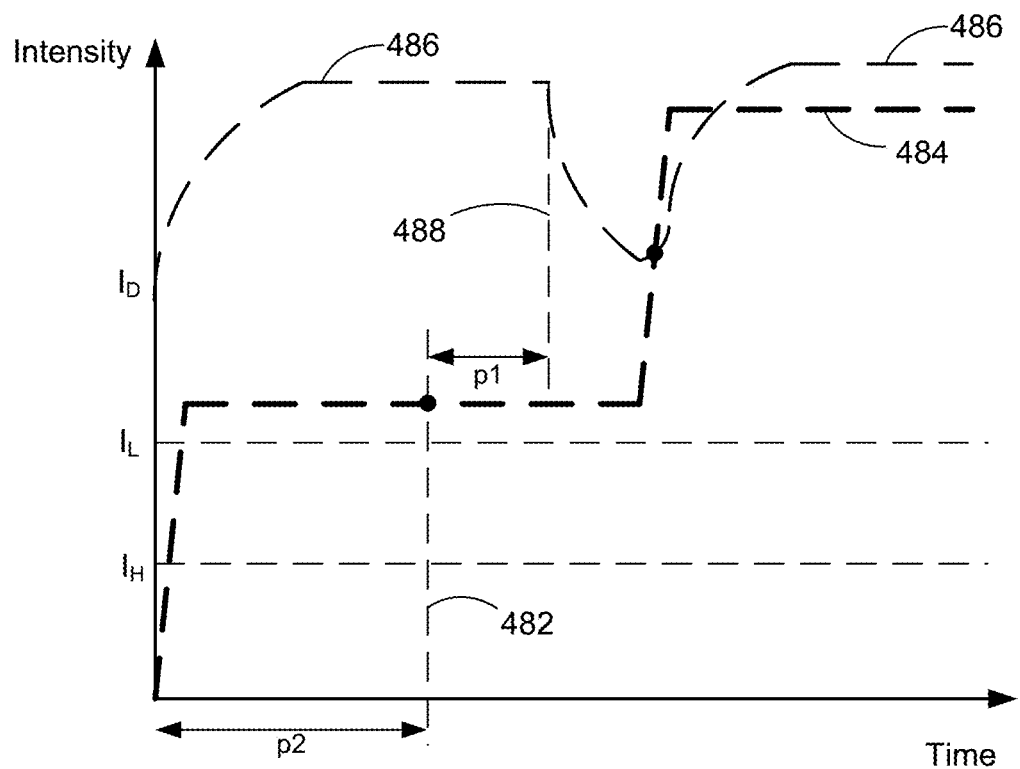

FIG. 4D illustrates another dynamic intensity threshold 486 (e.g., intensity threshold $I_D$). FIG. 4D also illustrates two other intensity thresholds: a first intensity threshold $I_H$ and a second intensity threshold $I_L$. In FIG. 4D, although touch input 484 satisfies the first intensity threshold $I_H$ and the second intensity threshold $I_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $I_L$ was triggered). This type of dynamic intensity threshold reduces accidental triggering of a response associated with the dynamic intensity threshold $I_D$ immediately after, or concurrently with, triggering a response associated with a lower intensity threshold, such as the first intensity threshold $I_H$ or the second intensity threshold $I_L$.

Figure 4E:
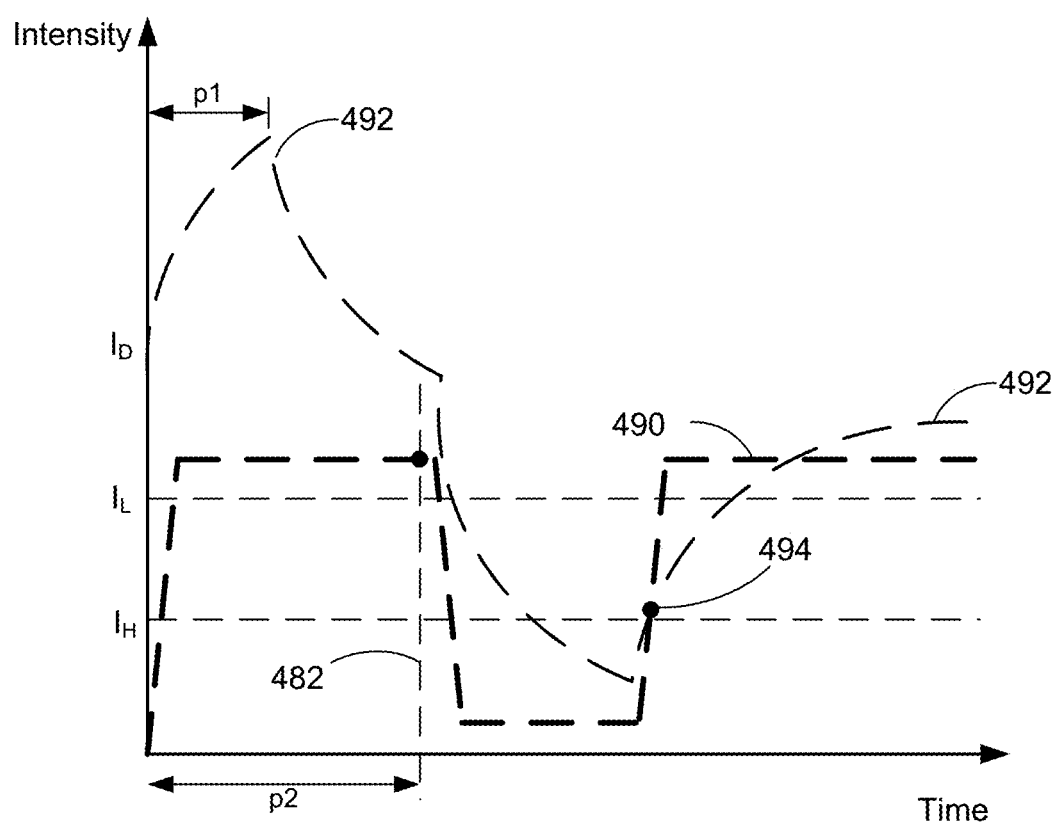

FIG. 4E illustrate yet another dynamic intensity threshold 492 (e.g., intensity threshold $I_D$). In FIG. 4E, a response associated with the intensity threshold $I_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $I_L$, followed by an increase in the intensity of touch input 490, without releasing touch input 490, can trigger a response associated with the intensity threshold $I_D$ (e.g., at time 494) even when the intensity of touch input 490 is below another intensity threshold, for example, the intensity threshold $I_L$.

User Interfaces and Associated Processes

Attention is now directed towards embodiments of user interfaces ("UI") and associated processes that may be implemented on an electronic device, such as portable multifunction device 100 or device 300, with a display, a touch-sensitive surface, (optionally) one or more tactile output generators for generating tactile outputs, and (optionally) one or more sensors to detect intensities of contacts with the touch-sensitive surface.

Figure 6B:
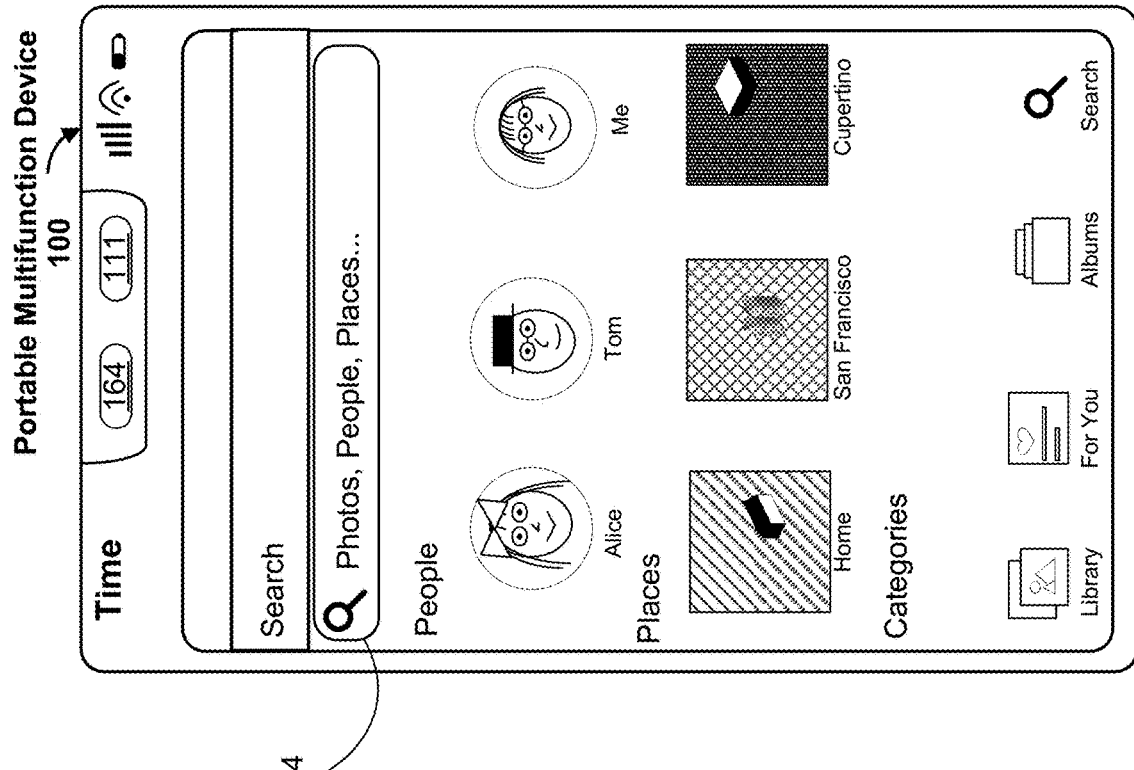
FIGS. 6A-6P illustrate example user interfaces for displaying search results for media items in an application, in accordance with some embodiments.
Figure 6A:
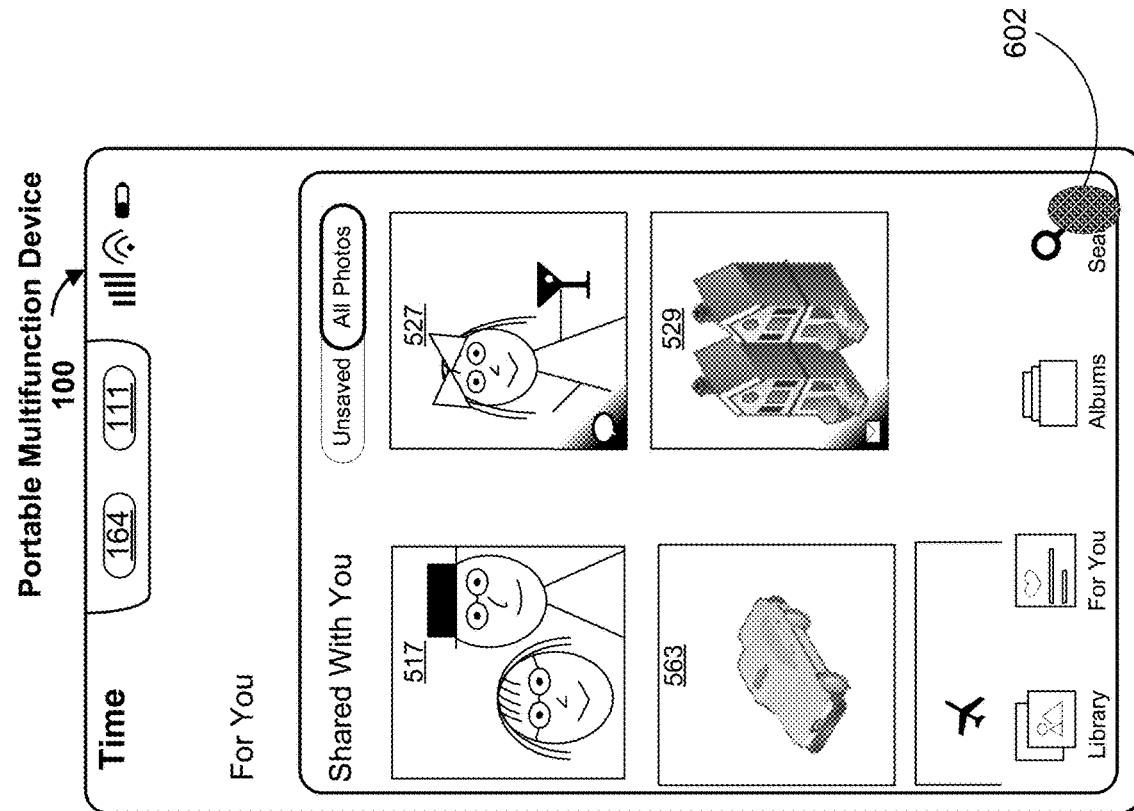
Figure 6D:
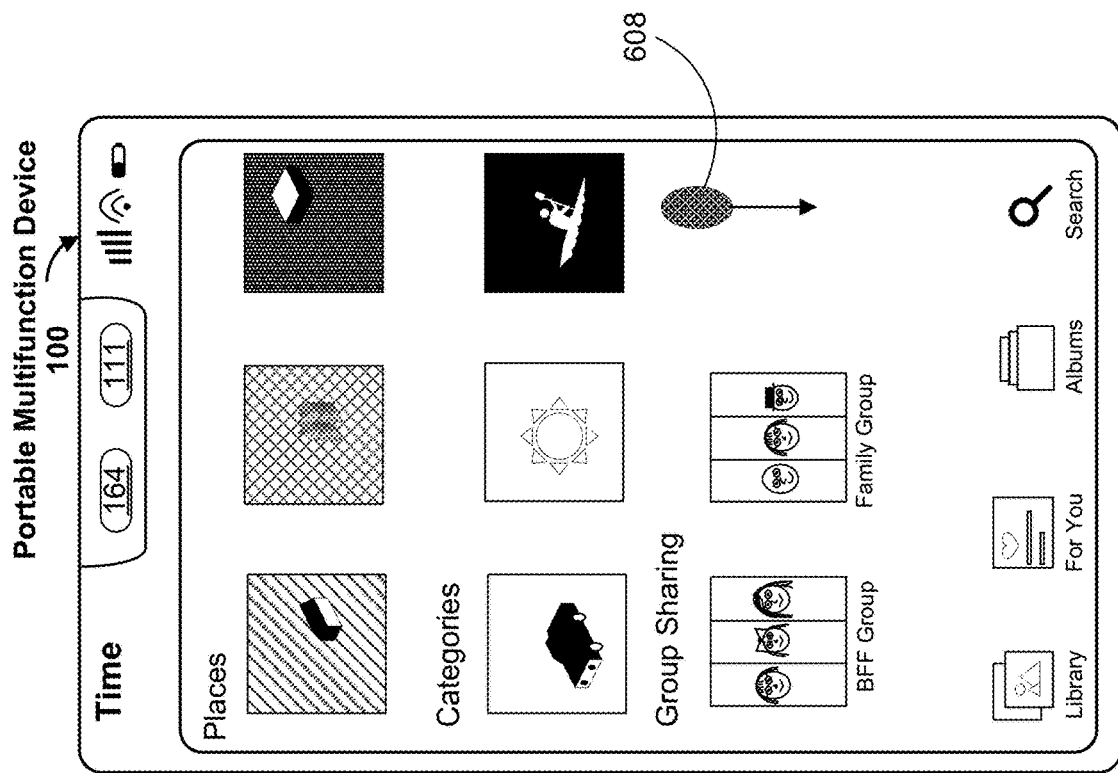
Figure 6C:
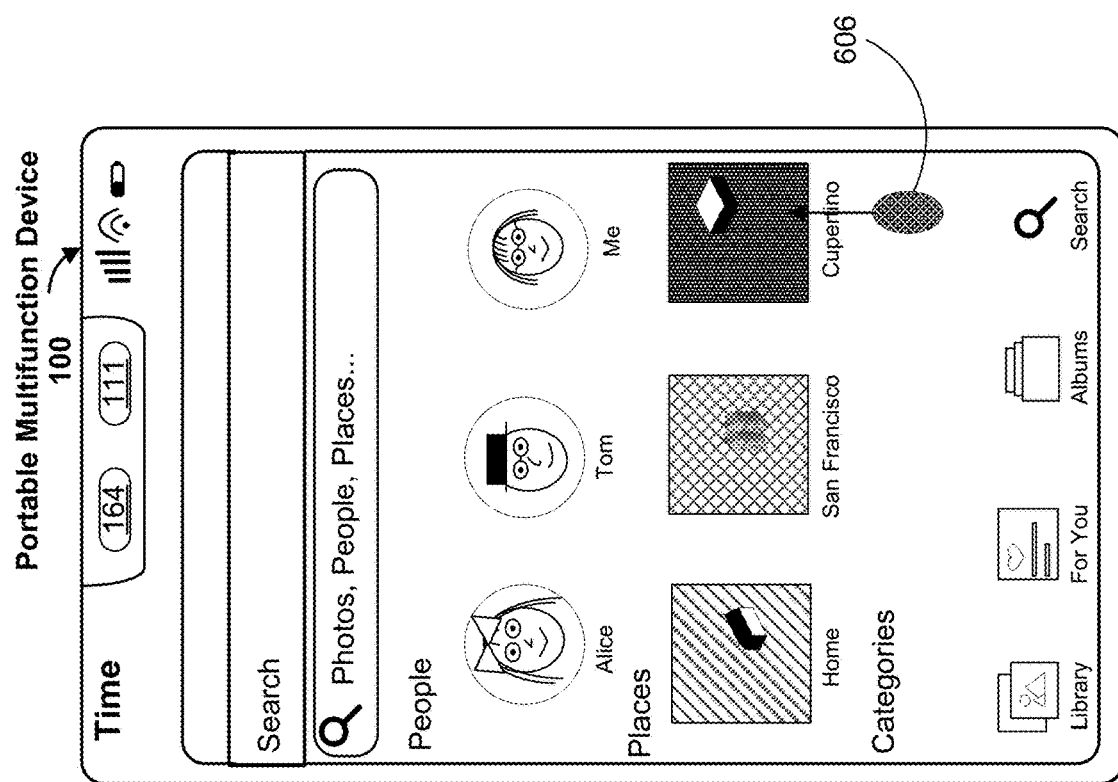
Figure 6F:
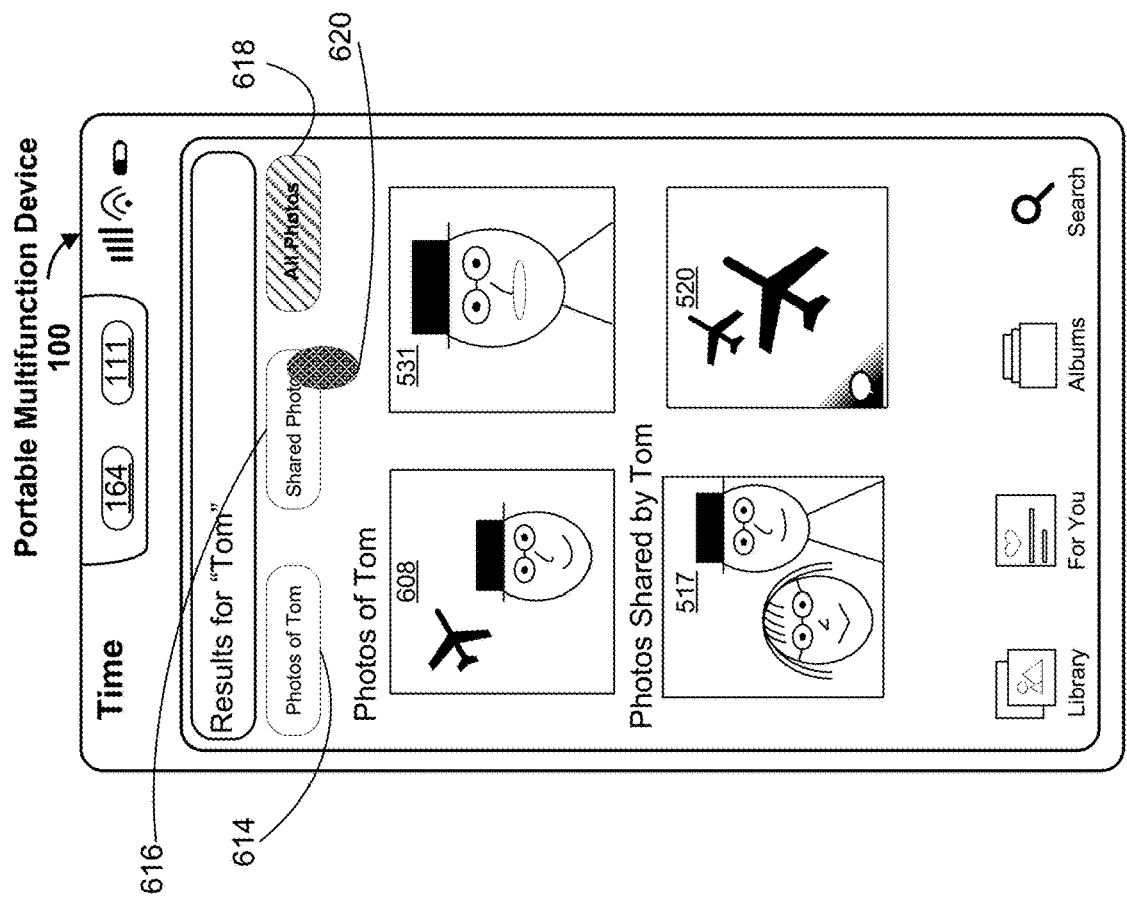
Figure 6E:
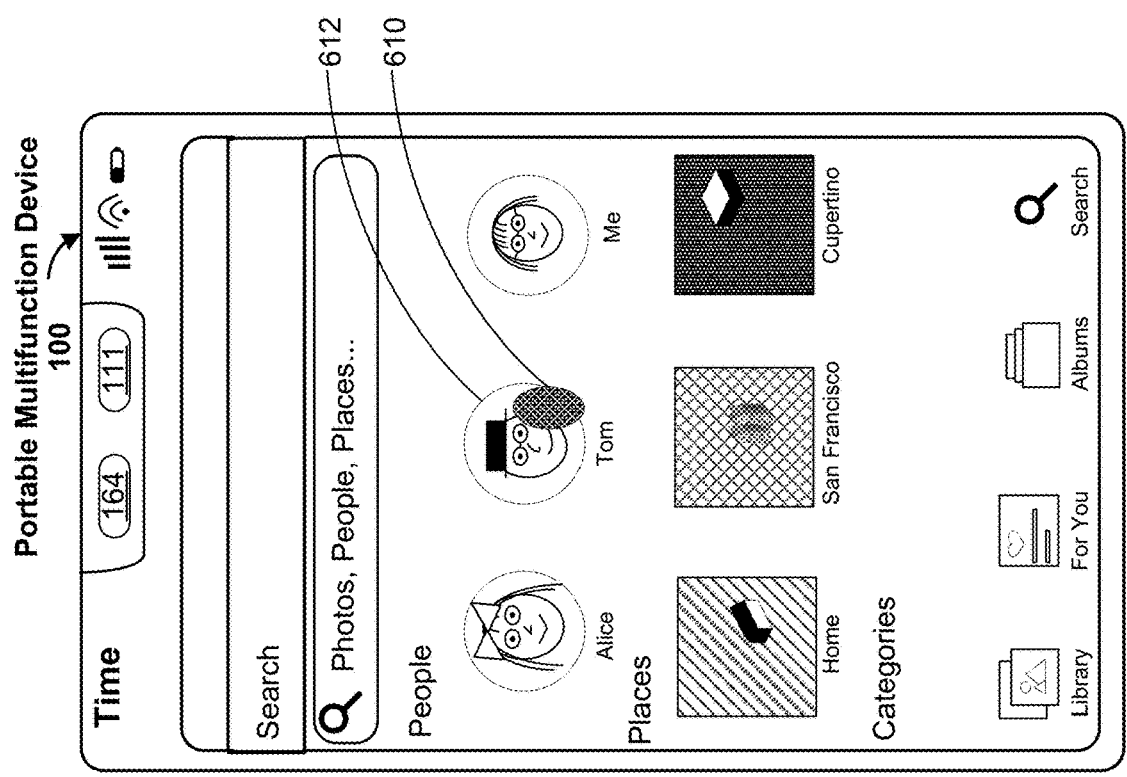
Figure 6H:
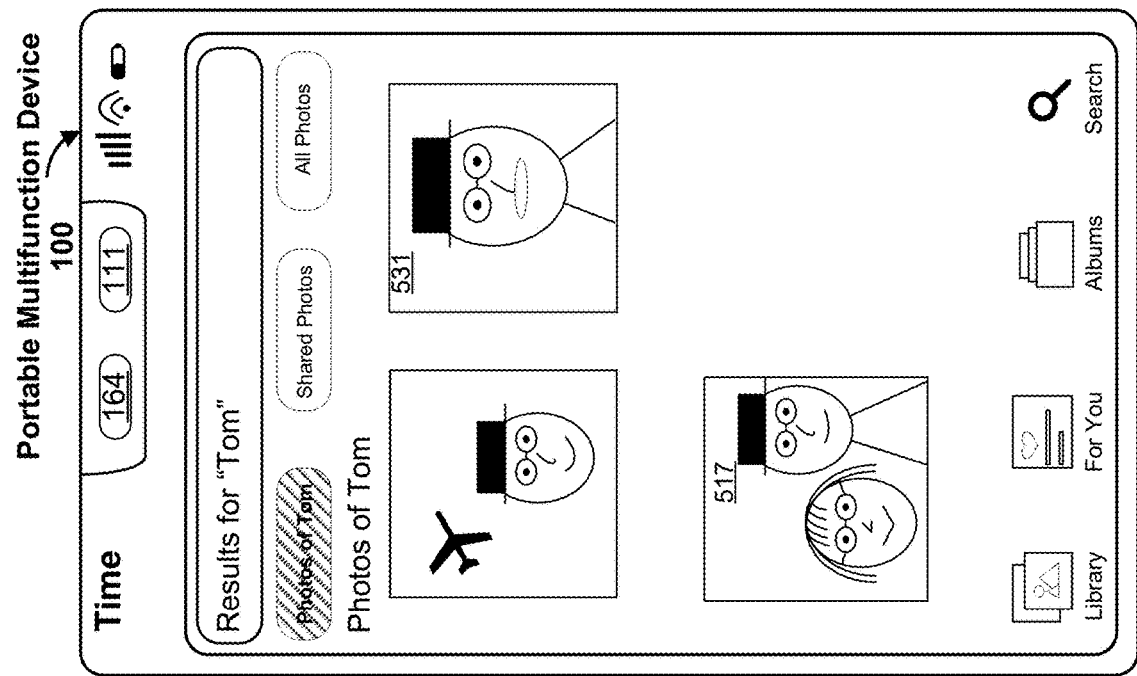
Figure 6G:
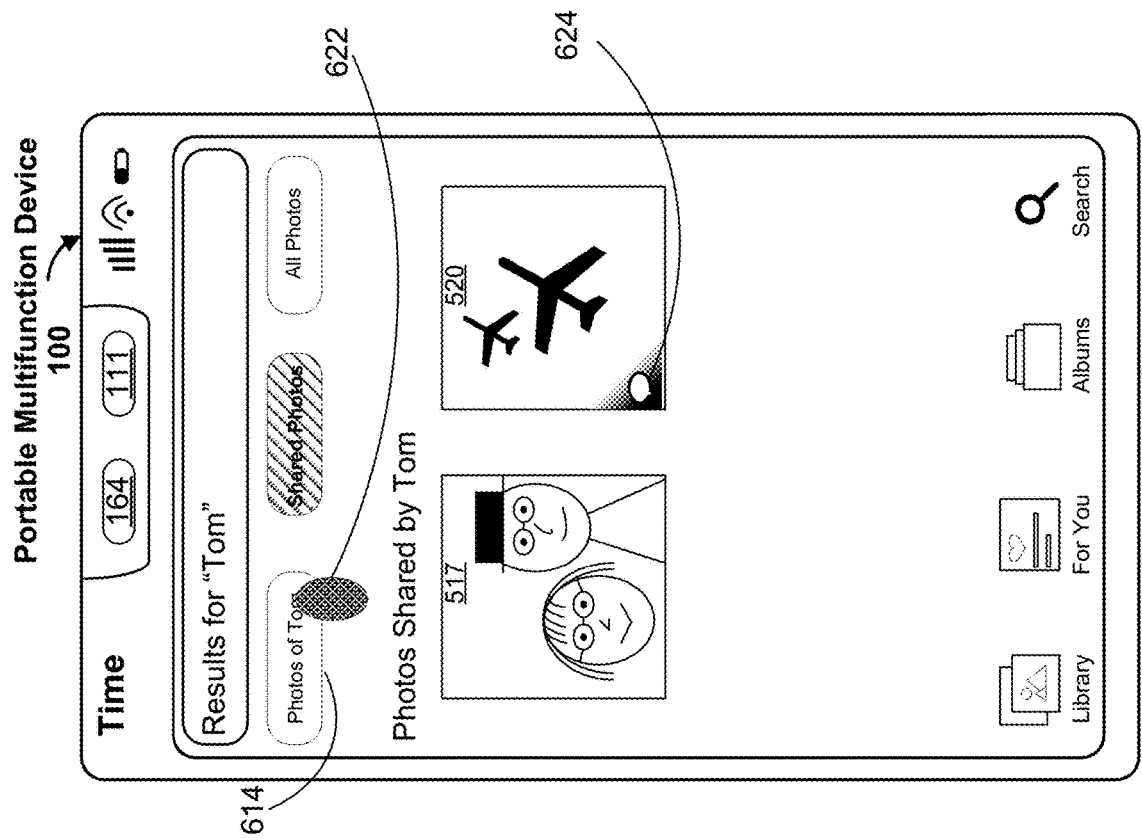
Figure 6J:
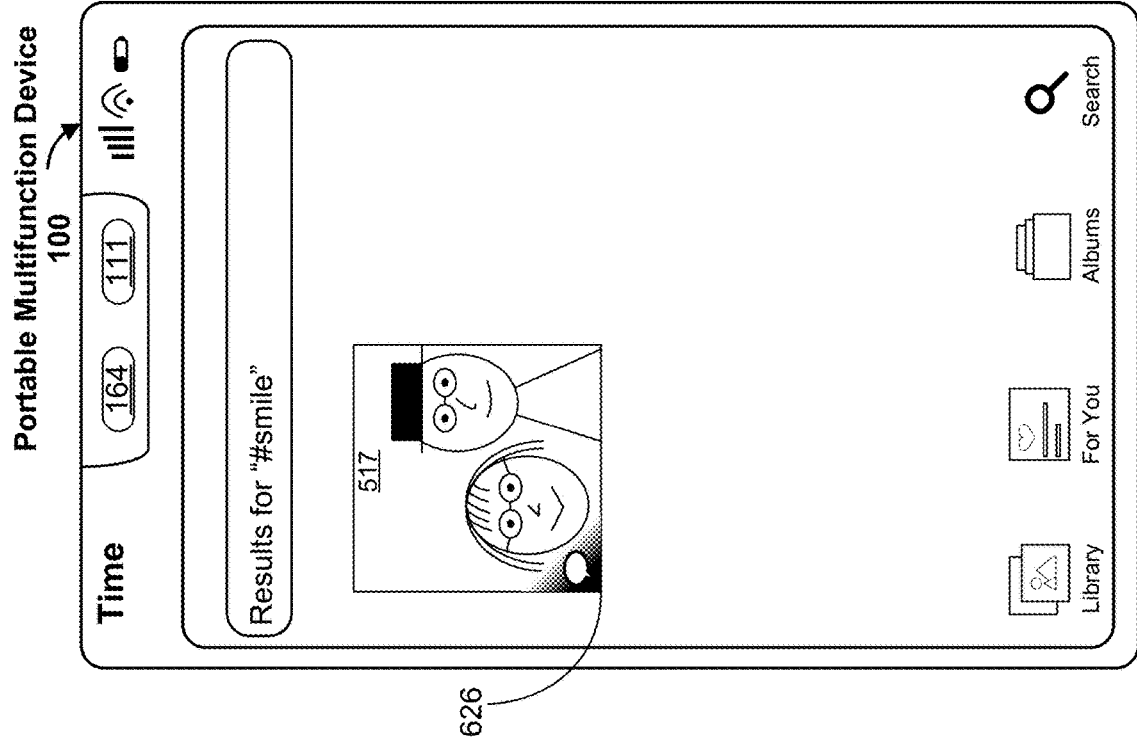
Figure 6I:
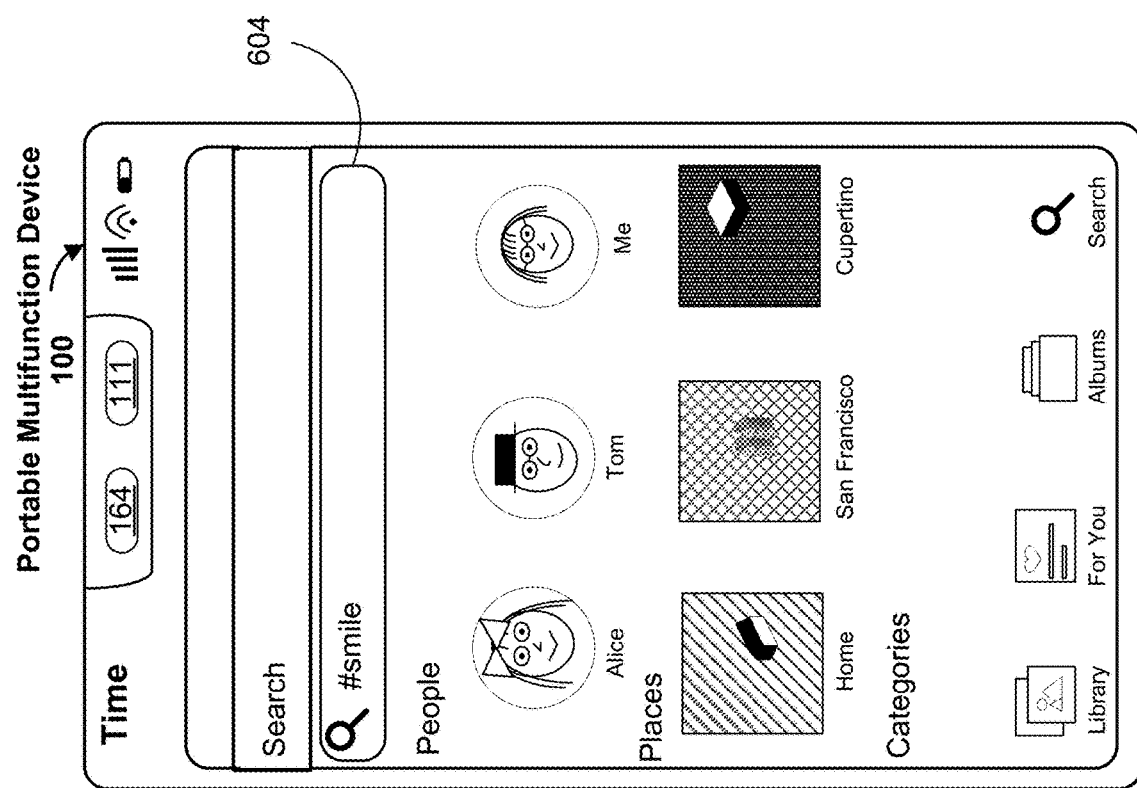
Figure 6L:
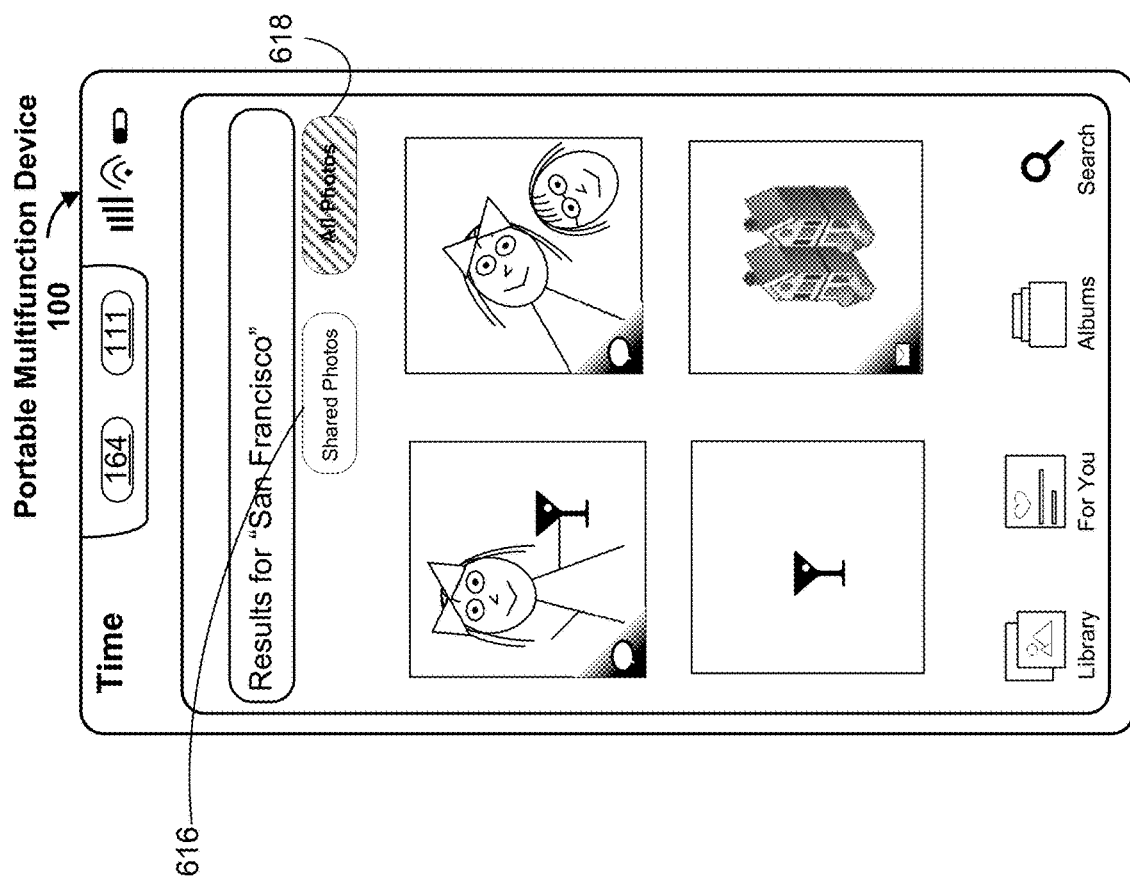
Figure 6K:
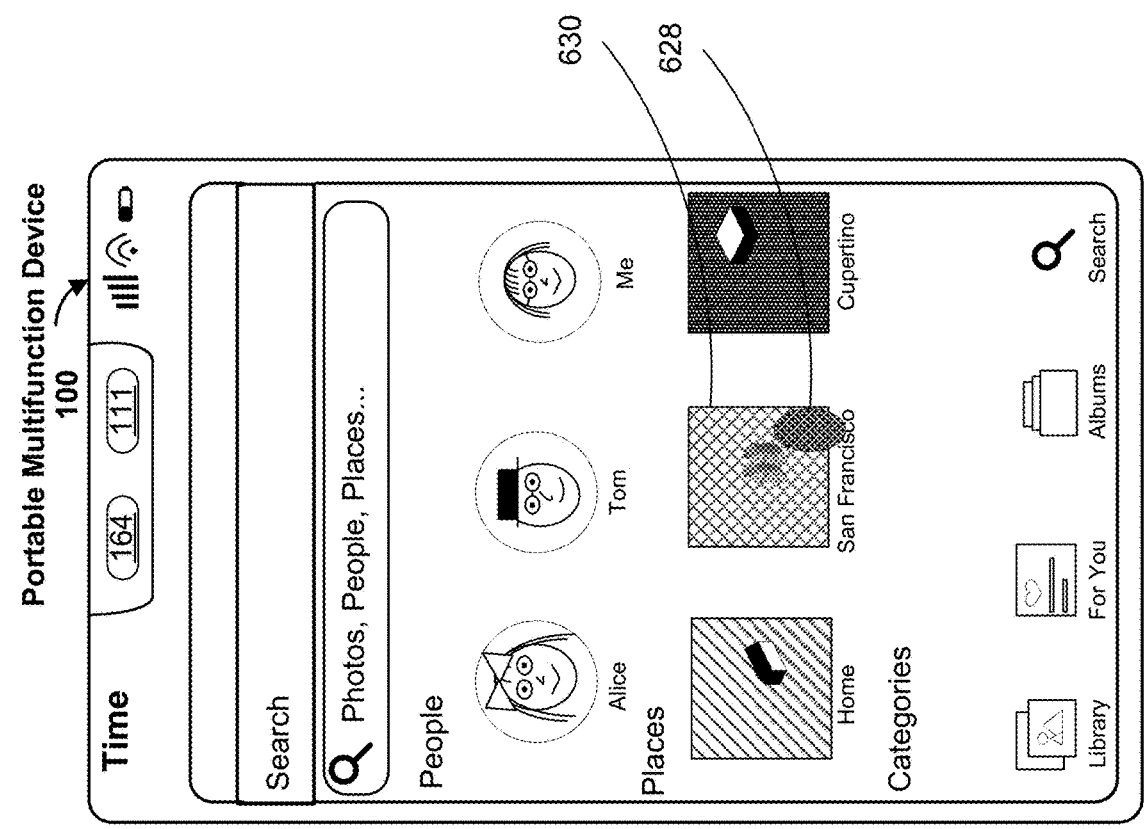
Figure 6N:
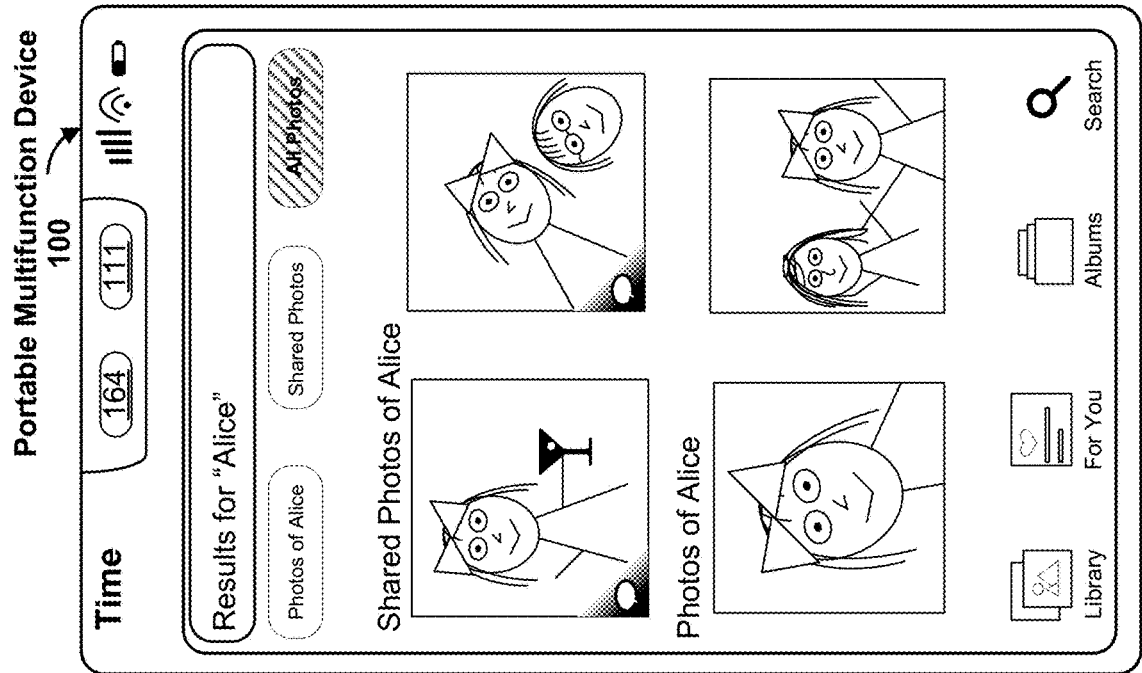
Figure 6M:
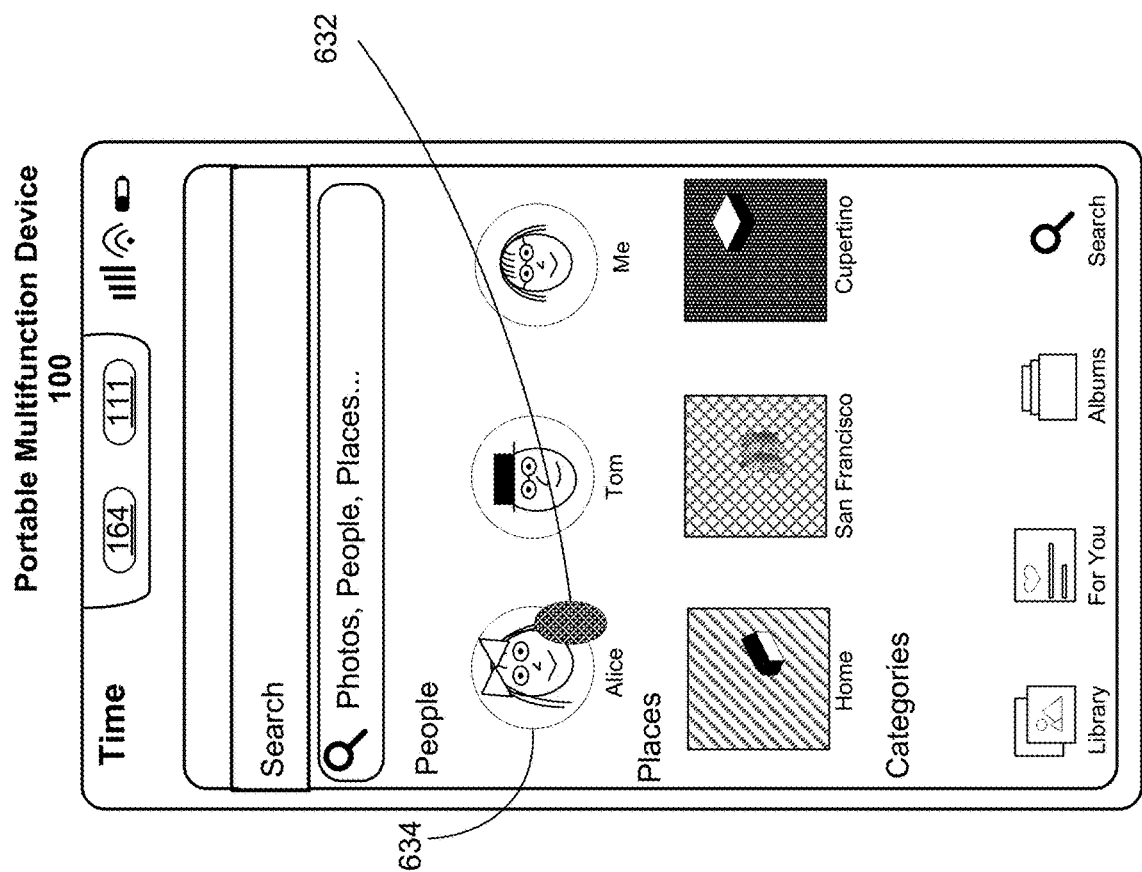
Figure 6P:
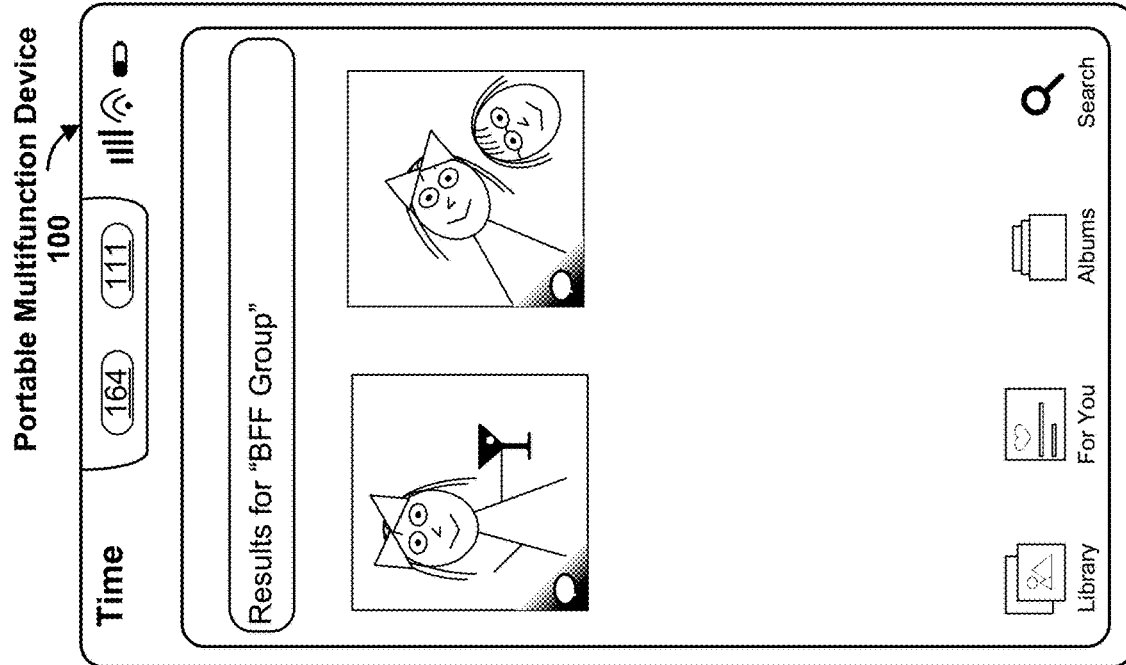

FIGS. 5A-5AQ and FIGS. 6A-6P illustrate example user interfaces for concurrently displaying media items in an application with shared media items that are received via a distinct application, in accordance with some embodiments. The user interfaces in these figures are used to illustrate the processes described below, including the processes described with respect to FIGS. 7A-7E and 8A-8B. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 5A-5AQ illustrate example user interfaces for concurrently displaying media items in an application with shared media items that are received via a distinct application in accordance with some embodiments.

FIG. 5A illustrates an example user interface for a menu of applications on portable multifunction device 100 in accordance with some embodiments, as described with reference to FIG. 4A. FIG. 5A further illustrates user input 502 selecting icon 424 (e.g., Messages icon) to launch a messaging application (e.g., a communication application). In some embodiments, in response to receiving user input 502, device 100 opens a messaging application, as displayed in FIG. 5B.

Figure 5C:
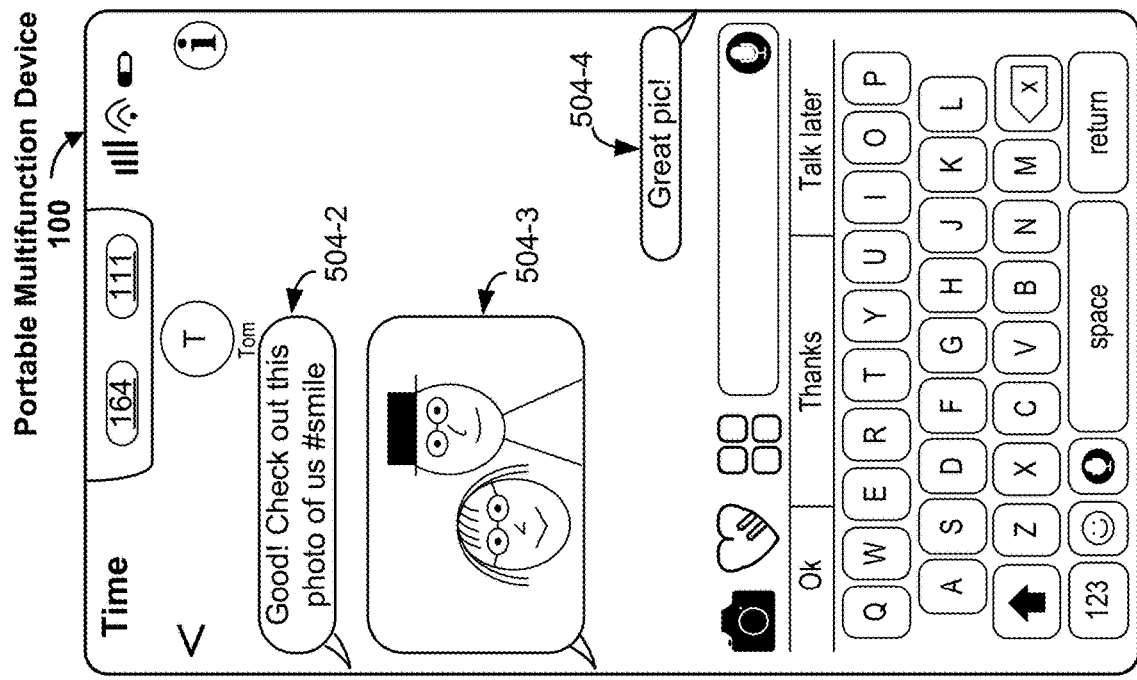
Figure 5B:
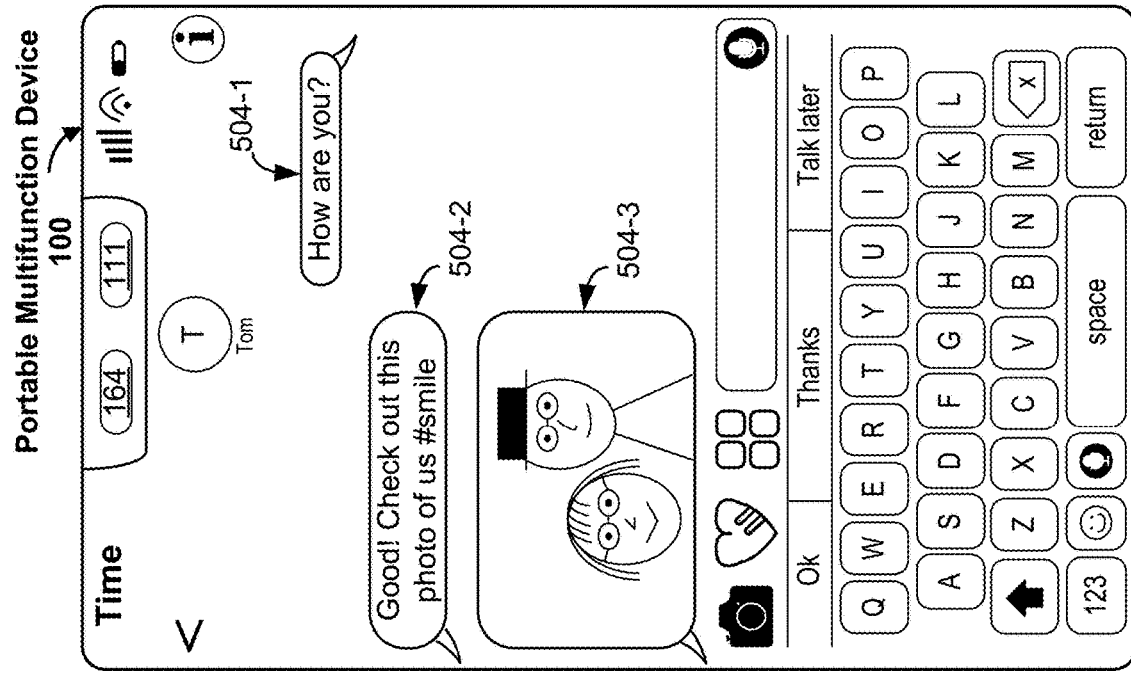

FIG. 5B illustrates an example user interface of a messaging application, including a first message thread (sometimes called a communication thread) between a user of device 100 and a second user of a second device (e.g., Tom). For example, displaying the messaging application includes displaying one or more messages sent by the user of device 100 (e.g., message 504-1) and/or one or more messages sent by the second user of the second device (e.g., messages that are received by device 100), such as messages 504-2 and 504-3. The one or more messages displayed in the messaging application user interface are sometimes called a conversation transcript; alternatively, the displayed messages are a portion of a conversation transcript of a messaging session (e.g., the first message thread) between the user of device 100 and the second user of the second device. In some embodiments, messages sent by the user of device 100 appear on the right side of the message thread, and messages received by device 100 (e.g., from Tom) are displayed on the left side of the message thread. In some embodiments, the one or more messages sent and/or received by device 100 include media items (e.g., photos, videos, GIFs, audio messages, etc.). For example, message 504-3 from Tom includes a photo. In some embodiments, messaging application further includes a keyboard (e.g., a soft keyboard, as described above with reference to Text input module 134) for entering text to compose (e.g., and send) messages.

In some embodiments, a user of device 100 responds to (e.g., sends) a message in the messaging application, and the messaging application displays the message within the message thread (e.g., message 504-4, as shown in FIG. 5C). In some embodiments, device 100 stores the message thread (e.g., as a conversation history) in the messaging application.

Figures 1, 5D:
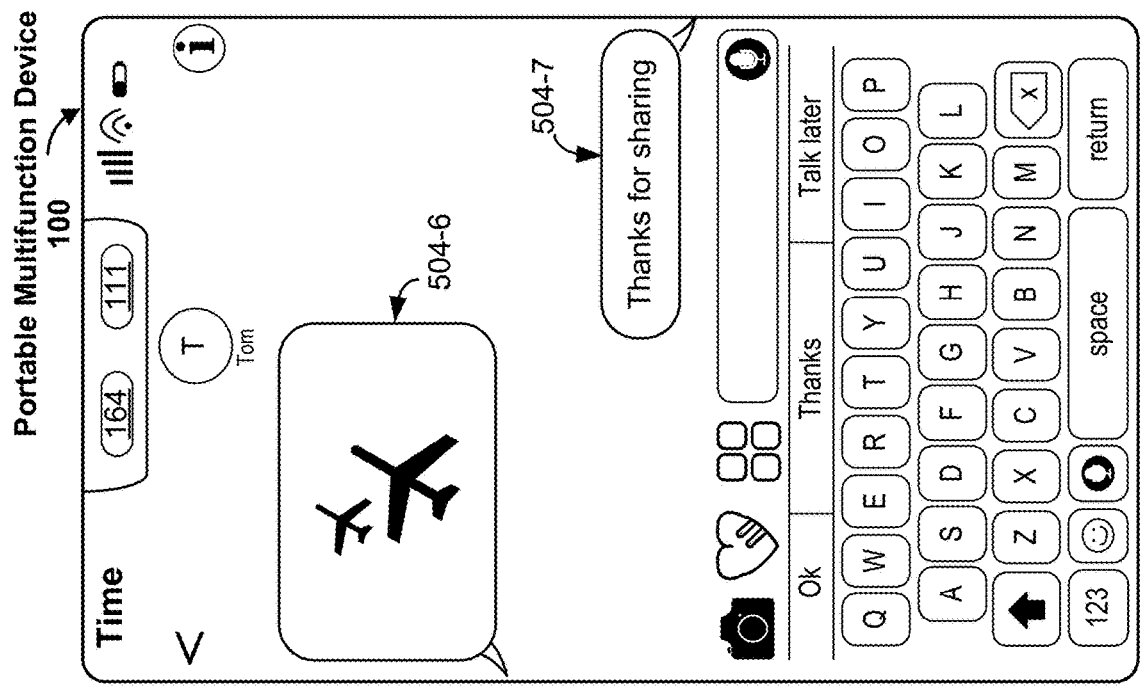
Figure 5D:
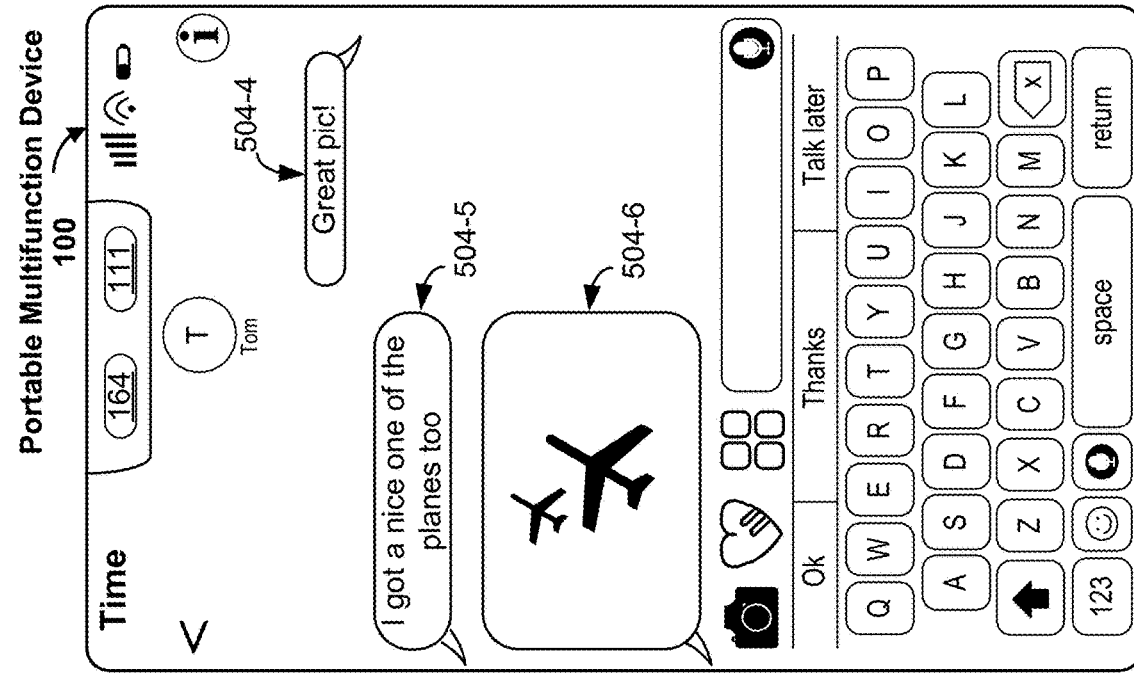

FIGS. 5D and 5D-1 illustrate additional portions of the message thread between the user of device 100 and Tom. For example, device 100 receives additional messages from Tom (e.g., message 504-5 and message 504-6). For example, as device 100 receives (e.g., and/or sends) additional messages, the messages are displayed below previously received and/or sent messages in the message thread. FIG. 5D illustrates another example of device 100 receiving a media item (e.g., a photo of planes) within message 504-6.

FIG. 5D-1 illustrates that, in response to the user of device 100 sending a message 504-7, message 504-7 is also displayed by the messaging application in the conversation transcript of the message thread. In some embodiments, the displayed conversation transcript includes a chronologically ordered presentation of the messages in the message thread and is scrollable by the user, e.g., using swipe gestures on the device's touch-sensitive surface, enabling the user to scroll to user-selected portions of the message thread.

Figures 1, 5E:
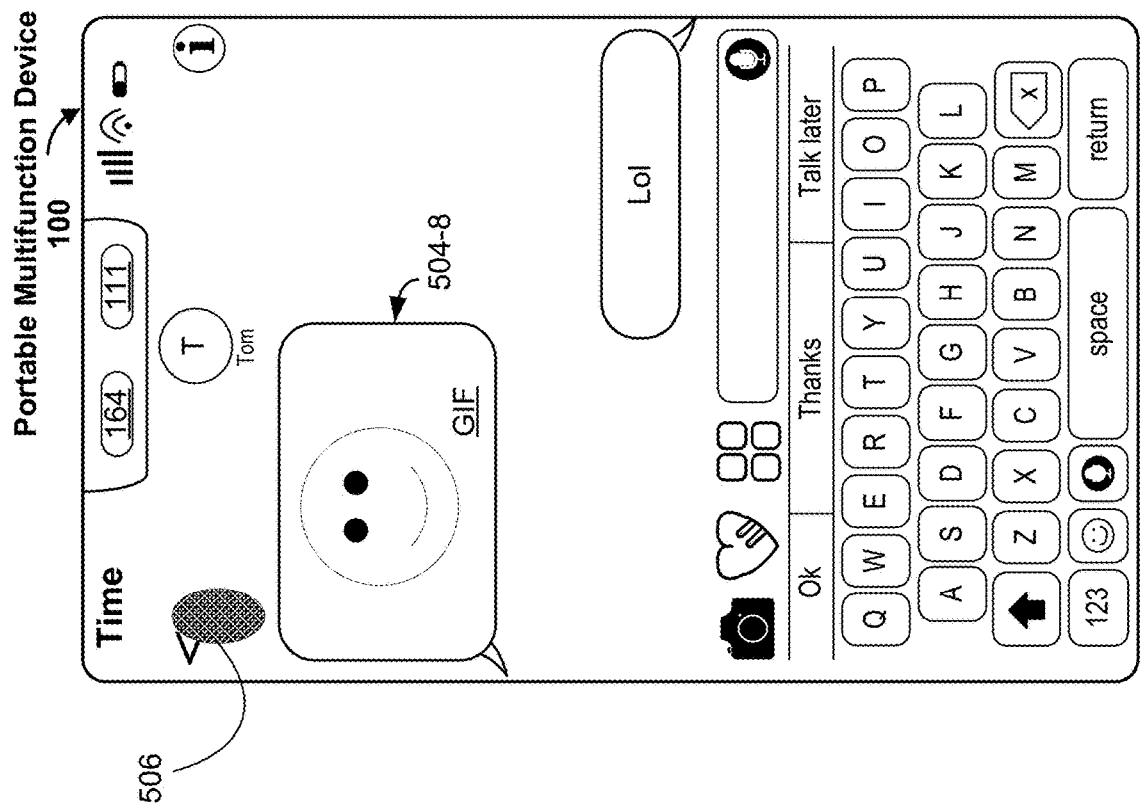
Figure 5E:
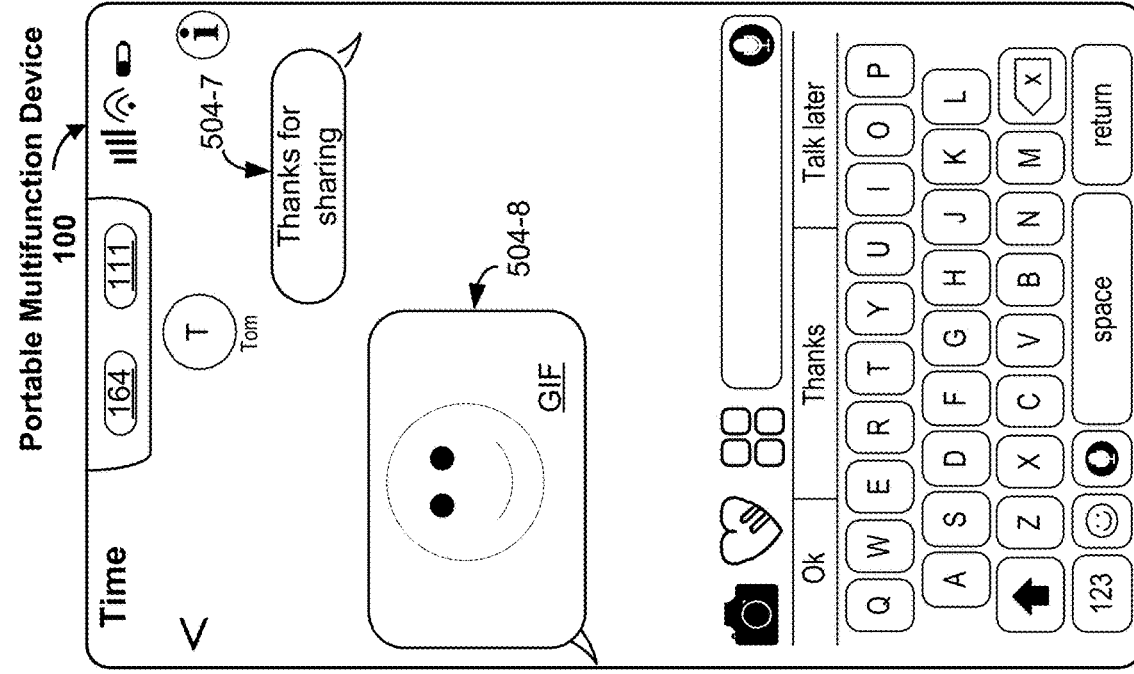

FIG. 5E illustrates another example of a message 504-8 received, by device 100, from Tom in the messaging application. Message 504-8 includes another type of media item (e.g., a GIF). It will be understood that any combination of media items can be received and/or sent using the messaging application, including photos, videos, GIFs, audio messages, etc.

FIG. 5E-1 illustrates user input 506 selecting a back control within messaging application. In some embodiments, in response to detecting selection of the back control, device 100 updates display of the messaging application to show representations of a plurality of message threads (e.g., stored conversation histories), as illustrated in FIG. 5F.

Figure 5G:
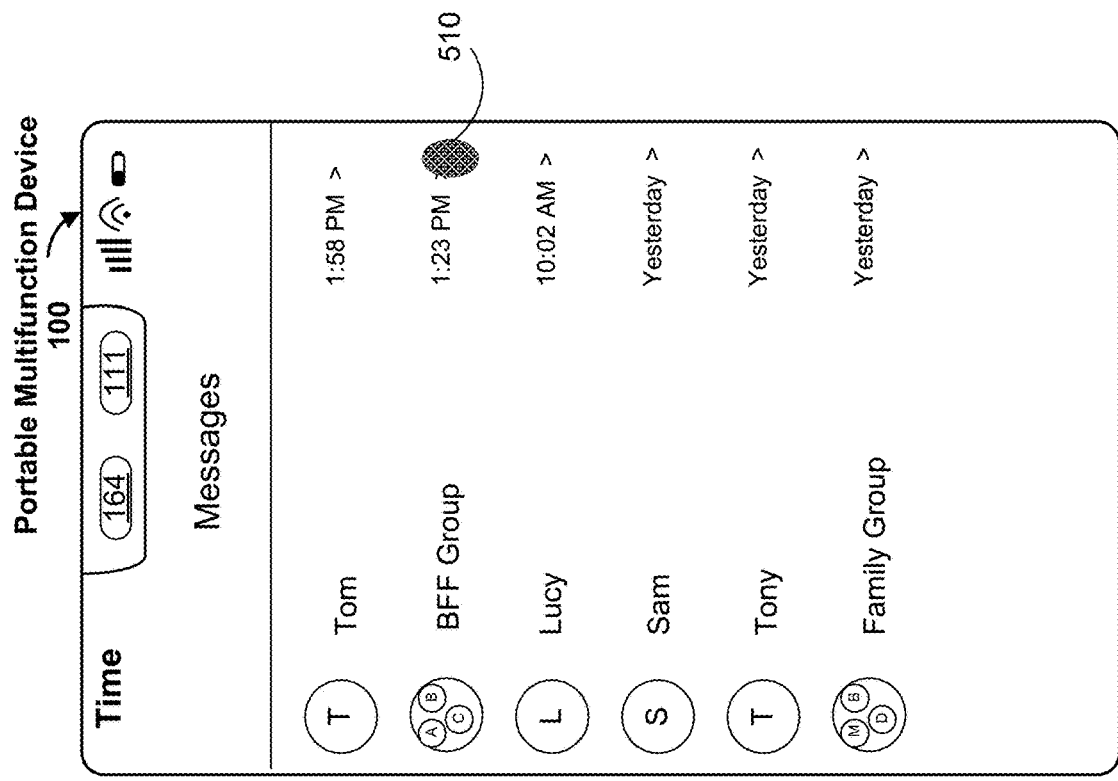
Figure 5F:
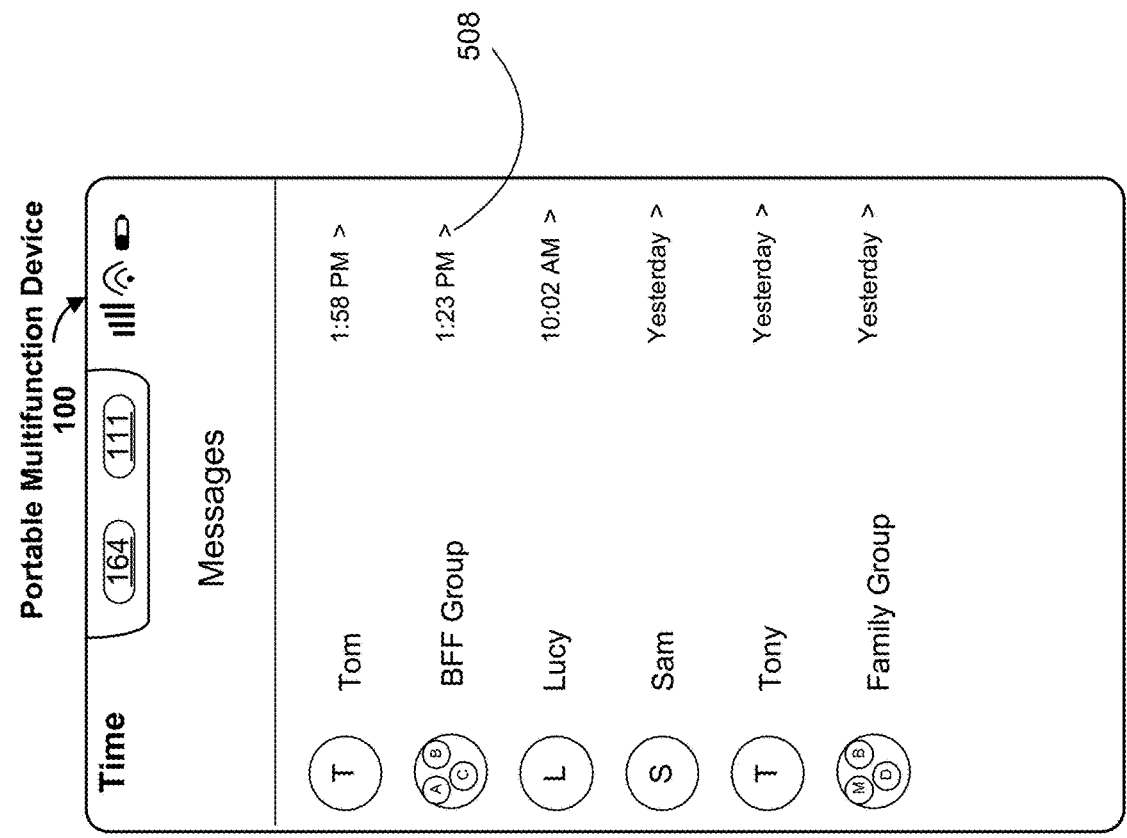

For example, FIG. 5F illustrates a plurality of representations of message threads (e.g., where the representation of each message thread corresponds to a distinct conversation history). For example, FIG. 5F illustrates a representation of a message thread for Tom, a representation of a message thread for a group message, "BFF Group," a representation of a message thread for Lucy, a representation of a message thread for Sam, a representation of a message thread for Tony, and a representation of a message thread for a second group message, "Family Group." In some embodiments, group message threads include three or more participants, including two or more "additional" users (e.g., in addition to the user of device 100). In some embodiments, the messaging application displays, for each message thread, a time indication (e.g., a time stamp such as "1:58 PM" or "Yesterday", etc.) of a last message that was received or sent in the respective message thread. In some embodiments, the user of device 100 is enabled to select a representation of a respective message thread (e.g., by selecting icon 508, or otherwise selecting the representation of the respective message thread) to open the message thread to view the messages in the conversation history and/or to send a new message in the selected message thread.

Figure 5I:
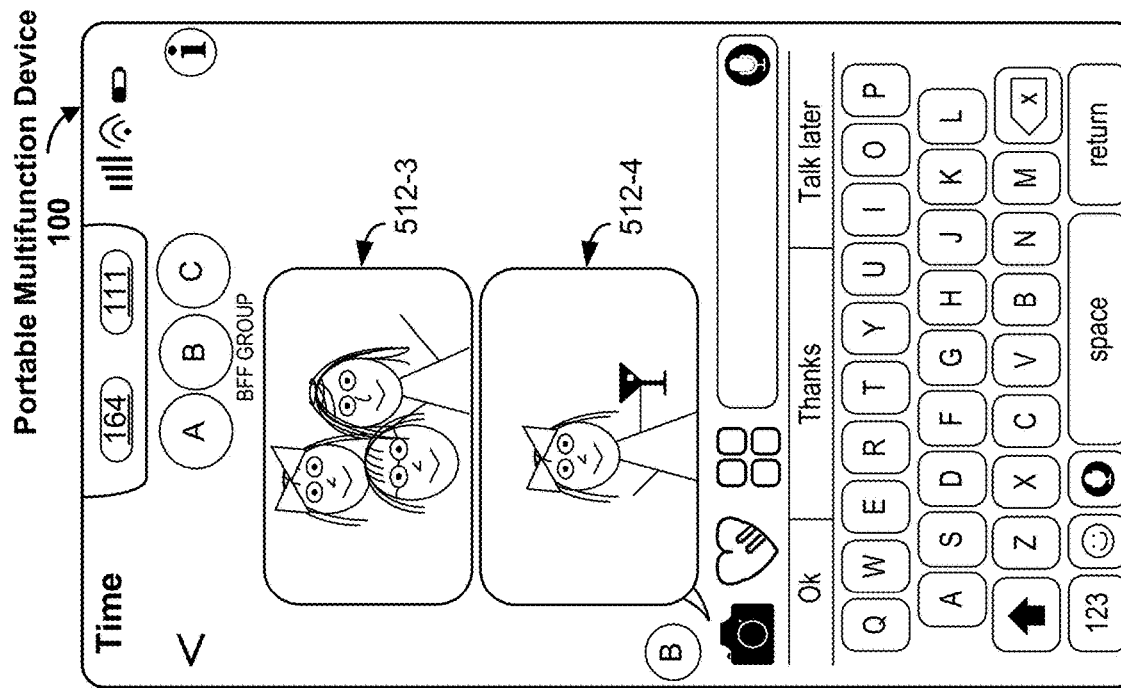
Figure 5H:
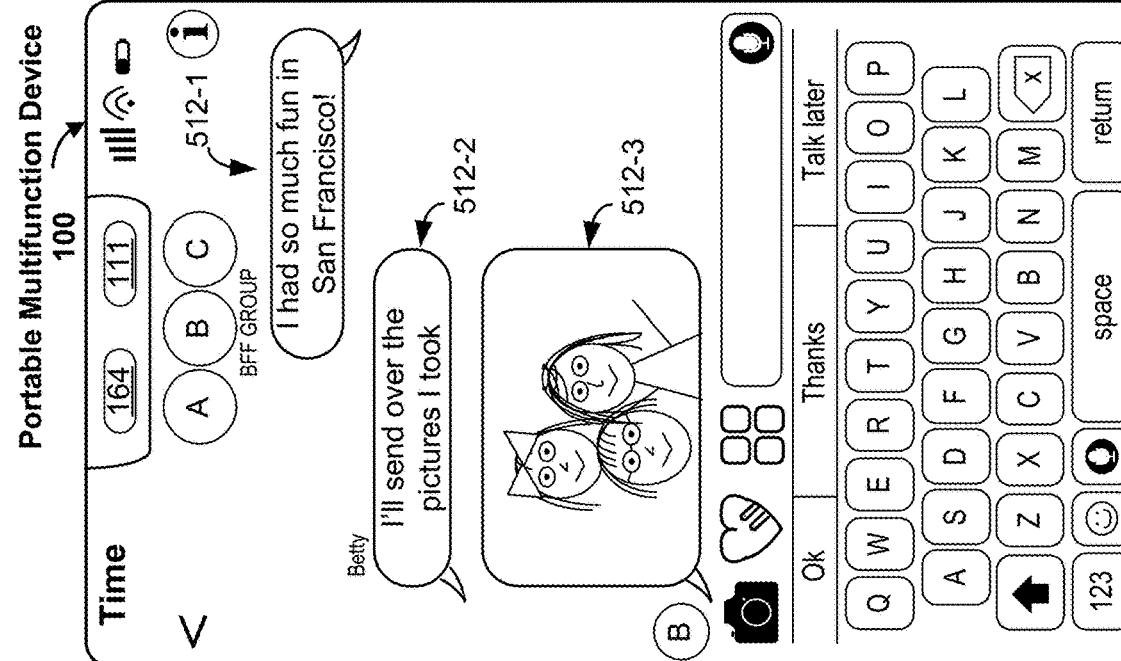

FIG. 5G illustrates user input 510 selecting icon 508 to open the message thread for "BFF Group." In response to detecting selection of the message thread for "BFF Group," messaging application displays a conversation history for "BFF Group," as illustrated in FIG. 5H. As explained above, a group messaging thread includes two or more additional users (e.g., members of the group). For example, "BFF Group" includes 3 additional members (e.g., in addition to the user of device 100), as indicated by "A" "B" and "C" displayed at the top of the group messaging thread (shown in FIG. 5H). For example, "A", "B" and "C" are representations of contacts (e.g., other users) to indicate which individuals are included in the group. For example, Alice ("A"), Betty ("B"), and Catherine ("C") are included in the BFF Group message thread. In some embodiments, the representation of a respective user comprises a picture or emoticon to represent the respective user (e.g., instead of one or more letters).

FIGS. 5H-5I illustrate a plurality of messages within the message thread for "BFF Group." For example, FIG. 5H illustrates a message 512-1 sent by the user of the device 100 and a plurality of messages received by device 100. For example, message 512-2 and message 512-3 are received from Betty (e.g., as indicated by the "B" in the circle and the textual label "Betty" above message 512-2). In some embodiments, in a group message, messages received by device 100 include a label of which user in the group sent the message. In some embodiments, the messages sent in a group message thread are sent to each member of the group (e.g., the messages sent from Betty are sent to the user of device 100, as well as to Alice and Catherine).

FIG. 5I illustrates a plurality of messages received at device 100 from Betty, each message including content, such as message 512-3 and 512-4, which each include a photo (e.g., image). In some embodiments, media items that are received from another user via a communication application (e.g., the messaging application) are referred to herein as shared media items (e.g., shared by another user with device 100). In some embodiments, the shared media items are not automatically saved to device 100. In some embodiments, the shared media items are stored within the message thread (e.g., or otherwise stored within an application in which the media item was shared) without being stored in a media application of device 100 (e.g., wherein the media application allows a user to view, edit and/or store media items). For example, as described in more detail with respect to FIG. 5K, a media application is enabled to display shared media items even when the shared media items are not saved to a media library of the media application.

Figure 5K:
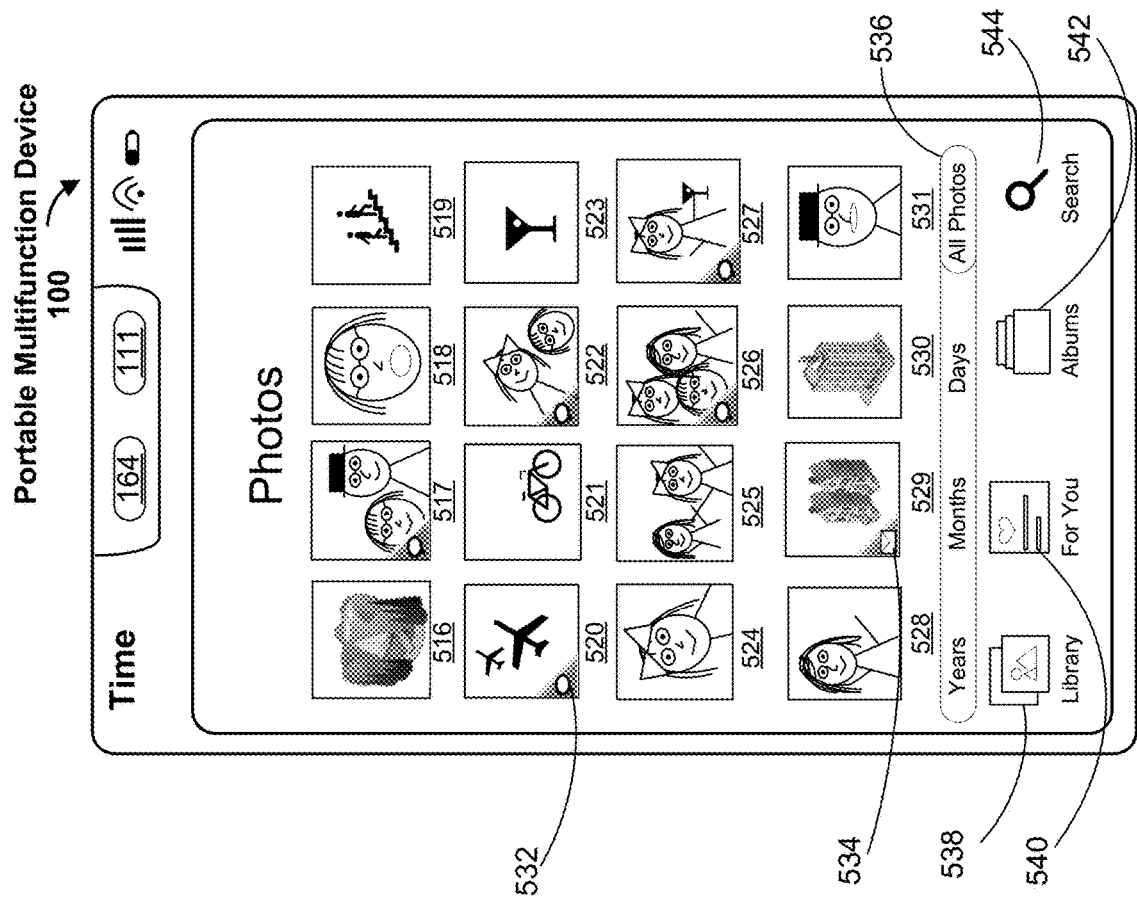
Figure 5J:
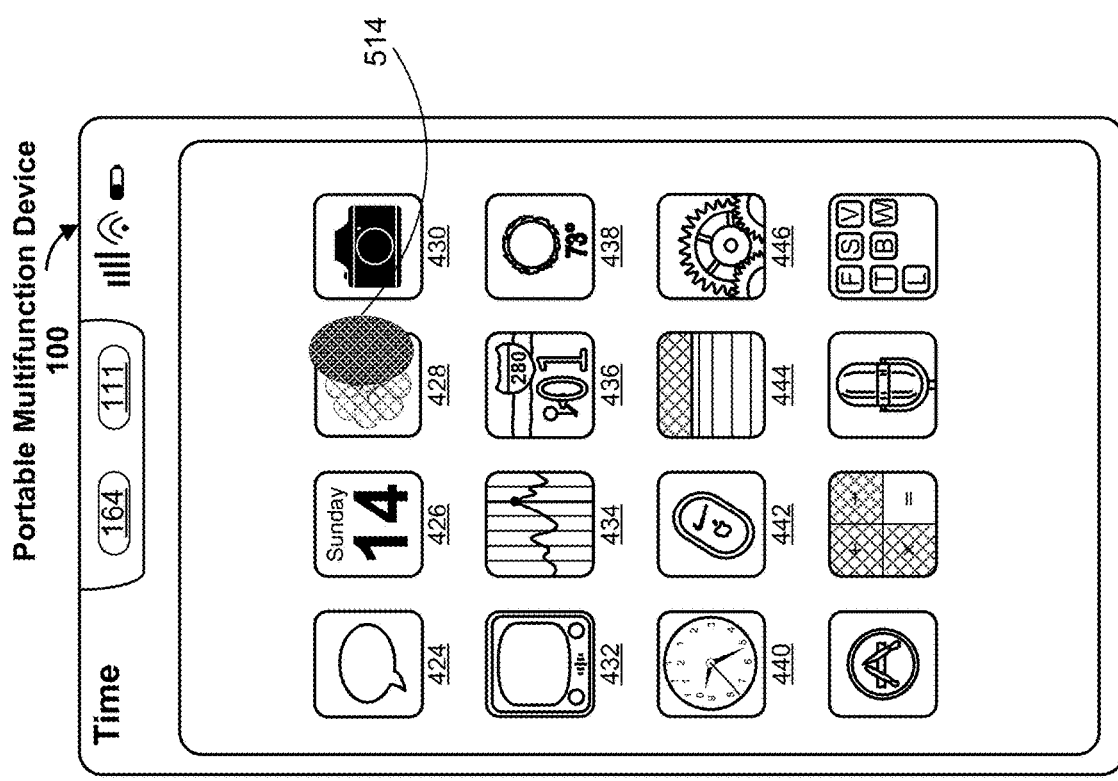

FIG. 5J illustrates an example user interface of device 100, as explained with reference to FIGS. 4A and 5A. In some embodiments, the user interface includes icon 428 for opening (e.g., launching, initiating execution, or resuming execution of) a photos application (e.g., corresponding to image management module 144). In some embodiments, in response to device 100 detecting user input 514 (e.g., a tap input) on icon 428, the photos application is launched (e.g., opened) and displayed on device 100, as illustrated in FIG. 5K.

FIG. 5K illustrates an example user interface of the photos application. In some embodiments, photos application stores photos (e.g., and/or videos or other media items), including media items captured by device 100, in the memory of device 100. For example, device 100 includes camera application (e.g., represented by icon 430, FIG. 5J) for capturing photos and/or videos using device 100. In some embodiments, the photos and/or videos captured using the camera application are stored locally (e.g., within the memory of device 100) and displayed within the photos application. In some embodiments, the photos application also displays media items that are not stored locally (e.g., within the memory of device 100). For example, the photos application displays media items that are associated with (e.g., stored using) an account of the user of device 100 (e.g., stored at a server system ("in the cloud") to be accessed by the account of the user). In some embodiments, media items that are stored locally at device 100 and/or media items that are stored using the account associated with the user of device 100 are referred to as media items saved to a media library of the user. In some embodiments, the photos application (e.g., or other media application) does not display one or more types of media items. For example, in some embodiments, the photos application does not display GIF images files, sometimes called GIFs, and thus cannot display the GIF that was shared with device 100 (e.g., as described with reference to FIG. 5E). It will be understood that in some embodiments, different media applications (e.g., other than a photos application) display different types of shared media items (e.g., a Music application displays shared musical media items (e.g., songs)). In some embodiments, a single media application displays a plurality of types of shared media items (e.g., the photos application displays shared photos and shared videos).

In some embodiments, displaying the photos application includes displaying an option for filtering display of one or more media items. For example, the device 100 (e.g., using the photos application) is enabled to display "All Photos" 536 (e.g., including all photos in the media library of the user and shared content), or is able to organize photos (e.g., photos in its media library) according to various time periods, such as a year, month, or day in which the media item was captured (e.g., device 100, using the photos application, divides the content into a plurality of distinct sets according to a year, month or day), and displays the media items within a respective grouping (e.g., a user is enabled to select a respective set corresponding to a respective year, month or day). In some embodiments, the photos application further includes navigation options to change the view within the photos application, including "Library" 538, "For You" 540, "Albums" 542 and "Search" 544. For example, the example user interface shown in FIG. 5K corresponds to the "Library" view. In some embodiments, the "Library" view displays a predetermined set of the media items in the media library. In some embodiments, the "Library" view displays media items according to a date and/or time of capture of the media item. For example, device 100, using the photos application, sorts the media items to show the most recently captured media items at the top (or bottom) of a user interface of the photos application. In some embodiments, device 100 sorts the media items based on other display criteria (e.g., relevance criteria).

In the example shown in FIG. 5K, device 100 displays a plurality of media items (e.g., photos 516-531) in the photos application. In some embodiments, one or more of the photos displayed are shared photos (e.g., photos received at device 100 from another user of a distinct device). In some embodiments, the one or more shared photos are displayed concurrently with one or more photos that are not shared photos (e.g., one or more photos that are saved in the media library of the user). In some embodiments, the user is enabled to save a shared photo to the media library of the user. In some embodiments, after the shared photo is saved to the library of the user, the photo is no longer considered a shared photo. In some embodiments, after the shared photo is saved to the media library of the user, the photo continues to be classified as a shared photo, but the indication that the photo is a shared photo is hidden (e.g., while displaying the plurality of media items).

For example, FIG. 5K illustrates shared photo 520 (e.g., which was shared within messaging application by Tom, as explained with reference to FIGS. 5D and 5D-1). In some embodiments, shared photo 520 is displayed with a sharing indication 532 to identify photo 520 as a shared photo. For example, photo 517, photo 526, photo 527, and photo 529 are shared photos (e.g., that have not been saved to the media library of the user), and are thus displayed with sharing indications. In some embodiments, sharing indication 532 comprises an overlay (e.g., a translucent overlay) that is displayed over at least a portion, such as at least one corner, of the photos (e.g., the bottom left corner). In some embodiments, the overlay includes an indication of an application in which the media item was shared. For example, sharing indication 532 includes an icon that corresponds to icon 424 (e.g., for the messaging application) and sharing indication 534 is displayed over photo 529 to indicate that photo 529 was shared using a communication application associated with the envelope icon (e.g., an email application). It will be understood that different icons may be selected to indicate information about the shared media item (e.g., an application in which the media item was shared, information about a user that shared the media item, etc.). It will also be understood that the sharing indication could include information about an individual that shared the media item.

Figure 5M:
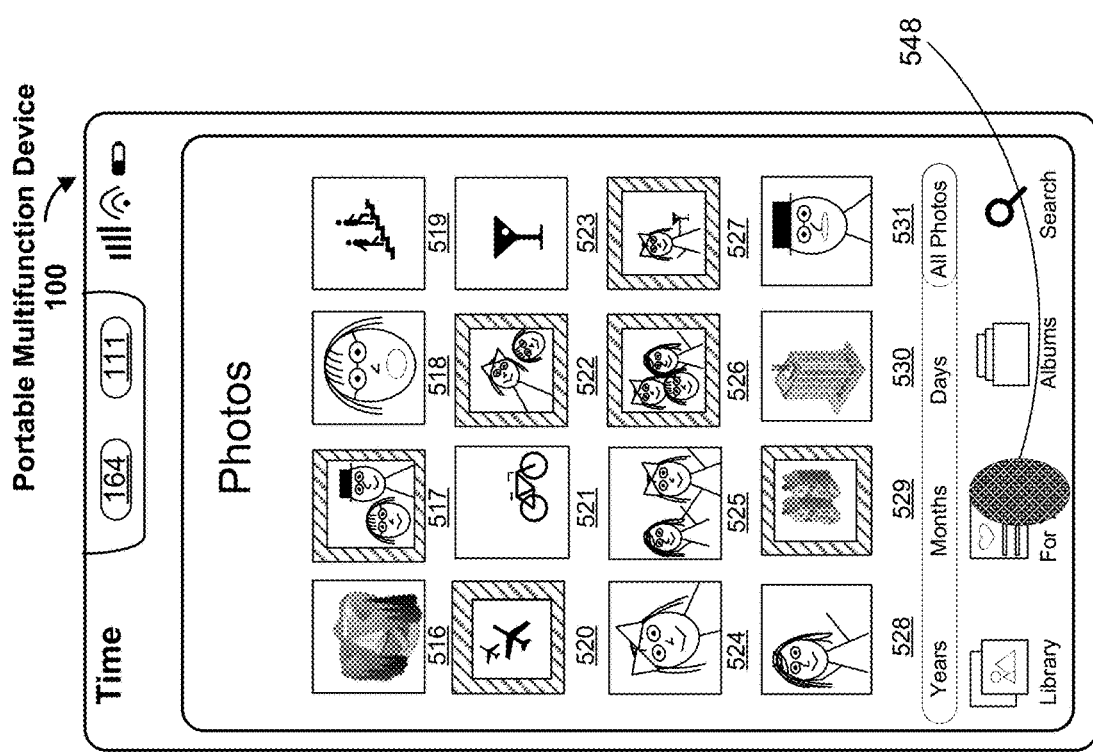
Figure 5L:
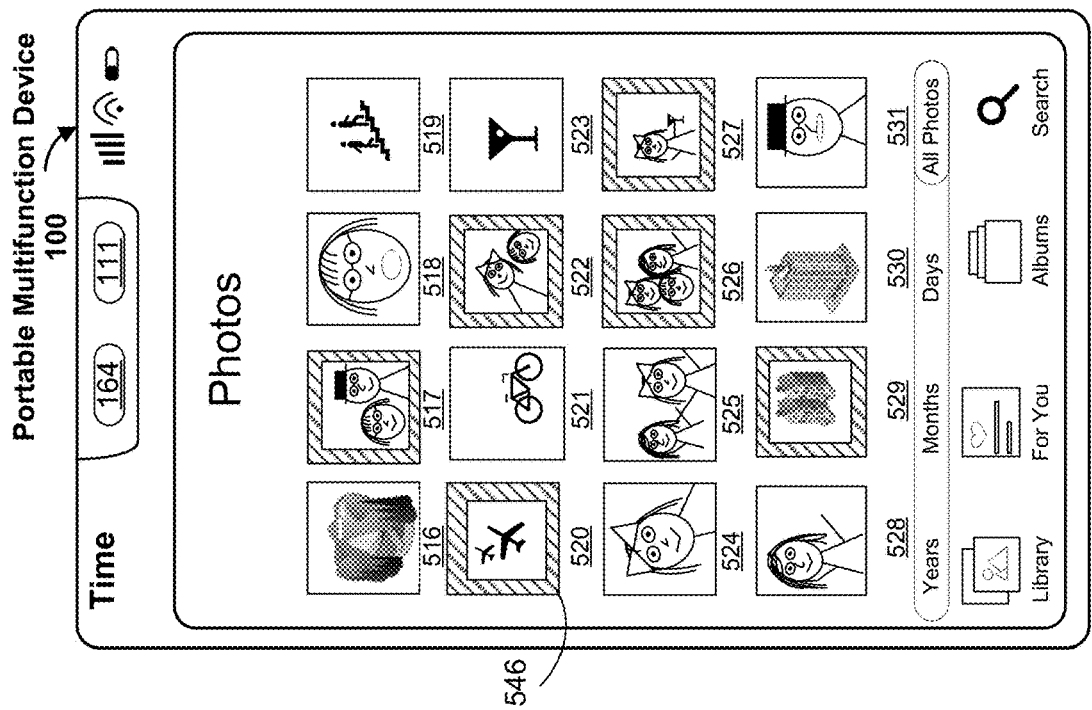

In some embodiments, the sharing indication displayed with a corresponding shared media item comprises a border 546 (e.g., a frame) that is displayed around the shared media item, as illustrated in FIG. 5L. In some embodiments, the border comprises a blurred visual effect that is applied to the shared media item, and an unmodified (e.g., not blurred) version of the media item is displayed as a smaller thumbnail (e.g., as compared to the size of thumbnails of media items in the media library) that fits within the border.

FIG. 5M illustrates user input 548 selecting "For You" navigation icon. In response to user input 548, device 100 updates display of photos application to display the user interface illustrated in FIG. 5N.

Figure 5O:
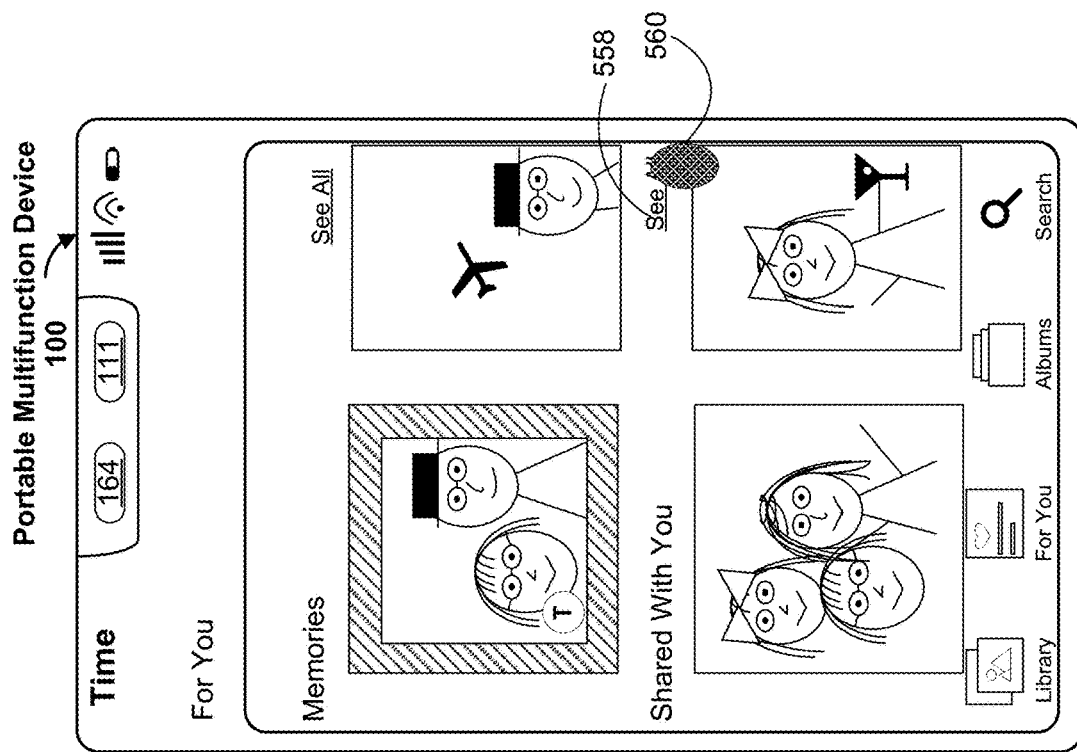
Figure 5N:
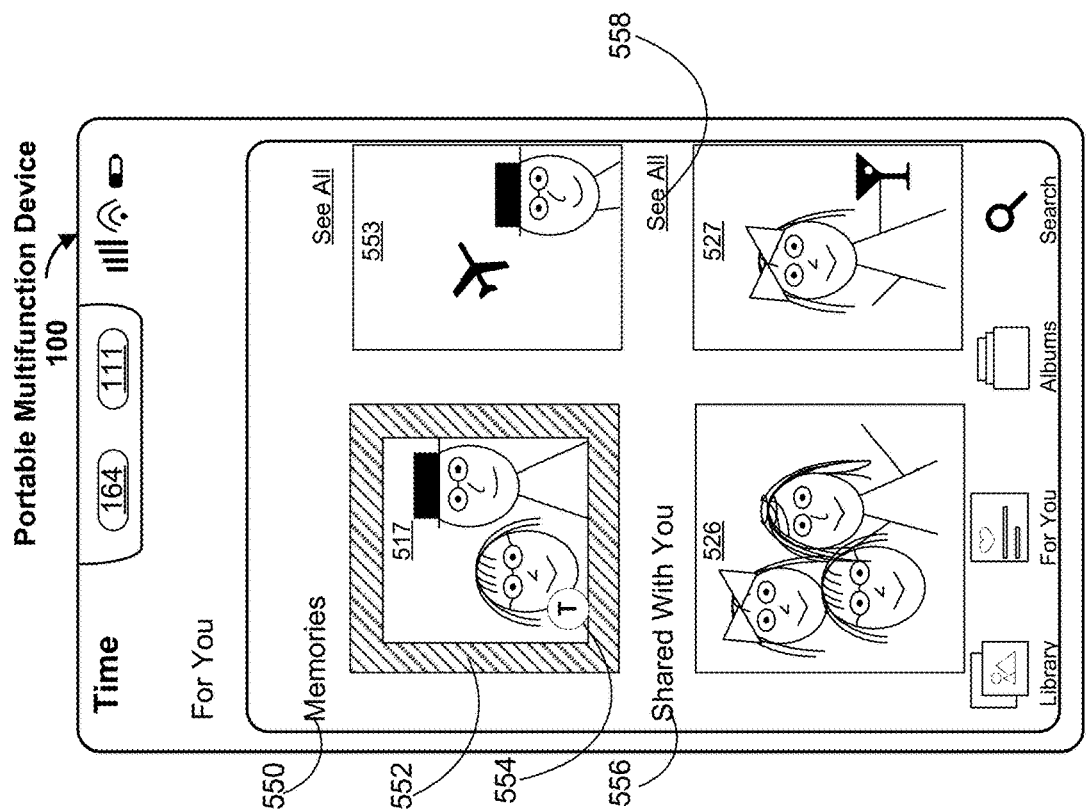

FIG. 5N illustrates a "For You" user interface in accordance with some embodiments. For example, the "For You" user interface includes a plurality of sections that display media items selected by device 100 as being relevant to the user. For example, the "For You" user interface includes content curated (e.g., syndicated) for the user, including displaying media items in "Memories" section 550 of the user interface and displaying media items in "Shared With You" section 556 of the user interface. In some embodiments, "Memories" section 550 includes both shared media items and media items that were not shared (e.g., media items that are saved to the media library of the user). In some embodiments, shared media items that are displayed in "Memories" section 550 are optionally displayed with an indication that the media items are shared media items, for example, by displaying the shared media item with border 552 and/or an indication of the user 554 that shared the media item (e.g., "T" for Tom because photo 517 was shared by Tom using the messaging application). In some embodiments, "Shared With You" section 556 includes one or more shared media items, including photos 526 and 527 (e.g., which are shared by Betty in BFF Group using the messaging application). In some embodiments, media items displayed in the "Shared With You" section are not displayed with an indication that the media items are shared media items (e.g., without border 552 or indication of user 554) because each media item that is displayed within "Shared With You" section 556 is a shared media item (e.g., and thus the media items do not need to be distinguished from each other).

In some embodiments, a user-selectable option to "See All" is displayed with each section of the "For You" user interface. For example, "See All" option 558 is displayed for the "Shared With You" section. FIG. 5O illustrates receiving user input 560 (e.g., a tap input) selecting the "See All" option 558. In response to detecting selection of the "See All" option 558, device 100 updates display of the user interface in which the shared content is displayed without displaying non-shared content, as illustrated in FIG. 5P.

Figure 5Q:
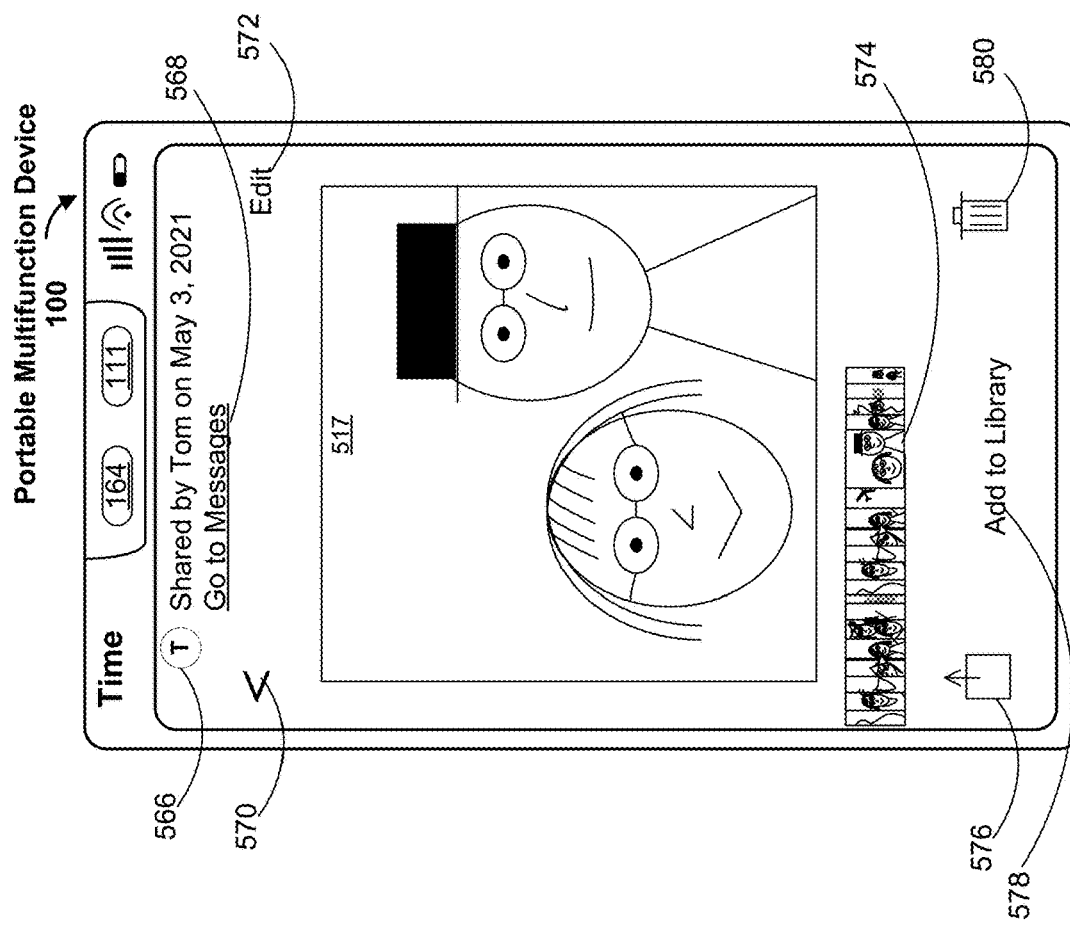
Figure 5P:
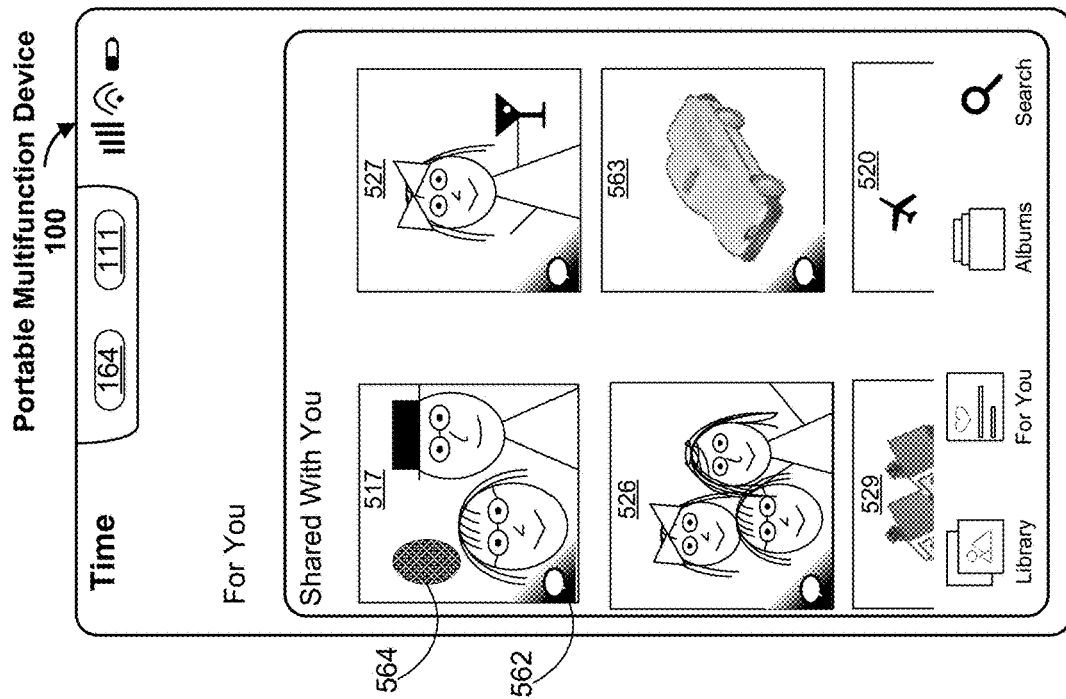

FIG. 5P illustrates an example user interface for viewing all of the media items in the "Shared With You" section (e.g., a user is enabled to scroll down to continue viewing media items in the "Shared With You" section). In some embodiments, the shared media items are optionally displayed with sharing indication 562 (e.g., which is optionally the same as indication 532, described in FIG. 5K, or is a sharing indication distinct from indication 532). In some embodiments, the shared media items in the "Shared With You" user interface are displayed without sharing indication 562 (not shown). In some embodiments, the "Shared With You" user interface includes display of one or more media items that are not displayed in the "All Photos" view described with reference to FIG. 5K. For example, the "All Photos" view displays one or more media items (e.g., shared media items) that meet display criteria (e.g., relevance criteria) without displaying one or more media items (e.g., shared media items) that do not meet the display criteria. For example, the display criteria is based on whether device 100 determines that the media item is relevant to the user, including determining one or more of, whether the user of device 100 (e.g., or a device associated with the user of device 100) was within a predefined proximity to the location of where the media item was captured, whether the user of device 100 is in the media item, whether an individual in the media item appears in other media items in the media library of the user, and any other criteria that the device 100 would use to determine whether the media item is relevant to the user. For example, FIG. 5P illustrates shared photo 563, which was not displayed in the "All Photos" view shown in FIG. 5K (e.g., because shared photo 563 did not satisfy the display criteria). FIG. 5P further illustrates user input 564 (e.g., a tap input) selecting photo 517.

In response to detecting user input 564 selecting photo 517, device 100 updates display of the photo application to display an enlarged representation of photo 517, as illustrated in FIG. 5Q. The updated display illustrated in FIG. 5Q further includes displayed sharing information 566, including an indication of a user that shared the selected photo (e.g., "Shared by Tom"), a date on which the media item was shared (e.g., "May 3, 2021") and/or an application that was used to share the media item (e.g., "Messages"). In some embodiments, device 100 displays a user-selectable option 568 to allow the user to open the application in which the media item was shared (e.g., "Go to Messages"). In some embodiments, device 100 further displays back option 570 to enable the user to navigate back to the "Shared With You" user interface and an "edit" button 572 that, when selected, allows the user to edit the selected photo (e.g., using editing options, including one or more (or two or more, or a subset of) options to: crop, magnify, modify colors, apply filters, straighten, and/or add annotations, to the media item). In some embodiments, device 100 also displays a navigation bar 574 that includes representations (e.g., thumbnails) of the media items displayed in the "All Photos" view. In some embodiments, navigation bar 574 allows the user to navigate (e.g., by swiping along the navigation bar 574) between different media items (e.g., media items that are included in the media library and/or media items that are displayed in the "Shared With You" user interface shown in FIG. 5P). In some embodiments, navigation bar 574 displays a representation of the selected (e.g., enlarged) photo (e.g., photo 517) that is larger, and optionally displayed at a different magnification, than the representations of the other media items displayed in the navigation bar 574.

In some embodiments, device 100 displays a first set of controls, including a share control 576 to allow the user to share (e.g., using one or more communication applications) the enlarged media item, an Add to Library control 578 to allow the user to save (e.g., add) the enlarged media item to the media library of the user, and a delete control 580 for removing (e.g., deleting) the enlarged media item from the set of photos available to be displayed in the photos application.

Figure 5S:
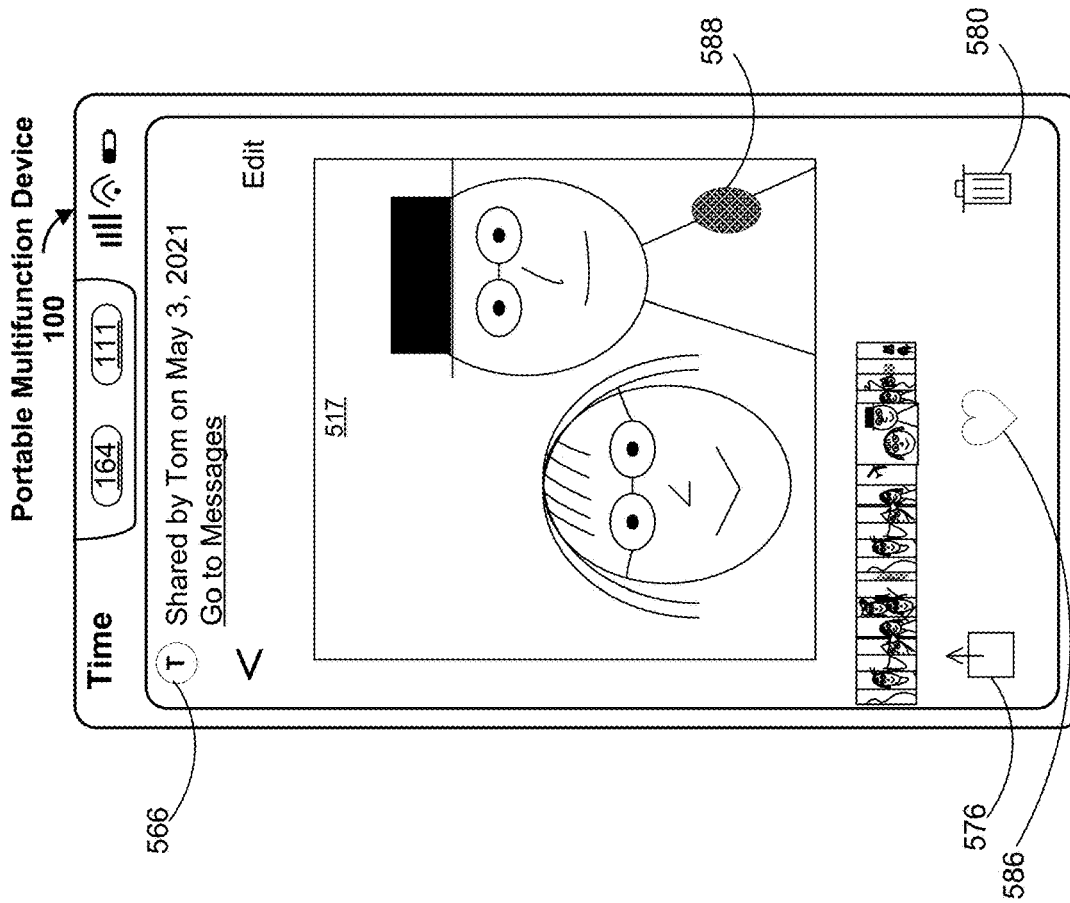
Figure 5R:
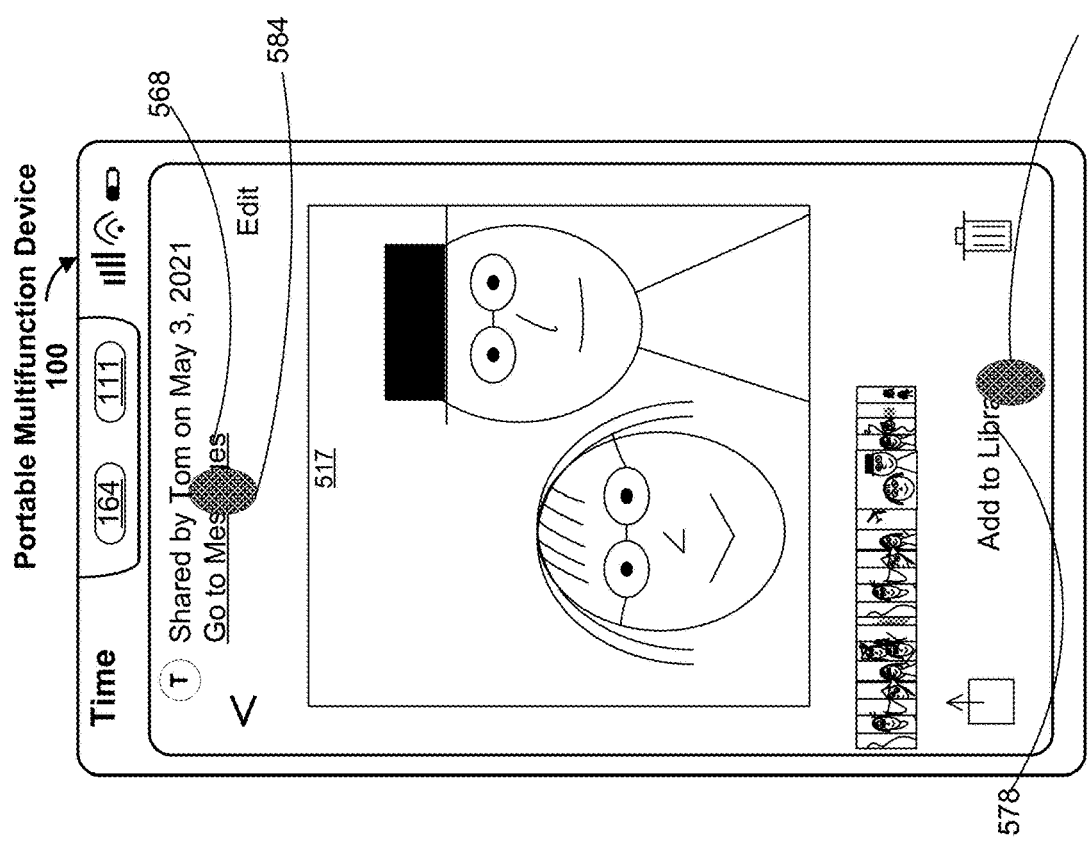

FIG. 5R illustrates receiving a first user input 582 (e.g., a tap input) on Add to Library control 578. In response to receiving first user input 582, device 100 adds the selected media item to the user's media library (e.g., the media library of the photos application), and optionally displays the user interface illustrated in FIG. 5S. For example, device 100 updates the first set of controls to replace Add to library control 578, shown in FIG. 5R, with favorite control 586, shown in FIG. 5S. For example, because photo 517 has now been added to the media library of the user, device 100 ceases display of the Add to Library control. In some embodiments, the sharing information 566 displayed in FIG. 5S is optionally not displayed after the selected media item has been added to the media library.

In some embodiments, as shown in FIG. 5S, device 100 detects user input 588 (e.g., a tap input), and in response to user input 588, ceases display of all of the user interface elements (e.g., as illustrated in FIG. 5T) other than the enlarged photo 517. For example, device 100 forgoes displaying navigation bar 574, the set of controls 576, 586, and 580, back button 570 and edit button 572, and/or sharing information 566. In some embodiments, a user input (e.g., a tap input) detected on the enlarged photo toggles display of one or more of the user interface elements to be displayed or not. For example, in response to detecting a user input on enlarged photo 517 in FIG. 5T, the user interface elements are redisplayed, as shown in FIG. 5S.

FIG. 5R further illustrates receiving a second user input 584 (e.g., a tap input) on "Go to Messages" 568. In response to second user input 584, device 100 displays the user interface illustrated in FIG. 5U. For example, device 100 opens messaging application and displays the message thread in which the enlarged photo 517 was shared (e.g., the message thread with Tom). In some embodiments, device 100 displays the portion of the message thread in which the media item was shared (e.g., message 504-3). In some embodiments, device 100 displays a most recent portion of the message thread (e.g., that does not include the message in which the enlarged photo 517 was shared). In some embodiments, in response to second user input 584, device 100 displays a preview of the messaging application (e.g., without switching to the messaging application). For example, a portion, less than all, of the user interface illustrated in FIG. 5R is updated to display the message thread with Tom (e.g., instead of opening the message thread in the messaging application).

In some embodiments, user input 588 is detected on an option to go Back to Photos from the messaging application, as illustrated in FIG. 5U. In response to user input 588, device 100 displays the user interface illustrated in FIG. 5V (e.g., returns to the photos application, and optionally displays the last user interface of the photos application that was displayed prior to the device transitioning to displaying the messaging application).

Figure 5W:
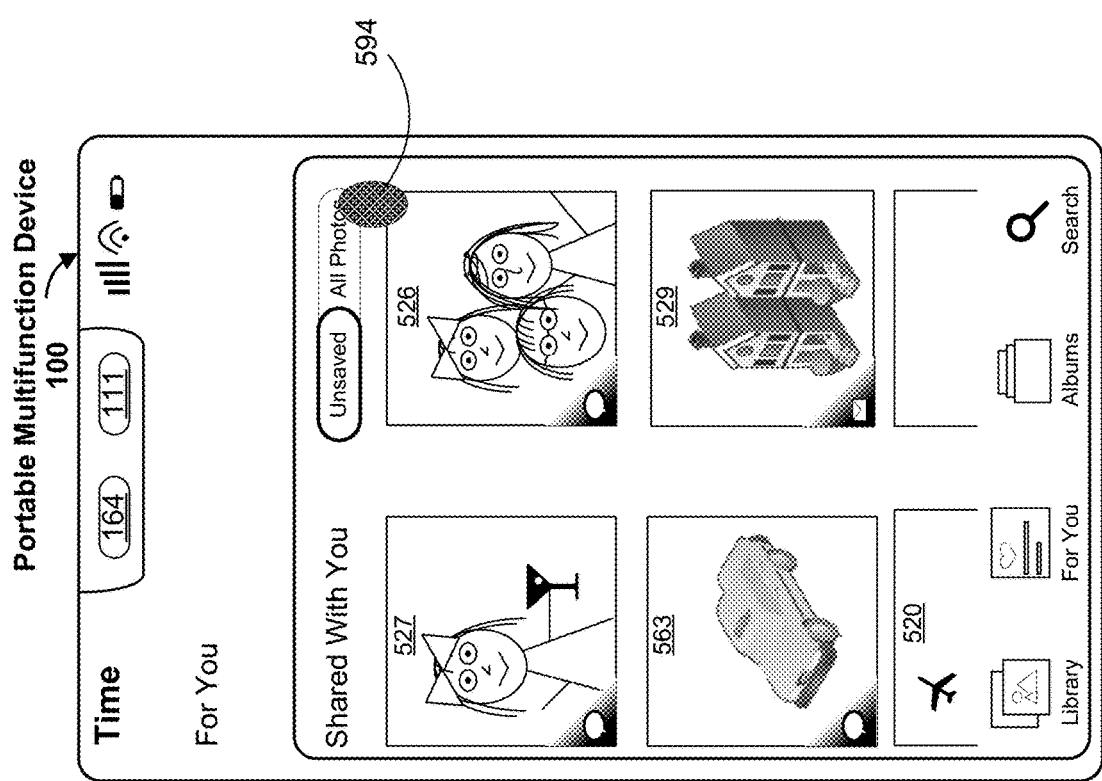
Figure 5V:
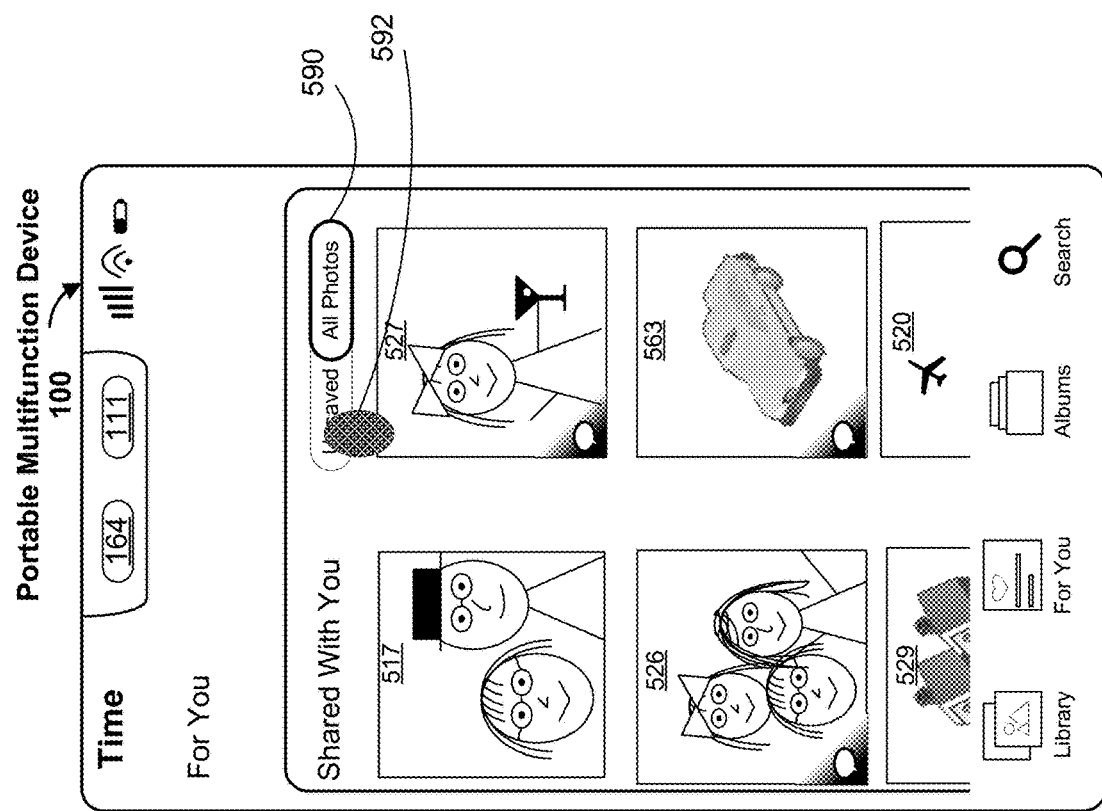

In some embodiments, as illustrated in FIG. 5V, after photo 517 has been added to the user's library, device 100 ceases display of sharing indication 562 (e.g., shown in FIG. 5P). Accordingly, a user is able to distinguish between shared photos that have been added by the user to the user's media library and shared photos that have not been added to the user's media library (e.g., which the device continues to display with sharing indications, such as sharing indications on the corner of the photos).

In some embodiments, the "Shared With You" user interface illustrated in FIG. 5V includes an option to filter the displayed media items to only display unsaved media items, or to display all media items that were shared (e.g., whether the respective media item has been added to the user's library or not). For example, toggle switch 590 provides the user with an option to select whether the photos that the device displays in the "Shared With You" user interface includes "All Photos," including photo 517 that has been saved to the media library of the user, or includes only unsaved shared photos 527, 526, 563, etc. In some embodiments, device 100 receives user input 592 selecting to toggle to display unsaved photos in the "Shared With You" user interface without displaying shared content that has been added to the user's media library. In response to user input 592, device 100 displays the user interface illustrated in FIG. 5W, which displays unsaved shared media items (e.g., photos 527, 526, 563,529, etc.) without displaying shared content that has been saved to the user's media library (e.g., photo 517 is not displayed in FIG. 5W). FIG. 5W further illustrates receiving user input 594 on toggle switch 590 requesting to toggle back to displaying all photos, which is illustrated in FIG. 5X.

Figure 5Y:
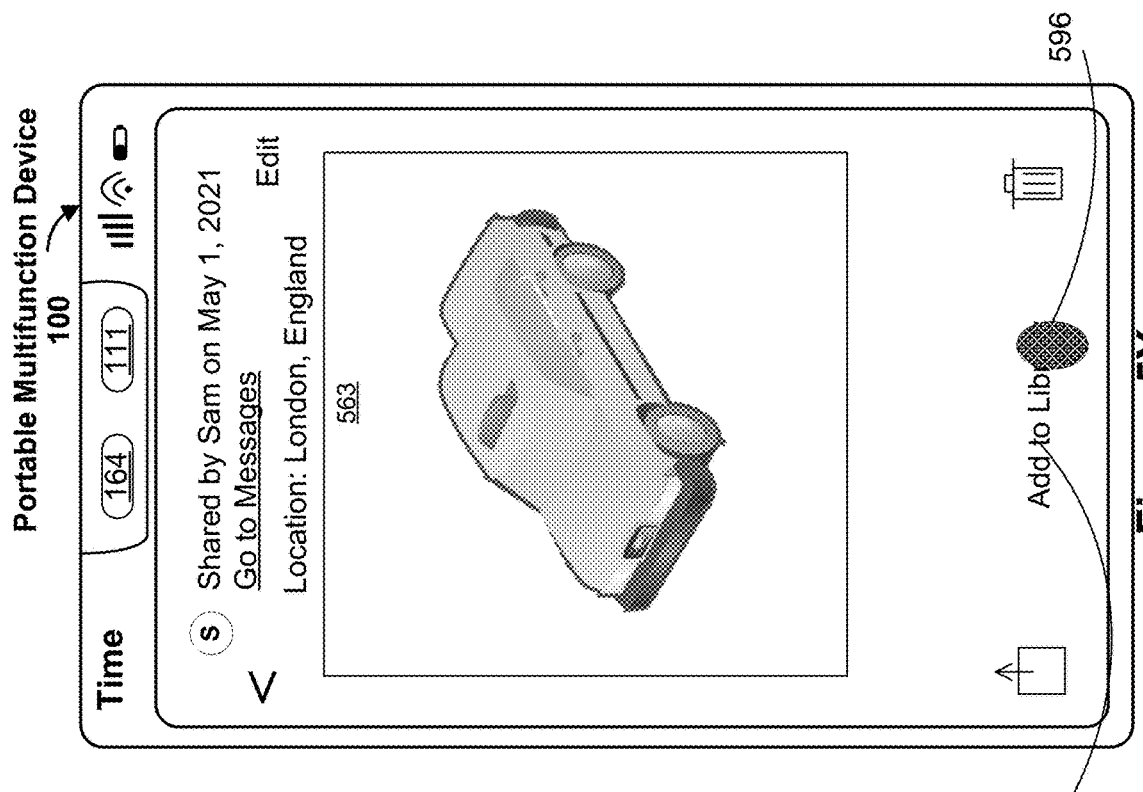
Figure 5X:
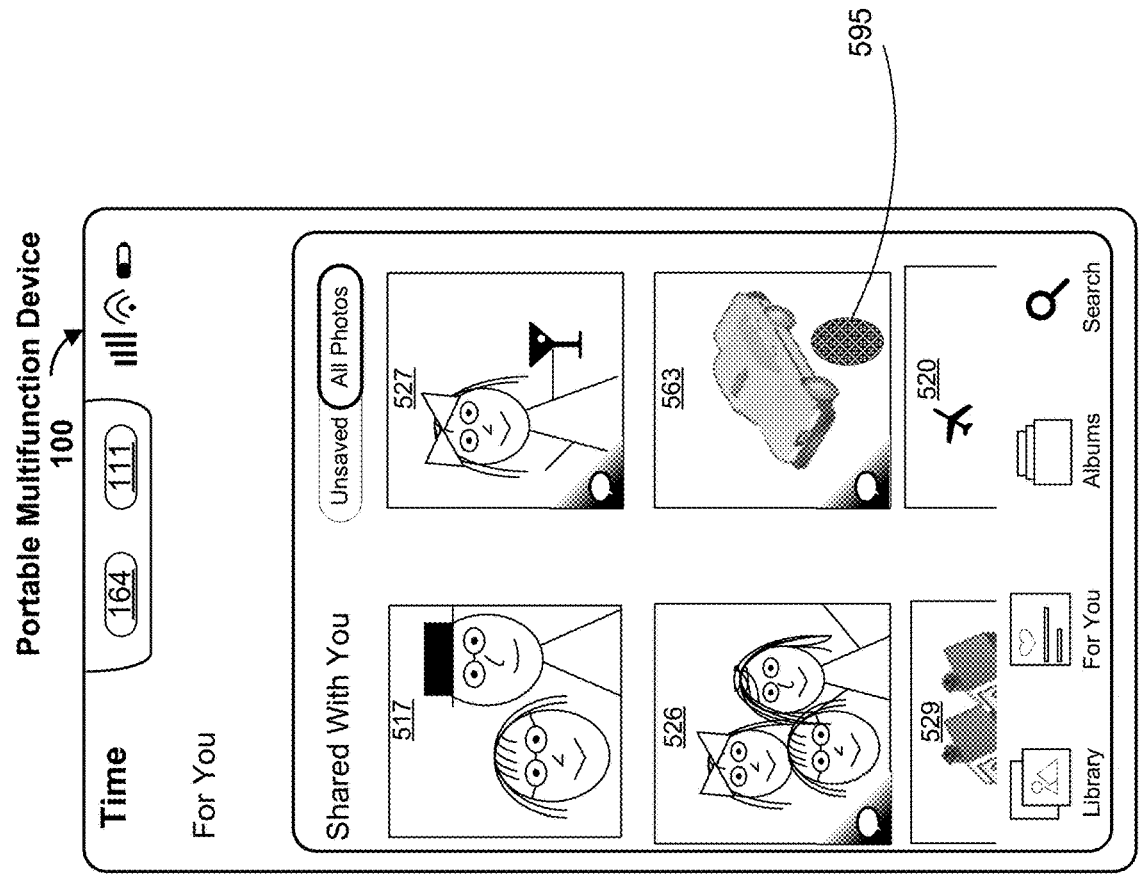
Figure 5A:
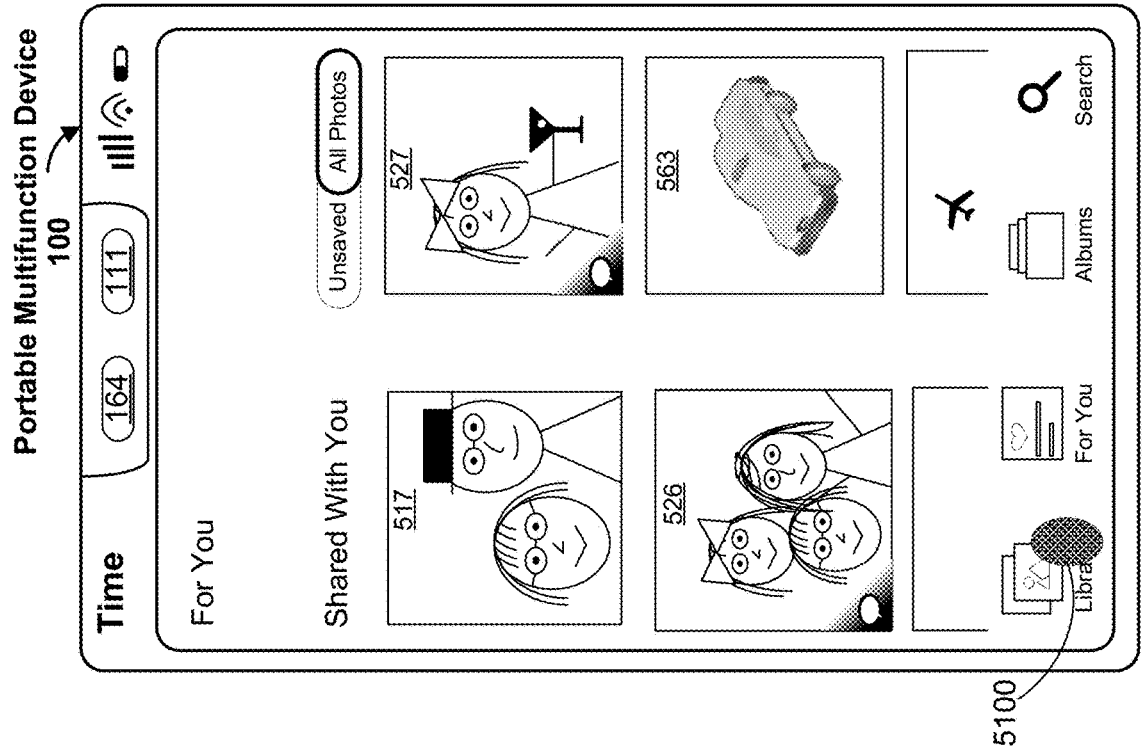

FIG. 5X illustrates receiving user input 595 (e.g., a tap input) on photo 563. In some embodiments, in response to detecting user input 595, device 100 displays an enlarged representation of photo 563, as illustrated in FIG. 5Y. As noted above, in some embodiments, one or more media items (e.g., photo 563) are not displayed in the "All Photos" view of the media library (e.g., as illustrated in FIG. 5K) based on display criteria (e.g., the one or more media items that are not displayed do not satisfy the display criteria). In some embodiments, the one or more media items that are not displayed in the "All Photos" view are displayed in the "Shared With You" user interface, which includes all media items (e.g., photos) that were shared with device 100 (e.g., including shared media items that do not satisfy the display criteria). In some embodiments, navigation bar 574 is optionally not displayed for enlarged media items that do not appear in the "All Photos" view (e.g., the navigation bar 574 allows a user to navigate between photos and shared photos displayed in the "All Photos" view, but photo 563 is not displayed in the "All Photos" view).

Figure 5Z:
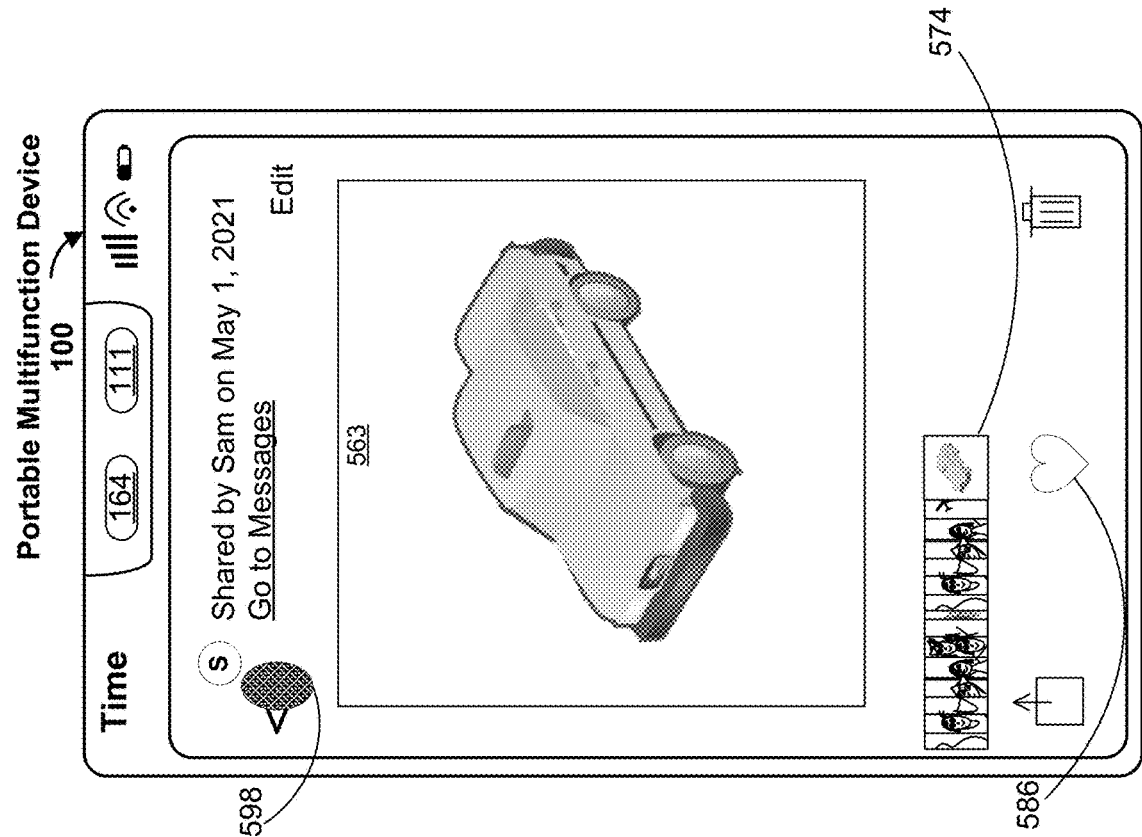
Figure 5A:
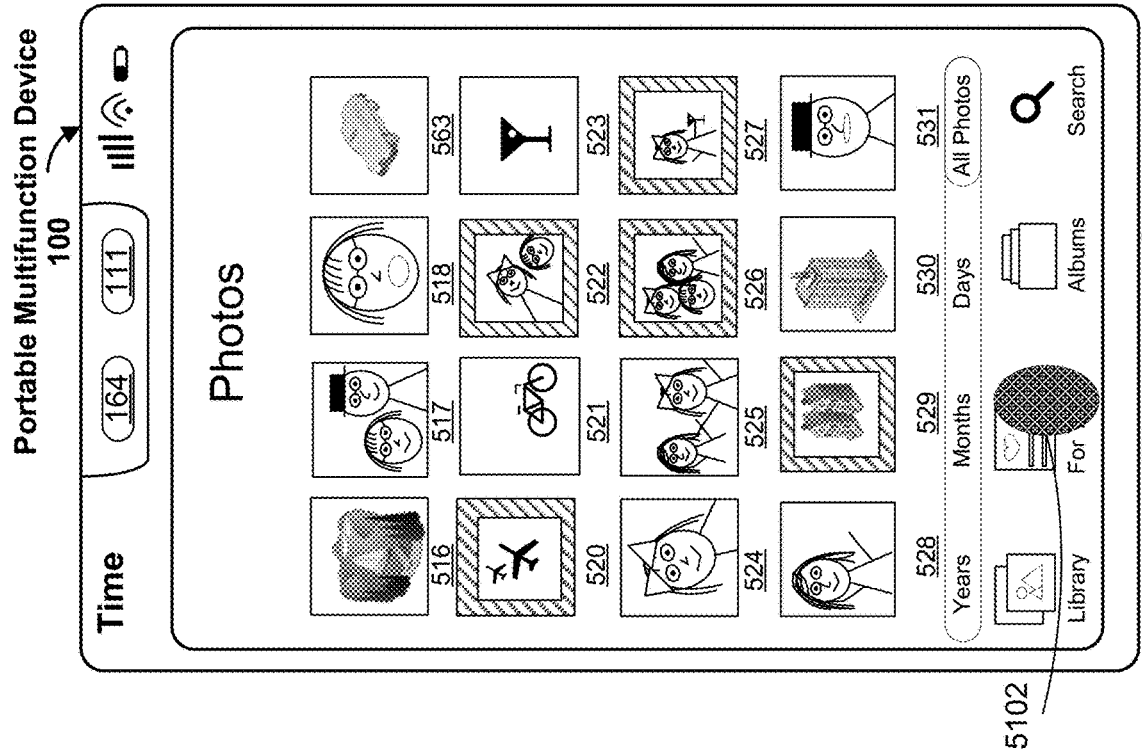
Figure 5A:
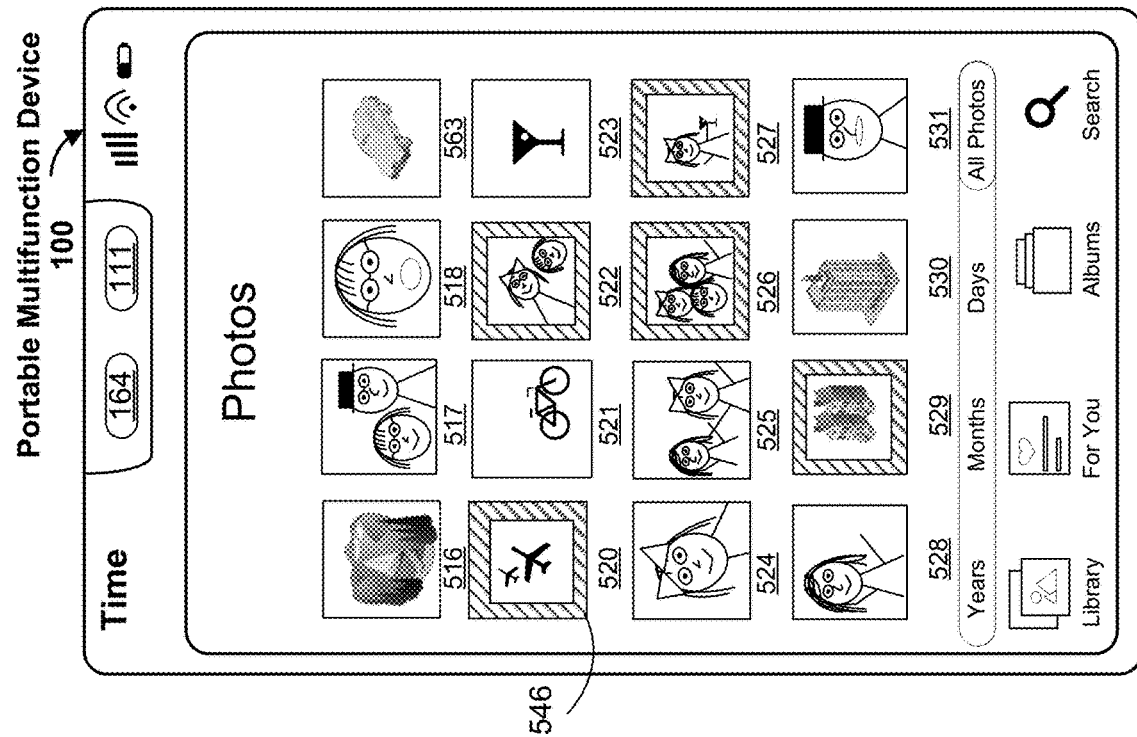
Figure 5A:
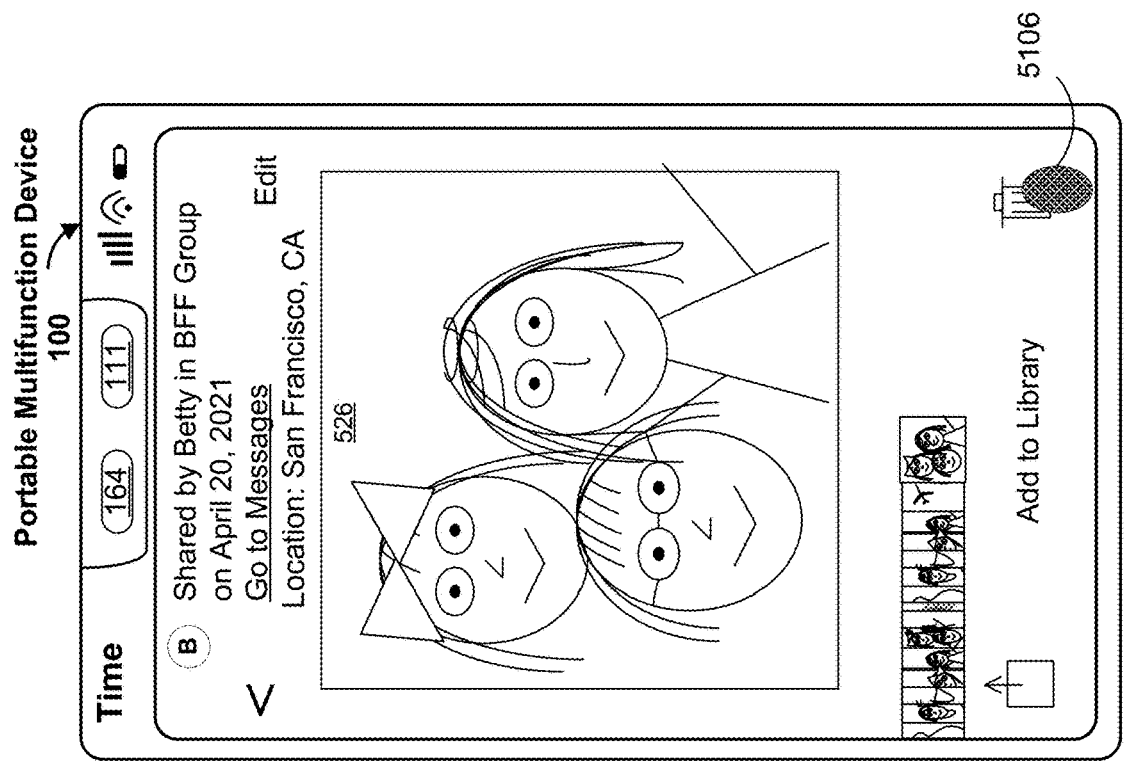
Figure 5A:
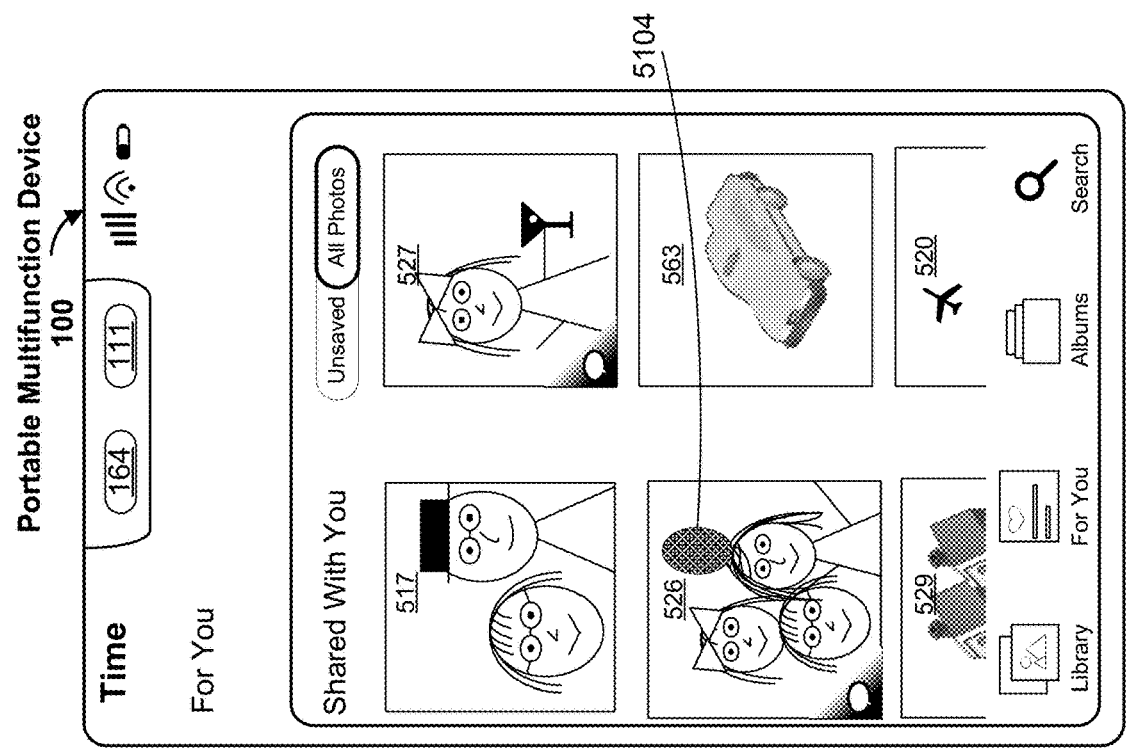
Figure 5A:
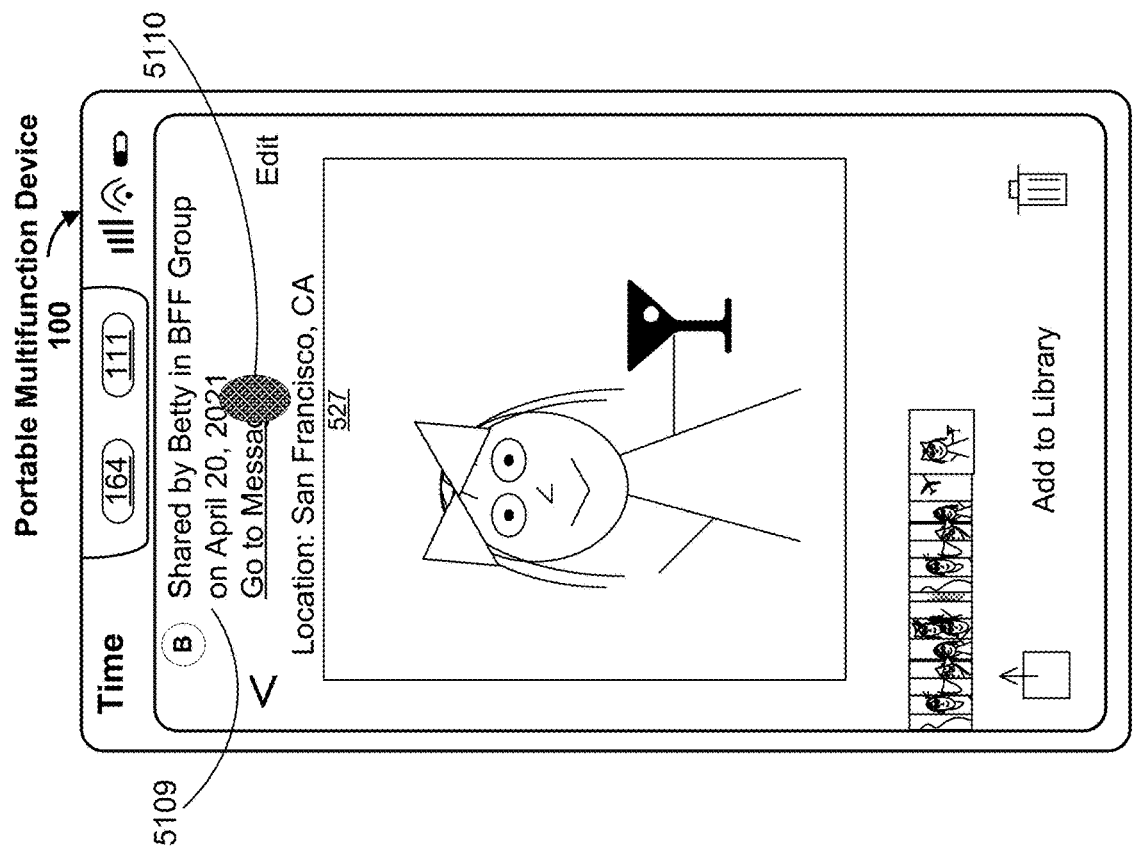
Figure 5A:
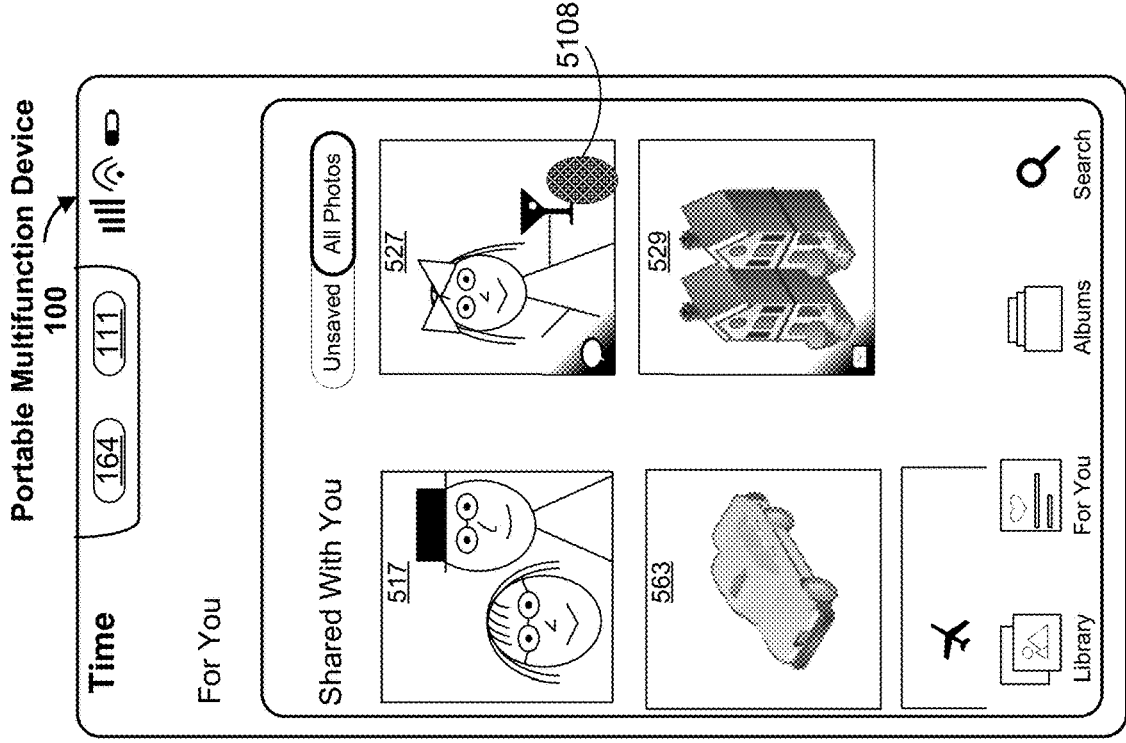
Figure 5A:
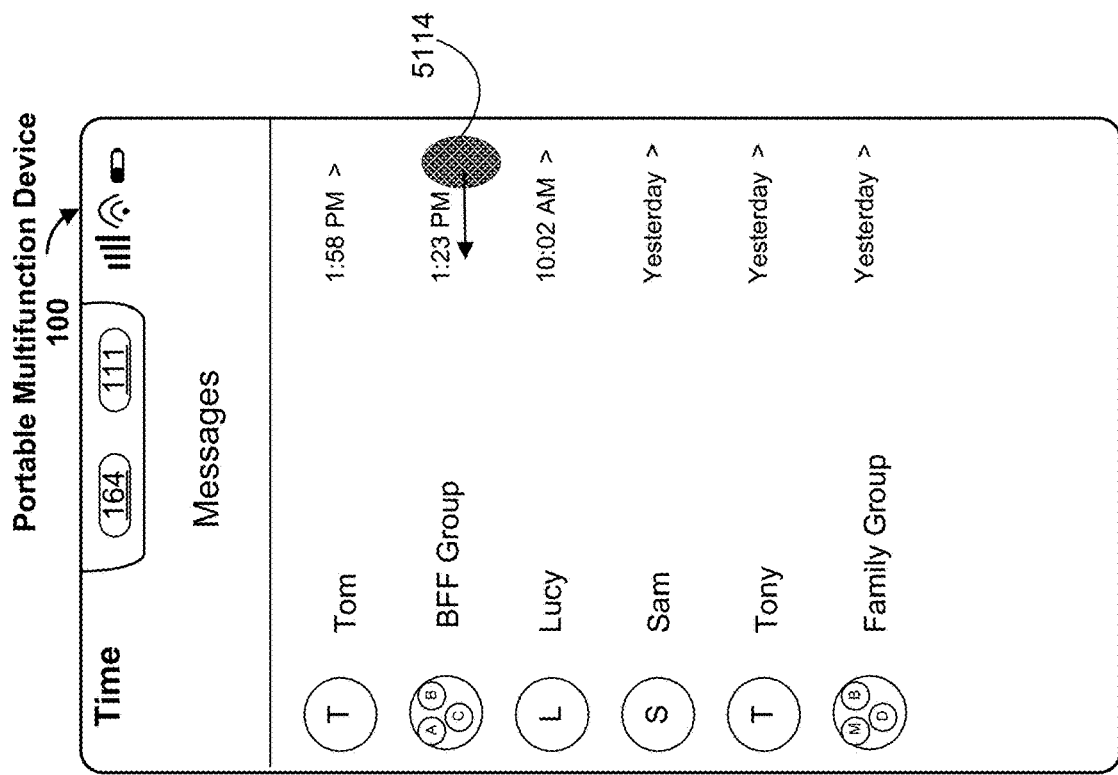
Figure 5A:
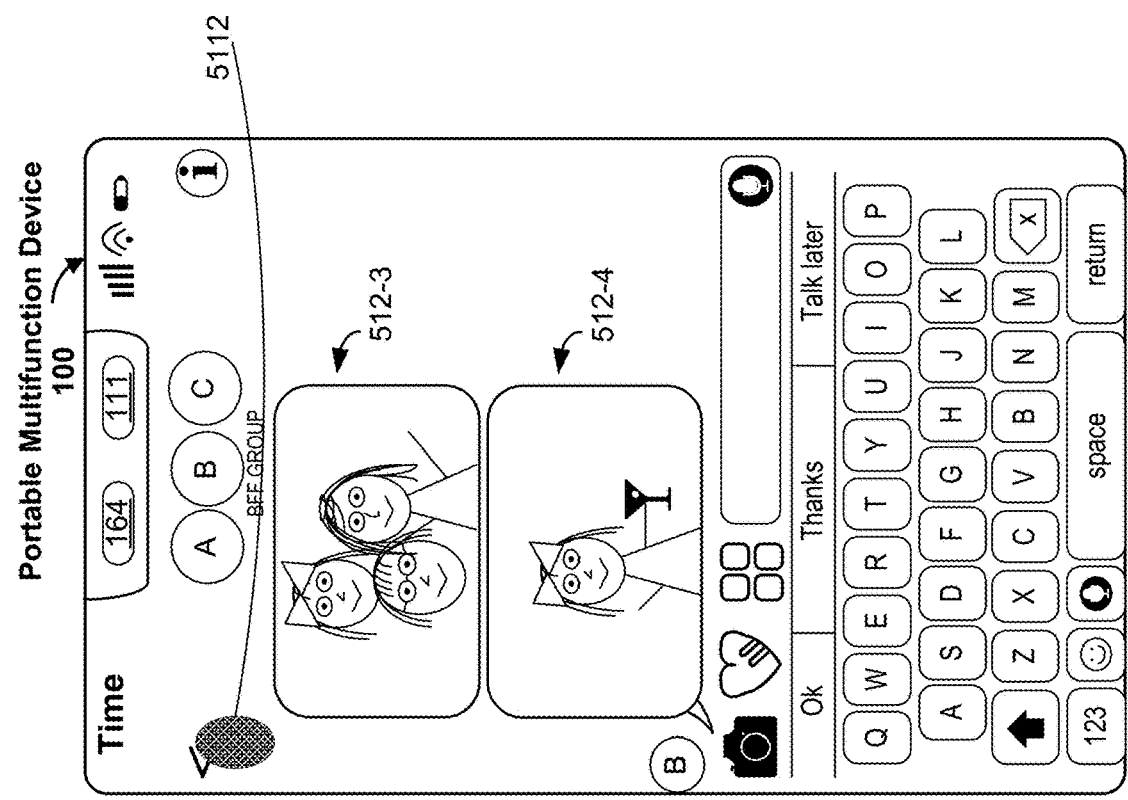
Figure 5A:
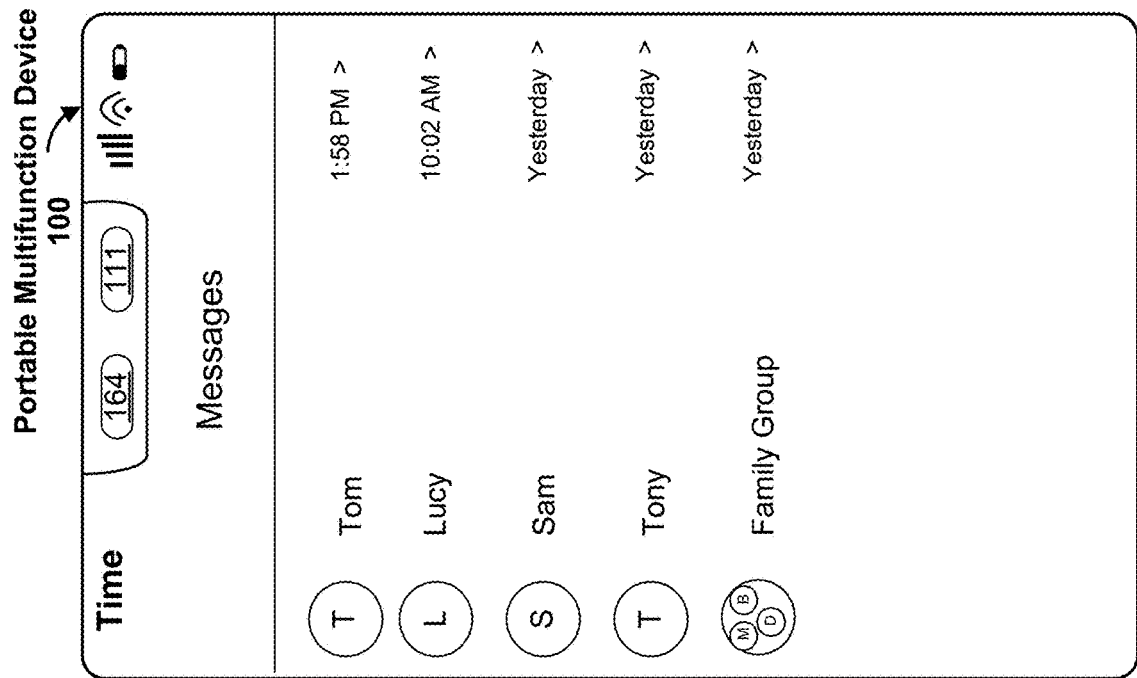
Figure 5A:
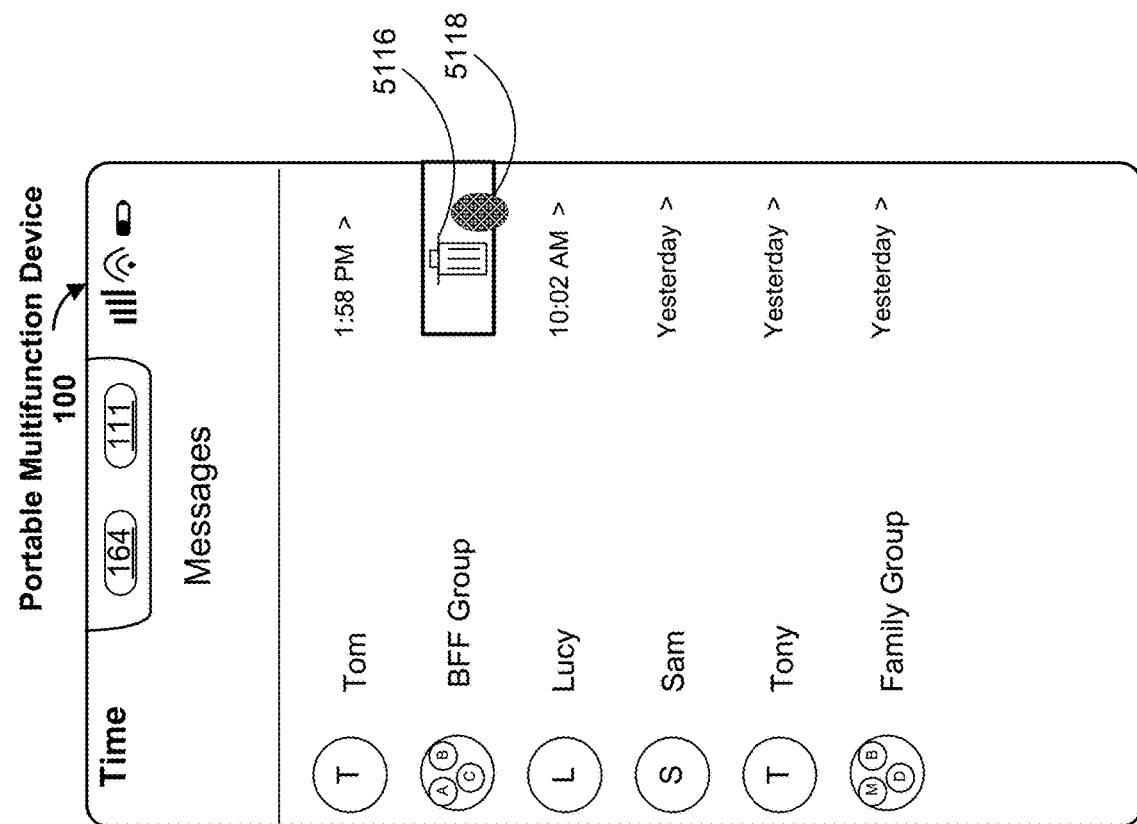
Figure 5A:
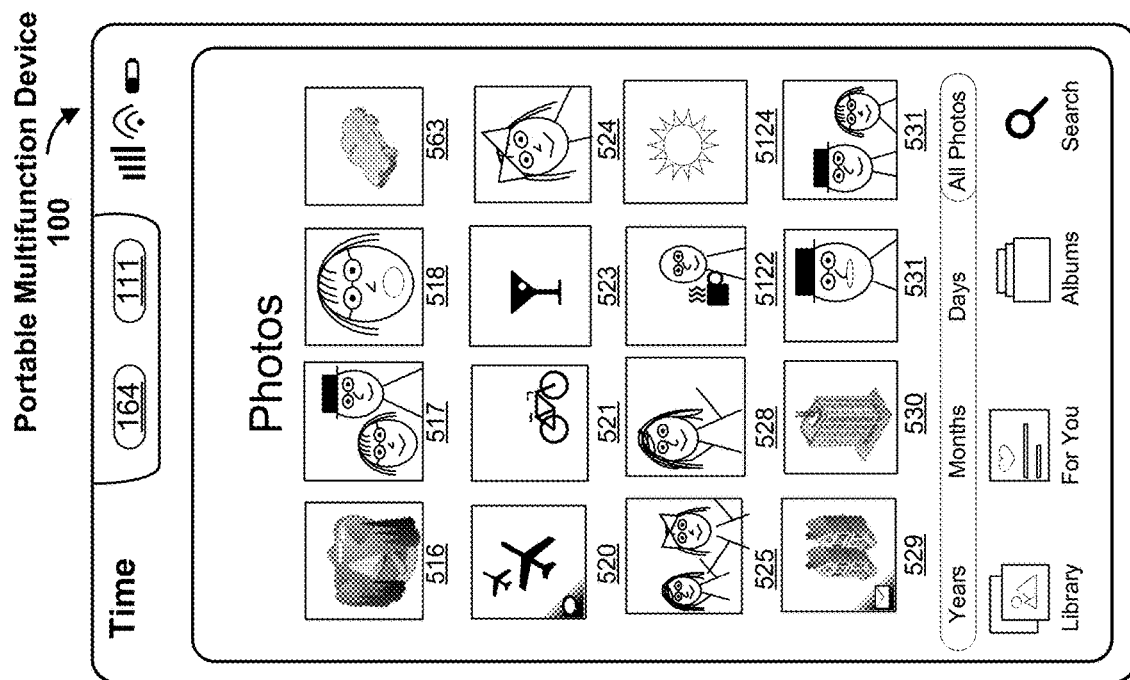
Figure 5A:
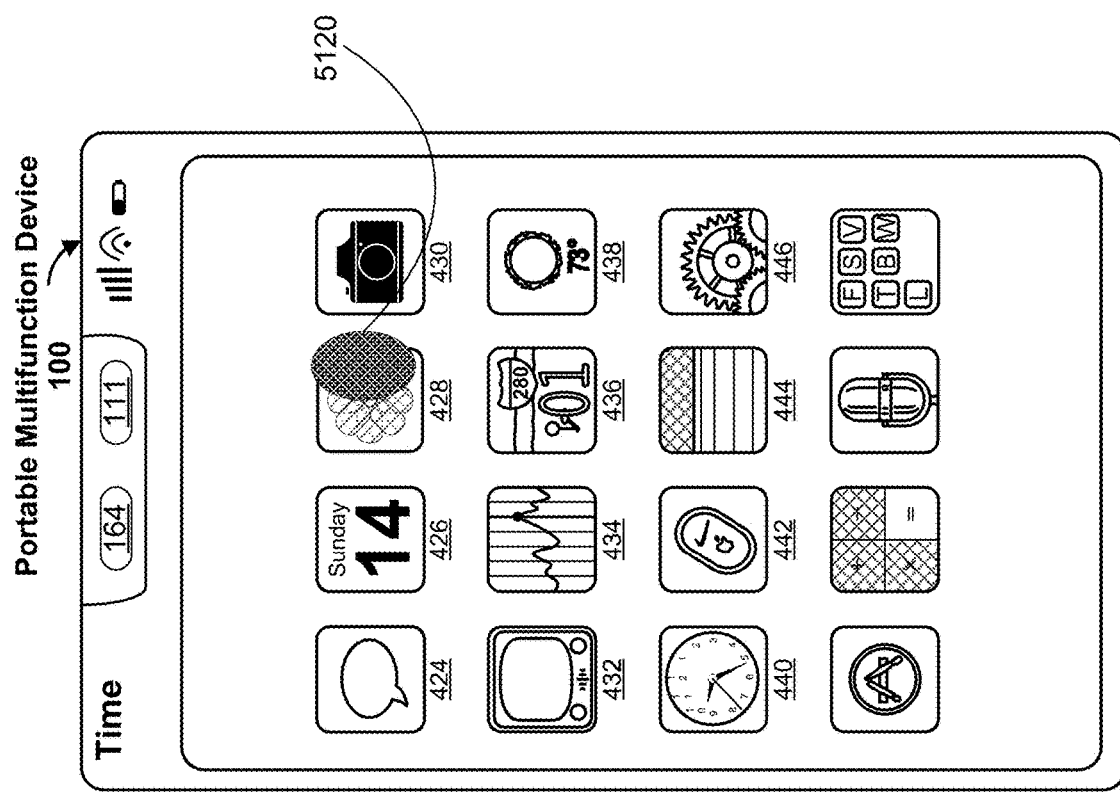
Figure 5A:
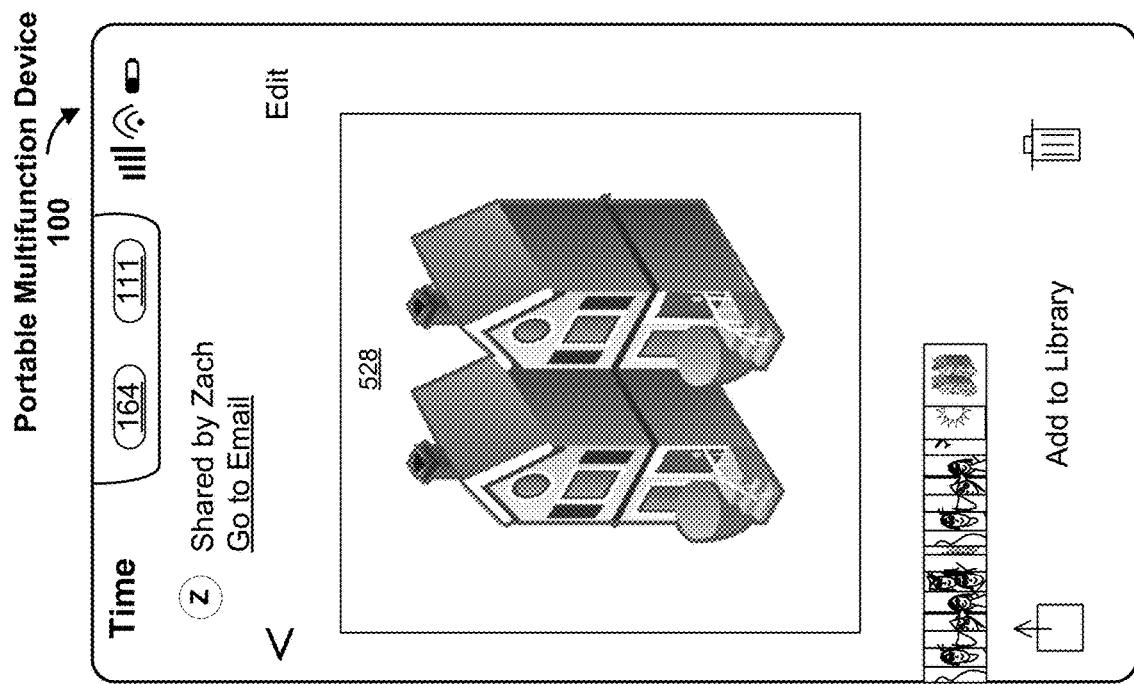
Figure 5A:
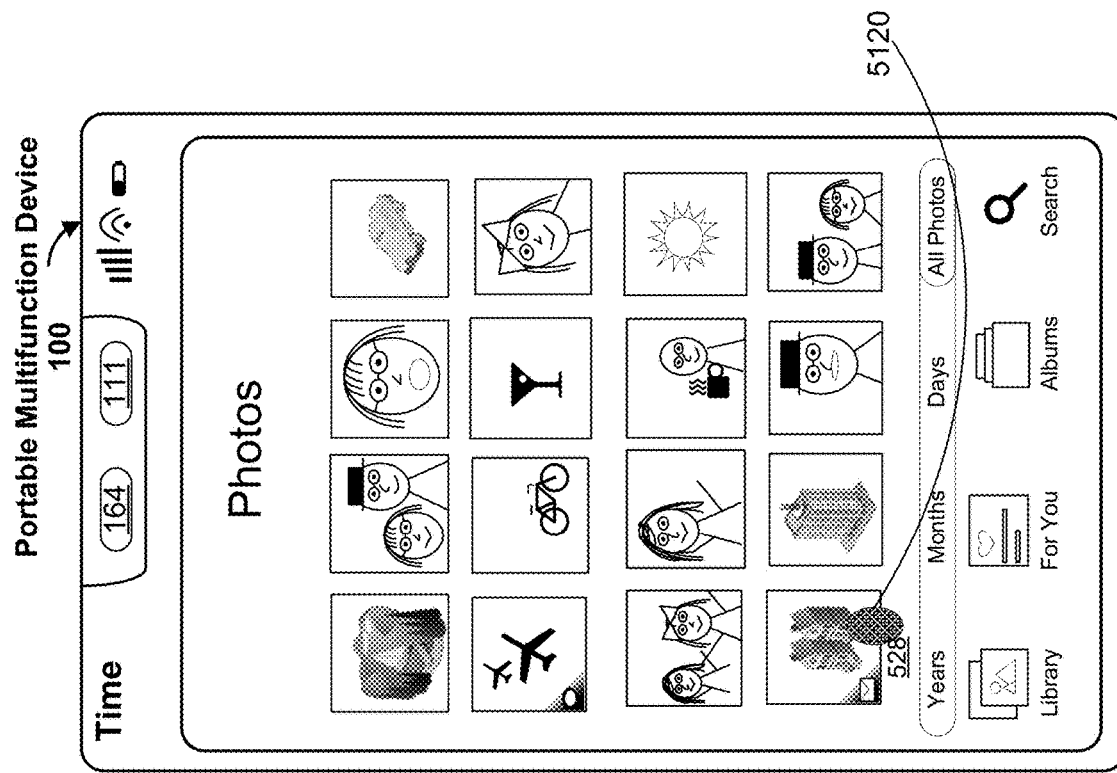
Figure 5A:
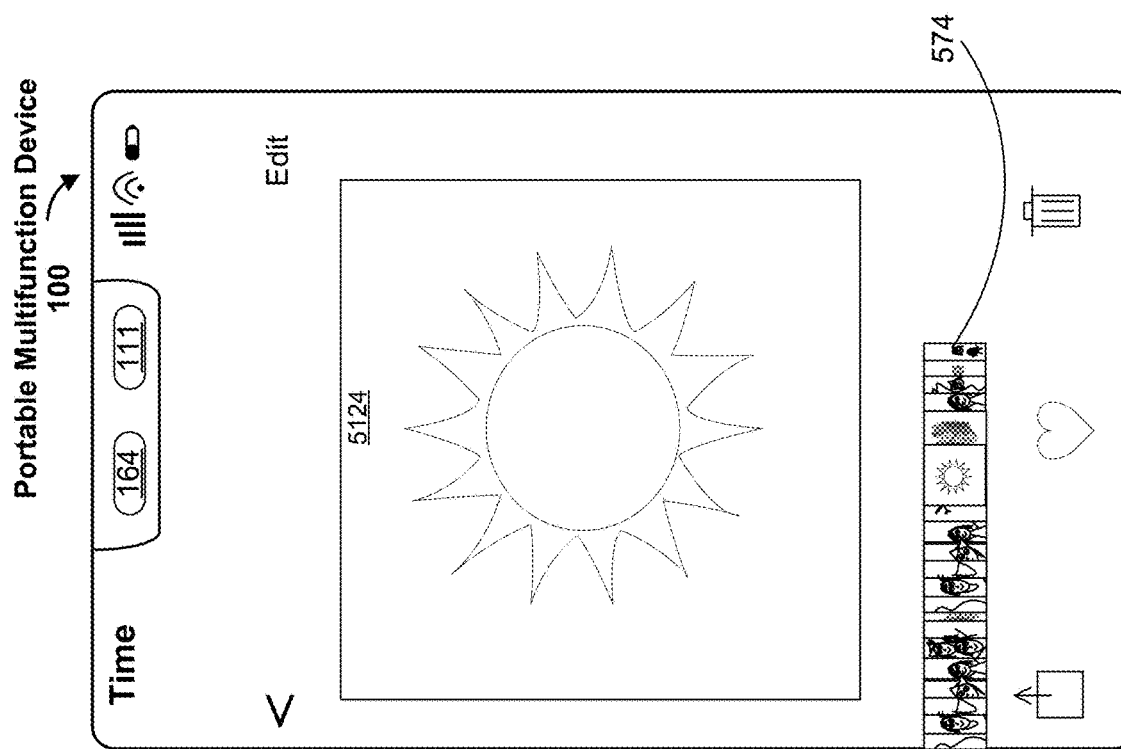
Figure 5A:
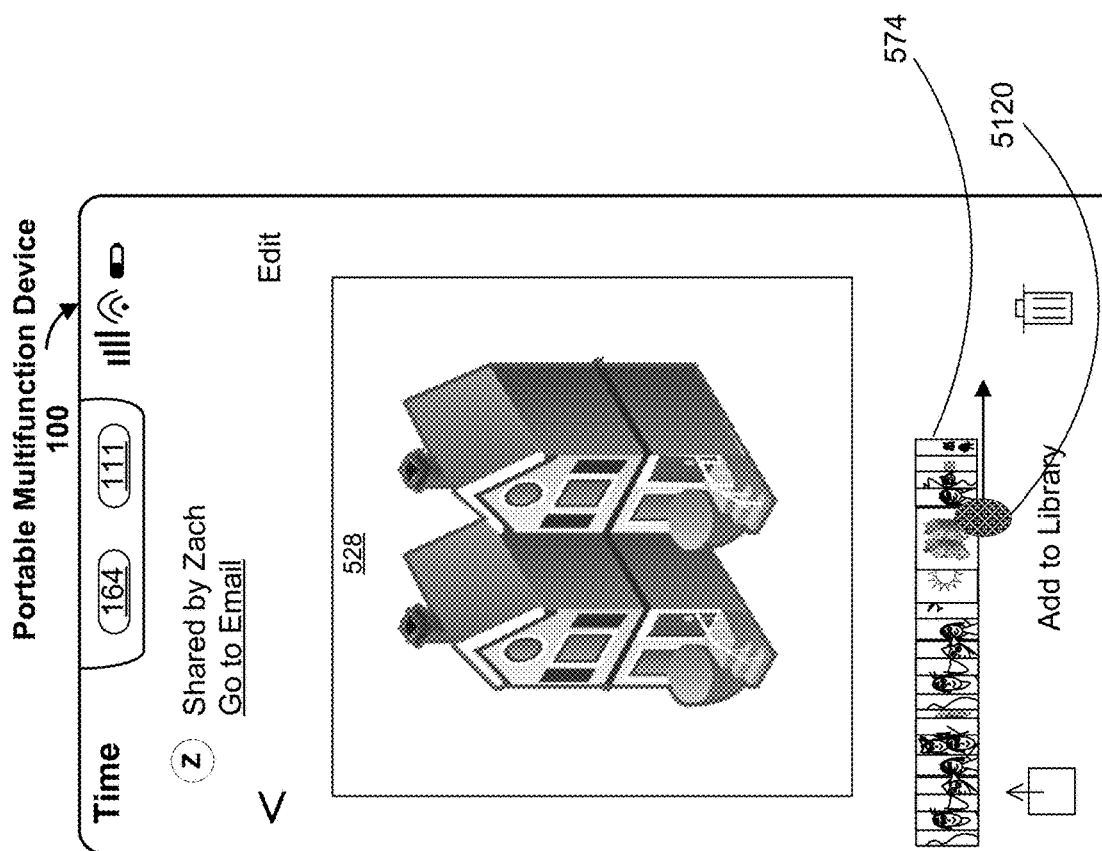

FIG. 5Y illustrates device 100 receiving user input 596 (e.g., a tap input) on Add to Library control 578. In response to detecting user input 596, device 100 adds (e.g., saves) photo 563 to the media library of the user, and updates the user interface to include controls enabled for photos that are saved to the user's library, as illustrated in FIG. 5Z. For example, FIG. 5Z illustrates navigation bar 574 and favorite control 586, which are displayed concurrently with the enlarged representation of photo 563.

FIG. 5Z further illustrates user input 598 selecting the back control. In response to user input 598, device 100 updates display of the user interface to redisplay the "Shared With You" user interface illustrated in FIG. 5AA. FIG. 5AA further illustrates device 100 detecting user input 5100 selecting the Library view. In response to user input 5100, device 100 displays the "All Photos" library view, as illustrated in FIG. 5AB.

FIG. 5AB illustrates that, after photo 517 is added to the media library, photo 517 is optionally no longer displayed with a sharing indication (e.g., photo 517 is displayed without border 546). In some embodiments, after photo 563 is added to the media library, photo 563 is displayed in the "All Photos" view (e.g., as compared to the "All Photos" view illustrated in FIG. 5K, before photo 563 is added to the media library). For example, the "All Photos" view of the library includes one or more (e.g., all) of the photos that are saved in the user's media library and one or more shared media items that meet display criteria (e.g., and that have not been saved to the user's library).

FIG. 5AC illustrates receiving user input 5102 requesting to return to the "For You" view. In some embodiments, in response to user input 5102, device 100 displays the user interface in FIG. 5AD (e.g., in some embodiments, device 100 directly redisplays the "Shared With You" interface, and, in some embodiments, the user first navigates to the "Shared With You" interface from the "For You" interface as described with reference to FIGS. 5N-5P).

FIG. 5AD illustrates receiving user input 5104 (e.g., a tap input) selecting photo 526. In response to user input 5104, device 100 displays an enlarged representation of photo 526 (e.g., which was shared by Betty in "BFF Group" using the messaging application), as illustrated in FIG. 5AE. FIG. 5AE further illustrates device 100 receiving user input 5106 selecting the delete control. In response to selection of the delete control, device 100 ceases to display the selected photo 526. For example, FIG. 5AF illustrates that photo 526 is no longer displayed in the "Shared With You" interface (e.g., as compared to the interface illustrated in FIG. 5AD). In some embodiments, in response to deleting photo 526 from the photos application, the message in the message thread that includes shared photo 526 is optionally not deleted. For example, message 512-3 (FIG. 5I) is maintained in the message thread for "BFF Group" on device 100 even after the user has deleted photo 526 from display within the photos application.

FIG. 5AF further illustrates detecting user input 5108 selecting photo 527. In response to detecting user input 5108, device 100 displays an enlarged representation of photo 527 (e.g., and optionally displays sharing information 5109, including an indication of the user that shared the photo (e.g., Betty), an application in which the photo was shared (e.g., Messages), and a location of the photo (e.g., San Francisco)), as illustrated in FIG. 5AG. FIG. 5AG further illustrates user input 5110 selecting "Go to Messages" button, which causes device 100 to open messaging application (e.g., the message thread, "BFF Group", corresponding to where photo 527 was shared), as illustrated in FIG. 5AH.

FIG. 5AH further illustrates user input 5112 (e.g., a tap input) selecting the back button in the messaging application, which causes device 100 to display the plurality of message threads (e.g., as described with reference to FIG. 5F). In some embodiments, as illustrated in FIG. 5AI, user input 5114 (e.g., a swipe input) is detected on a portion of the user interface corresponding to a respective message thread. In response to user input 5114, device 100 displays an option to delete 5116 the respective message thread, as illustrated in FIG. 5AJ. In some embodiments, device 100 provides an option to select a plurality of message threads (e.g., two or more) to be deleted at the same time (e.g., rather than requiring the user to perform a swipe input on each message thread). In some embodiments, device 100 provides an option to select one or more messages within a message thread to delete (e.g., without deleting the entire message thread).

FIG. 5AJ illustrates user input 5118 (e.g., a tap input) selecting the option to delete 5116 the message thread corresponding to "BFF Group." In response to user input 5118, the representation of the message thread for BFF Group is removed from display of the plurality of message threads, as illustrated in FIG. 5AK. In some embodiments, in response to deleting a respective message thread, shared media items that were shared via the respective message thread are deleted (e.g., no longer displayed in the "Shared With You" interface), as illustrated in FIG. 5AM, described below.

FIG. 5AL illustrates user input 5120 selecting icon 428 corresponding to photos application. In some embodiments, in response to user input 5120, device 100 opens the photos application and displays the "All Photos" view in FIG. 5AM. Because the "BFF Group" message thread was deleted (e.g., in the messaging application), the photos that were shared in BFF Group (e.g., the shared photos that were not added to the media library by the user) are no longer displayed in the "All Photos" view. For example, FIG. 5AM illustrates the "All Photos" view without displaying shared media items that were shared in the BFF Group message thread (e.g., that is deleted from the messaging application). For example, comparing the photos illustrated in FIG. 5AM with the photos illustrated in FIG. 5AC (e.g., before deleting the BFF Group message thread), photos 522, 526 and 527 are no longer displayed in FIG. 5AM.

In some embodiments, any photos shared in the BFF Group message thread that were stored (e.g., saved) to the user's media library are not deleted from the user's media library in accordance with the user deleting the BFF Group message thread. For example, only unsaved shared media items from a respective message thread are deleted in response to the user deleting the respective message thread. In some embodiments or circumstances, a user deletes one or more individual messages from a message thread (e.g., without deleting the entire message thread). In response, media items that are shared in the one or more individual messages that are deleted are removed from the "All Photos" view, without removing media items that are shared in individual messages in the message thread that have not been deleted.

FIG. 5AN illustrates user input 5120 selecting shared photo 528 from the "All Photos" view. In response to user input 512, device 100 displays an enlarged representation of photo 528, as illustrated in FIG. 5AO. FIG. 5AO illustrates that photo 528 is shared by Zach using an email application (e.g., a communication application distinct from the messaging application). It will be understood that various different communication applications (or a combination of communication applications) may be used to share media items (e.g., Instant Messaging, Email, device-to-device network, etc.) and, in some embodiments, device 100 displays information related to the application used to share the respective media item in response to the user selecting the media item (e.g., to view an enlarged representation of the media item). In some embodiments, additional sharing metadata is provided to (e.g., displayed for) the user. For example, in response to a user input (e.g., a swipe up or down), device 100 displays additional metadata about the selected media item (e.g., including sharing metadata), such as a time that the selected media item was captured (e.g., created), a location associated with the selected media item, individuals tagged (e.g., or recognized) in the selected media item, etc.

In some embodiments, a user is enabled to navigate between media items (e.g., including shared media items that have not been saved to the media library of the user) using navigation bar 574. For example, as illustrated in FIG. 5AP, photo 528 has not been saved to the user's library (e.g., and thus, device 100 continues to display a control to "Add to Library"). In response to user input 5120 (e.g., a swipe input to the right) directed to navigation bar 574, device 100 replaces display of the enlarged representation of photo 528 with display of an enlarged representation of photo 5124 (e.g., which is to the left of the representation of photo 528 in the navigation bar 574), as illustrated in FIG. 5AQ. In some embodiments, a user input that continues to move (e.g., swipe) to the right will cause device 100 to continue scrolling through media items in the navigation bar 574. In some embodiments, one or more tactile outputs are provided as the user scrolls through the media items.

FIGS. 6A-6P illustrate example user interfaces for performing a search of media items in an application, including displaying search results that include unsaved media items that are shared using a distinct application in accordance with some embodiments.

FIG. 6A illustrates device 100 displaying a "Shared With You" interface in the photos application, as described above. Device 100 detects user input 602 (e.g., a tap input), for example at a location corresponding to a search option, to navigate to the "Search" view in the photos application. In response to user input 602, device 100 displays a Search user interface, as illustrated in FIG. 6B.

For example, FIG. 6B illustrates a Search user interface, which includes search bar 604 and a plurality of sections, including "People", "Places" and "Categories". In some embodiments, each section is automatically (e.g., without user input) curated with recommendations, including recommended people, places, or categories based on relevance criteria. For example, device 100 automatically displays people that appear most often in the user's photo library, the locations where the user (or device 100) is most often located, and categories for the user's interest (e.g., based on content of media items in the user's media library).

FIG. 6C illustrates user input 606 (e.g., a swipe input up) that causes device 100 to scroll the Search user interface. In some embodiments, the Search user interface further includes a "Group Sharing" section, as illustrated in FIG. 6D. FIG. 6D further illustrates user input 608 (e.g., a swipe input down) that causes device 100 to scroll the Search user interface in the reverse direction. Accordingly, a user is able to navigate to different portions of the Search user interface by using swipe inputs to scroll up and down in the user interface. In some embodiments, the user is enabled to select an icon corresponding to a recommended person, place, category and/or group to initiate a search on the respective icon.

For example, FIG. 6E illustrates user input 610 (e.g., a tap input) selecting icon 612 associated with Tom. In response to user input 610, device 100 performs a search of media items that are associated with "Tom." For example, the search is based on search criteria related to Tom (e.g., photos of Tom, photos shared by Tom, etc.).

In FIG. 6F, device 100 returns the search results in a search results user interface. In some embodiments, the displayed search results include media items that are saved to the user's library and media items that are not saved to the user's library (e.g., shared media items that have not been saved to the user's library). In some embodiments, displaying the search results includes displaying a distinct section for "Photos of Tom" and a section for "Photos Shared by Tom." In some embodiments, a respective media item is associated with both sections (e.g., a photo of Tom that is also shared by Tom, such as photo 517). In some embodiments, the respective media item that is associated with both sections is displayed in both sections. In some embodiments, the respective media item that is associated with both sections is only displayed in one section (e.g., even though it is categorized by both sections) to remove duplication of displaying the same media item in multiple sections. In some embodiments, device 100 provides a set of options to enable the user to filter the search results. For example, device 100 displays a first option (e.g., virtual button) 614 ("Photos of Tom"), a second option (e.g., virtual button) 616 ("Shared Photos"), and a third option (e.g., virtual button) 618 ("All Photos"). For example, in FIG. 6F, the third option/button 618 is highlighted, indicating that "All Photos" that match the search results (e.g., for "Tom") are displayed.

In some embodiments, user input 620 (e.g., a tap input) selects the second option/button 616 to filter the search results, so that the displayed search results all correspond to "Shared Photos." For example, in response to user input 620, device 100 updates display to the user interface illustrated in FIG. 6G, where only the photos shared by Tom (e.g., and/or photos of Tom that are shared by another individual), including photo 517 and 520 are displayed. FIG. 6G further illustrates that shared photos optionally are displayed with a sharing indication 624. In some embodiments, only the shared photos that have not been saved to the user's library (e.g., photo 520) are displayed with sharing indication 624, without displaying the sharing indication on shared photos that have already been saved to the user's library (e.g., photo 517). In some embodiments, after a shared photo has been added to the media library of the user, the shared photo is no longer considered a shared photo, and the photos that are added to the media library are not included in the filtered search results of "Shared Photos." For example, in some embodiments, photo 517 (e.g., which was shared by Tom in the messaging application and was saved to the media library of the user of device 100), is not displayed in the filtered search results of FIG. 6G because it is no longer categorized as a shared photo.

On the other hand, in some embodiments, after a shared photo has been added to the media library, device 100 continues to categorize the photo as a shared photo (e.g., based on where the photo originated). In such embodiments, even after the user adds photo 517 to the media library of the user, photo 517 continues to be categorized as a shared photo (e.g., a shared photo that has been saved).

In some embodiments, user input 622 (e.g., a tap input) selects button 614 to filter the search results to "Photos of Tom." In response to user input 622, device 100 updates the display to the user interface illustrated in FIG. 6H. In some embodiments, the search results that match the search criteria, and that match the filter criteria indicated by the user-selected filter option (e.g., option/button 616), include: photos that are photos of Tom (e.g., photos include an image of Tom, as determined automatically by facial recognition and/or determined by manually tagging of the photo) that were shared by Tom or any other user, and photos of Tom in the media library that were captured by device 100 (e.g., photos that were not shared).

FIG. 6I illustrates an example of entering a search criteria in search box 604. For example, the user enters "#smile" into the search box. In response to receiving the search criteria (e.g., and/or a request to search), device 100 performs a search based on the search criteria. In some embodiments, the search criteria match a message thread (e.g., text in the search criteria matches text used in a message thread), and device 100 displays search results that includes one or more media items that were shared in the message thread, as illustrated in FIG. 6J. For example, in FIGS. 5B-5C, Tom sent a message 504-2 that included "#smile" followed by message 504-3 (e.g., which includes photo 517). Accordingly, the search results include photo 517 that is associated with the message "#smile." In some embodiments, photo 517 is optionally displayed with sharing indication 626 (e.g., whether or not photo 517 has been saved to the user's library). It will be understood that in some embodiments, the search criteria match text in a message thread sent or received by the user of device 100, and that the search results optionally include media items shared by the user of device 100 and/or media items shared with the user of device 100 (e.g., from another individual) in the message thread that matches the search criteria.

FIG. 6K illustrates user input 628 (e.g., a tap input) selecting icon 630 associated with one of the recommended "Places" (e.g., San Francisco). In response to user input 628, device 100 performs a search of media items that are associated with the place "San Francisco." For example, the search is based on search criteria related to San Francisco (e.g., photos taken in San Francisco).

Device 100 displays the search results for "San Francisco" in FIG. 6L. In some embodiments, an option (e.g., virtual button) 616 is provided to filter the search results to display shared photos without displaying photos that were captured using device 100 (e.g., photos in the media library of the user). In some embodiments, device 100 provides additional options, e.g., an option to filter the search results to include only unsaved media items (e.g., shared media items that have not been saved to the media library of the user). In FIG. 6L, the search results display shared photos and photos that were not shared (e.g., as indicated by the highlighted "All Photos" button 618). For example, in the displayed search results, the shared photos include sharing indications that overlay the photos, while the photos that were not shared (e.g., photos that are stored in the media library of the user or photos captured by device 100) are displayed without a sharing indication overlaid with the photo.

FIG. 6M illustrates user input 632 (e.g., a tap input) selecting icon 634 associated with Alice. In response to user input 632, device 100 performs a search of media items that are associated with "Alice." For example, the search is based on search criteria related to Alice (e.g., photos of Alice, photos shared by Alice, etc.).

Device 100 displays the search results, produced in response to user input 632, in the user interface illustrated in FIG. 6N. In some embodiments, the displayed search results include media items that are saved to the user's library and media items that are not saved to the user's library (e.g., shared media items that have not been saved to the user's library). In some embodiments, displaying the search results includes displaying a separate section for "Shared Photos of Alice" (e.g., shared by Alice, or shared by someone other than Alice) and a second for "Photos of Alice." In some embodiments, a respective media item is associated with both sections (e.g., a photo of Alice that is also shared). In some embodiments, the respective media item that is associated with both sections is displayed in both sections. In some embodiments, the respective media item that is associated with both sections is only displayed in one section (e.g., even though it is categorized by both sections) to remove duplication of displaying the same media item in both sections. In some embodiments, device 100 provides a set of options to enable the user to filter the search results (e.g., options to filter the search results to include only "Photos of Alice," or only "Shared Photos," or "All Photos").

Figure 6O:
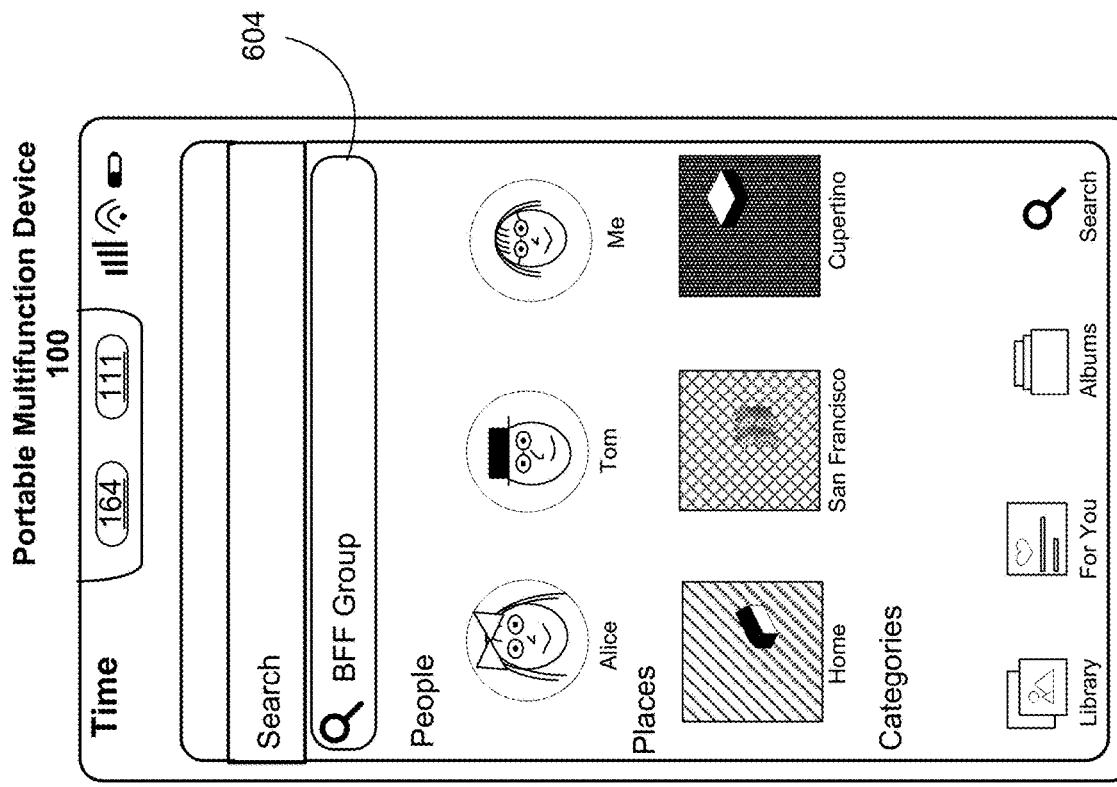
Figure 7A:
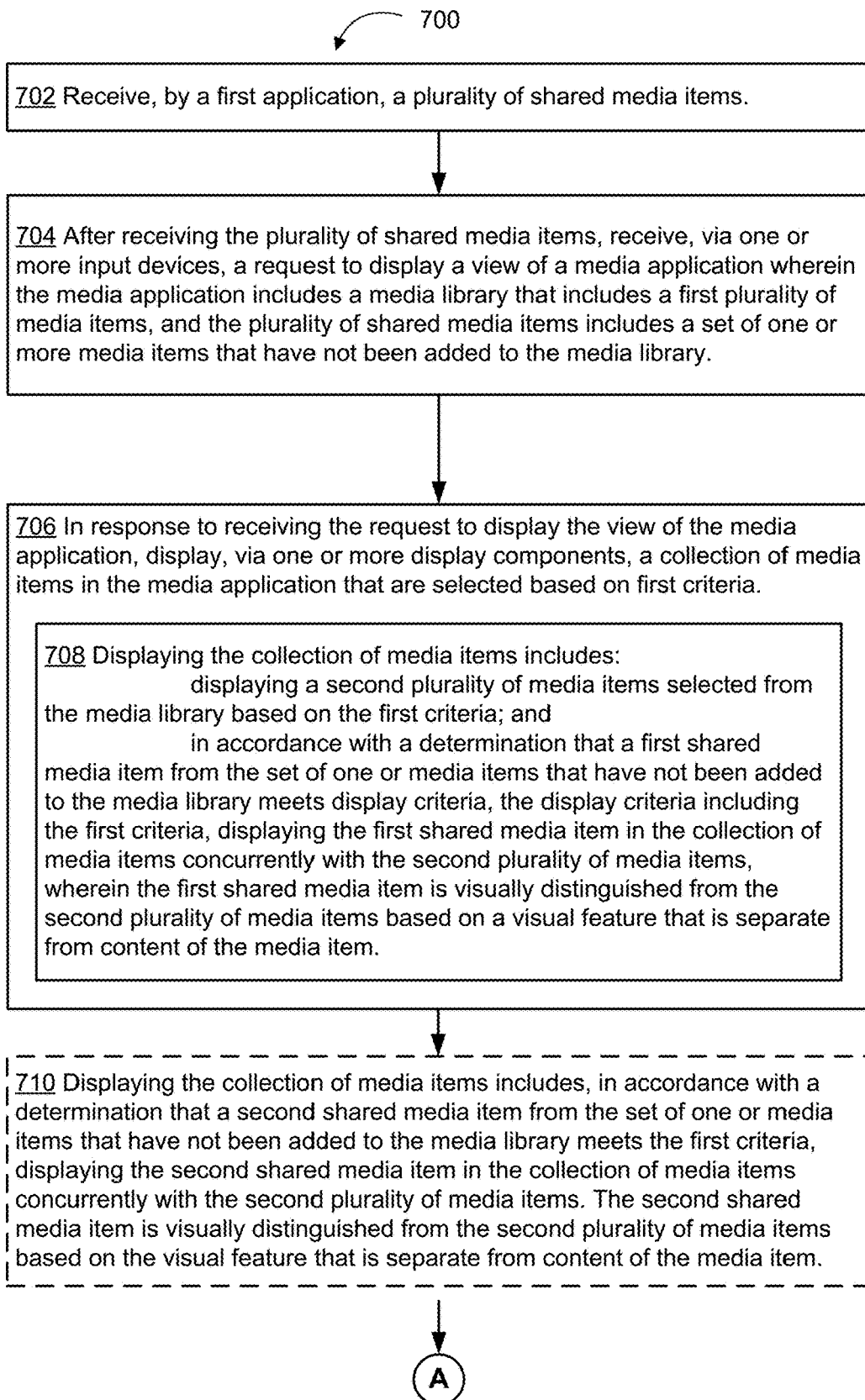

FIG. 6O illustrates another example of receiving search criteria in search box 604. For example, FIG. 6O illustrates a request to search for "BFF Group." In some embodiments, device 100 returns search results for media items that were shared in a group message thread that is associated with the identifier "BFF Group," as shown in FIG. 6P. In the example shown in FIGS. 6O-6P, the search was performed and the search results were produced before the "BFF Group" message thread was deleted (as described with reference to FIGS. 5AI-5AK. For example, in some embodiments, after the "BFF Group" message thread is deleted, in response to the same search for "BFF Group," device 100 would display a message indicating that no results are found (e.g., because the media items that are shared in the BFF Group message are deleted in accordance with the BFF Group message thread being deleted).

FIG. 6P illustrates search results that match the search criteria "BFF Group" as entered in FIG. 6O. In some embodiments, only shared media items that have not been deleted are displayed in the search results. For example, while photo 526 was shared in the BFF Group message thread (e.g., in message 512-3, shown in FIG. 5H), photo 526 was deleted (e.g., as described with reference to FIG. 5AE). Accordingly, as shown in FIG. 6P, photo 526 is not displayed in the search results of "BFF Group."

FIGS. 7A-7E are flow diagrams illustrating method 700 of concurrently displaying media items in an application with shared media items that are received via a distinct application, in accordance with some embodiments. Method 700 is performed at a computer system (e.g., device 300, FIG. 3, or portable multifunction device 100, FIG. 1A) that is in communication with a display generation component (e.g., a display) and one or more input devices. The computer system optionally includes (e.g., or is in communication with) a touch-sensitive surface, and optionally includes one or more sensors to detect intensity of contacts with the touch-sensitive surface. In some embodiments, the display generation component is a touch-screen display and the touch-sensitive surface is on or integrated with the display generation component. In some embodiments, the display generation component is separate from the touch-sensitive surface. Some operations in method 700 are, optionally, combined and/or the order of some operations is, optionally, changed.

As described herein, method 700 determines when a respective media item has been shared with the user using an application, and automatically displays the respective media item in a media application without requiring the user to provide inputs to select or add the media item within the media application. In some embodiments, the method automatically displays the respective media item with a visual effect or visual feature such that a user can distinguish between the respective media item that was shared with the user and media items that are already included in the user's media library of the media application. Performing an operation (e.g., automatically) when a set of conditions has been met without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

The computer system receives (702), by a first application, a plurality of shared media items. In some embodiments, the first application is a communication application, such as a messaging application, a mail (e.g., email) application, or a social media application. In some embodiments, the plurality of shared media items comprises a plurality of shared photos, shared videos, and/or shared audio clips. For example, as described with reference to FIGS. 5A-5I, a plurality of photos are shared with device 100 (e.g., a user of device 100) in a messaging application.

After receiving the plurality of shared media items, the computer system receives (704), via the one or more input devices, a request to display a view of a media application (e.g., a media library application, such as a photos application). For example, as illustrated in FIG. 5J, user input 514 on icon 428 causes device 100 to open the photos application. The media application includes a media library that includes a first plurality of media items, as illustrated in FIG. 5K. In some embodiments, the first plurality of media items are media items that have been saved (e.g., locally) to the media library (e.g., photos 516, 518, 519, 521, 523, 524, 525, 528, 530 and 531 as described with reference to FIG. 5K). In some embodiments, the plurality of shared media items includes a set of one or more media items that have not been added to the media library (e.g., photos 517, 520, 522, 526, 527 and 529, as described with reference to FIG. 5K). In some embodiments, the plurality of shared media items is not stored within a media library of the second application and/or the plurality of shared media items is not locally saved by the computer system in the second application (e.g., the photos application). In some embodiments, the plurality of shared media items is stored within the first application but not the second application (e.g., the second application references the first application to enable the device 100 to display a respective shared media item). For example, the shared media item is stored within the messaging application but is not stored within the photos application.

In response to receiving the request to display the view of the media application, the computer system displays (706), via the one or more display generation components, a collection of media items in the media application that are selected based on first criteria, as described with reference to FIG. 5K. In some embodiments, the collection of media items include media items from a particular time, a particular place, and/or a particular event. In some embodiments, the first criteria is recency criteria and an order of the media items displayed in the collection of media items is based on the times at which the displayed media items were captured (e.g., the most recent media items are displayed above less recent media items).

Displaying the collection of media items includes (708) displaying a second plurality of media items selected from the media library based on the first criteria. In some embodiments, the second plurality of media items comprises a subset, less than all, of the first plurality of media items that have been saved to the media library. In accordance with a determination that a first shared media item from the set of one or media items that have not been added to the media library meets display criteria, the display criteria including the first criteria, the first shared media item in the collection of media items is displayed concurrently with the second plurality of media items, wherein the first shared media item is visually distinguished from the second plurality of media items based on a visual feature (e.g., or using, for example, a visual effect such as a blur effect, filter effect, or border) that is separate from content of the media item. For example, the media items are visually distinguished from each other by applying a filter to the shared media item(s) without applying the filter to the media items that are not shared media items. For example, as described in FIG. 5K, sharing indication 532 is displayed over shared media items. In some embodiments, the first criteria include a time criteria (e.g., a recency criteria) such that the second plurality of media items are selected from a particular time frame (e.g., the past week, the past month, the past year, etc.). In some embodiments, the display criteria include the first criteria and additional criteria, such as an individual criteria (e.g., an individual who shared the media items, an individual who appears in the media items). For example, as described with reference to FIGS. 5X-5AB, photo 563 does not satisfy display criteria and is not displayed in the "All Photos" view in FIG. 5K.

In some embodiments, displaying the collection of media items includes (710), in accordance with a determination that a second shared media item from the set of one or media items that have not been added to the media library meets the first criteria, displaying the second shared media item in the collection of media items concurrently with the second plurality of media items. In some embodiments, the second shared media item is visually distinguished from the second plurality of media items based on the visual feature that is separate from content of the media item. In some embodiments, each shared media item (e.g., including the first shared media item and the second shared media items) that has not been added to the media library is displayed as visually distinguished from the second plurality of media items based on the visual feature that is separate from content of the media item (e.g., as illustrated in FIGS. 5K and 5L). For example, the shared media items that have not been added to the media library are displayed with a different visual effect (e.g., filter, shape, emphasis, etc.) than media items that are saved to the media library. In some embodiments, only the shared media items that have not been added to the media library are visually distinguished from the second plurality of media items and shared media items that have been added to the media library are not visually distinguished from the second plurality of media items (e.g., after photo 517 has been saved to the media library, photo 517 is no longer displayed with the sharing indicator (e.g., or border), as illustrated in FIGS. 5V and 5AB). For example, after the shared items have been saved to the media library, the shared items that have been added to the media library are included in the second plurality of media items.

Displaying shared media items with a different visual effect than the media items that are already stored in the media library makes it easy for the user to see which media items have been shared with the user and/or media items that have not yet been saved the user's media library. Performing an operation (e.g., automatically) when a set of conditions has been met without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, displaying the first shared media item that is visually distinguished from the second plurality of media items comprises (712) displaying the first shared media item with changed appearance of at least a portion of a border region of the first shared media item. For example, the shared media items that have not been added to the media library are displayed with a visual effect (e.g., sharing indication or border) around the respective shared media items and the items in the second plurality of media items are not displayed with the border. For example, as illustrated in FIG. 5V, photo 517 has been saved to the media library and is displayed without a sharing indicator overlaying the corner of photo 517 (or a border), while photos 527, 526 and 563 are each displayed with the sharing indicator overlaying the bottom left corner of those photos. In some embodiments, a size of the first shared media item is smaller than a size of a media item in the second plurality of media items (e.g., the first shared media item is displayed at a smaller size to fit within the border), as illustrated in FIGS. 5L and 5AB.

Displaying media items that have been shared with the user that have not yet been added to the media library of the user with a different border or indicator without displaying the border or indicator on media items that are in the user's media library makes it easy for the user to see which media items have been shared with the user and/or media items that have not yet been saved the user's media library. Performing an operation (e.g., automatically) when a set of conditions has been met without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, displaying the first shared media item that is visually distinguished from the second plurality of media items comprises (714) displaying the first shared media item with a content obscuring effect (e.g., blurring or darkening) applied to at least a portion of the first shared media item. In some embodiments, the border (e.g., border 546, FIG. 5L) comprises a blurred (content obscuring) effect. For example, the first shared media item appears (e.g., at a first size) to overlay a blurred copy of the first shared media item (e.g., at a second size that is larger than the first size), wherein the border comprises the blurred copy of the first shared media item that is not covered by the overlaid first shared media item.

Displaying media items that have been shared with the user that have not yet been added to the media library of the user with a blurred visual effect without displaying the blurred visual effect on media items that are in the user's media library makes it easy for the user to see which media items have been shared with the user and/or media items that have not yet been saved the user's media library. Performing an operation (e.g., automatically) when a set of conditions has been met without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, displaying the first shared media item that is visually distinguished from the second plurality of media items comprises (716) displaying the first shared media item with a graphical element that is overlaid on at least a portion of the first shared media item. In some embodiments, the graphical element comprises an icon (e.g., an icon that corresponds to an application that was used to share the item with the user). For example, in FIG. 5K, the icon comprises sharing indication 532 on photo 520 to indicate photo 520 was shared via the messaging application, and sharing indication 534 on photo 529 indicates that photo 529 was shared via an email application. In some embodiments, the graphical element is at least partially translucent (e.g., the photo is visible under the graphical element).

Displaying media items that have been shared with the user that have not yet been added to the media library of the user with an overlaid icon without displaying the overlaid icon on media items that are in the user's media library makes it easy for the user to see which media items have been shared with the user and/or media items that have not yet been saved the user's media library. Performing an operation (e.g., automatically) when a set of conditions has been met without requiring further user input enhances the operability of the system and makes the user-device interface more efficient (e.g., by helping the user to achieve an intended result and reducing user mistakes when operating/ interacting with the system), which, additionally, reduces power usage and improves battery life of the device by enabling the user to use the device more quickly and efficiently.

In some embodiments, the computer system receives (718) a sequence of one or more user inputs including a user input selecting a media item in the displayed collection of media items. In some embodiments, in response to receiving the sequence of one or more user inputs, the computer system displays (e.g., concurrently displays) an enlarged representation of the media item and a plurality of controls for performing operations associated with the media item. In some embodiments, in accordance with a determination that the media item is a media item in the second plurality of media items selected from the media library, the plurality of controls displayed (e.g., concurrently displayed) with the enlarged representation of the media item include a first set of controls. In some embodiments, in accordance with a determination that the media item is a shared media item from the set of one or more media items that have not been added to the media library, the plurality of controls displayed (e.g., concurrently displayed) with the enlarged representation of the media item include a second set of controls distinct from the first set of controls.

For example, media items that are already saved in the media library are displayed with the first set of controls, and media items that have not been added to the media library (e.g., shared media items) are displayed with the second set of controls. In some embodiments, the second set of controls includes controls that are also in the first set of controls. For example, the second set of controls includes a control to add the media item to the media library and additional controls, and the first set of controls includes the additional controls without the control to add the media item to the media library. For example, as illustrated in FIG. 5R-5S, before photo 517 is added to the media library, the plurality of controls displayed with the enlarged representation of photo 517 includes an "Add to Library" control 578 (e.g., the second set of controls). After photo 517 has been added to the media library, the enlarged representation of photo 517 is displayed with a distinct set of controls (e.g., the first set of controls), including a favorite control 586. In some embodiments, the controls are displayed in response to the selection of the media item (e.g., the user input requesting to enlarge the media item). In some embodiments, the controls are displayed in response to a tap that is detected on the enlarged representation after the enlarged representation is displayed. In some embodiments, the controls are initially displayed and disappear in response to detecting a tap input on the enlarged representation of the media item while the plurality of controls are displayed. For example, as illustrated in FIG. 5S-5T, in response to user input 588 (e.g., a tap input), device 100 ceases to display controls 576, 586, and 580 concurrently with the enlarged photo 517.

Providing different sets of selectable controls based on whether a media item has not been added to media library or the media item is already saved to the media library provides real-time visual feedback to the user and improves the user experience by allowing the user to perform different tasks based on the particular media item. Providing improved visual feedback to the user without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the first set of controls includes (720) a control for marking the media item as a favorite and/or a control for deleting the media item. For example, favorite control 586 and/or delete control 580, illustrated in FIG. 5S, are included in the first set of controls (e.g., displayed for media items saved to the media library). In some embodiments, in response to receiving an input on the control for marking the media item as a favorite, a favorite indicator (e.g., a heart) is displayed on the media item (e.g., the favorite control 586 is filled in). In some embodiments, in response to receiving an input on the control for deleting the media item, the media item is deleted from the collection of media items (and/or is deleted from the media library), as described with reference to FIGS. 5AE-5AF. In some embodiments, in response to receiving an input on the control for deleting the media item, the computer system ceases display of the media item.

Providing a control for media items that allows a user to delete the media content item such that the device no longer displays the media content item provides additional control options without needing to navigate through complex menu hierarchies and improves the user experience. Providing improved visual feedback to the user, and (e.g., automatically) providing additional control options when a set of conditions has been met without cluttering the user interface with additional displayed controls and without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the second set of controls includes (722) an indication that the selected media item is a shared media item. For example, the second set of controls that is displayed if the media item is a shared media item that has not been added to the media library includes an indication of an individual who shared the media item (e.g., a contact name). For example, as illustrated in FIG. 5Q, sharing information 566 is displayed with the enlarged photo 517. In some embodiments, the indication that the selected media item is a shared media item comprises visually distinguishing (e.g., adding a border and/or a blur effect) the selected media item from the media items that are in the second plurality of media items (selected from the media library based on the first criteria). For example, in some embodiments, the border and/or graphical element is displayed on the enlarged media item.

Automatically displaying an indication that a particular media item is a media item that was shared with the user (e.g., from another user and/or via another application) provides real-time visual feedback to the user and improves the user experience. Providing improved visual feedback to the user, without requiring further user input, enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, while displaying the enlarged representation of the media item and the plurality of controls for interacting with the media item, the computer system receives (723) an input selecting the control for adding the media item to the media library. In some embodiments, in response to receiving the input selecting the control for adding the media item to the media library, the computer system adds the media item to the media library and ceases to display the indication that the selected media item is a shared media item. For example, as described with reference to FIG. 5S, in some embodiments, sharing information 566 is no longer displayed after photo 517 has been added to the media library.

Automatically updating the control options for a media item that the user has requested to add to the media library (e.g., by changing the previously displayed set of control options for media items that are not in the media library to the set of control options displayed for media items that were shared and are now saved to the media library) provides real-time visual feedback to confirm that the user successfully added the media item to the user's media library (e.g., and is no longer provided with the controls displayed for shared media items that are not saved to the media library). Providing improved visual feedback to the user, and (e.g., automatically) providing different control options when a set of conditions has been met without cluttering the user interface with additional displayed controls and without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the second set of controls includes (724) a control for adding the media item to the media library (e.g., as shown in FIG. 5Q). In some embodiments, the second set of controls that is displayed if the media item is a shared media item that has not been added to the media library includes an option to save the media item (e.g., locally) within the media application (e.g., "Add to Library" control 578).

Automatically providing a control for media items that have been shared with a user such that the user may add the media item to the user's own media library provides additional control options without needing to navigate through complex menu hierarchies and improves the user experience. Providing improved visual feedback to the user, and (e.g., automatically) providing additional control options when a set of conditions has been met without cluttering the user interface with additional displayed controls and without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, while displaying the enlarged representation of the media item and the plurality of controls for interacting with the media item, the computer system receives (726) an input selecting the control for adding the media item to the media library. In response to receiving the input selecting the control for adding the media item to the media library, and optionally, updates the set of controls that are displayed. For example, as shown in FIGS. 5R-5S, in some embodiments, in response to receiving (726) the input selecting the control for adding the media item to the media library, and in conjunction with adding the media item to the media library, the computer system ceases (727) to display one or more controls for performing operations associated with the media item that were displayed prior to receiving the input selecting the control for adding the media item to the media library. More specifically, in some embodiments, in response to receiving (726) the input selecting the control for adding the media item to the media library, and in conjunction with adding the media item to the media library, the computer system ceases (728) to display the control (e.g., the "Add to Library" control 578 shown in FIG. 5R) for adding the media item to the media library (e.g., which is one of the controls in the second set of controls).

In yet another example, which is optionally combined with the either of the previous examples (727 or 728) of updates to the displayed set of controls, in response to receiving (726) the input selecting the control for adding the media item to the media library, and in conjunction with adding the media item to the media library, the computer system displays (729) one or more controls (e.g., one or more controls from the first set of controls, such as favorite control 586, FIG. 5S) for performing operations associated with the media item in the media library that were not displayed prior to receiving the input selecting the control for adding the media item to the media library (e.g., favorite control 586).

Automatically updating the control options for a media item that the user has requested to add to the media library (e.g., by removing a previously displayed control option to add the media item to the media library, and/or by displaying a control only applicable to media items in the media library) provides real-time visual feedback to confirm that the user successfully added the media item to the user's media library (e.g., and is no longer provided with an option to add the media item to the media library). Providing improved visual feedback to the user, and (e.g., automatically) providing different control options when a set of conditions has been met without cluttering the user interface with additional displayed controls and without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the computer system displays (732), concurrently with the enlarged representation of the media item, information about a source of the media item. For example, the information includes information about an application in which the media item was shared and/or information about a user that shared the media item. For example, sharing information 566 is displayed concurrently with enlarged photo 517, as described with reference to FIG. 5Q.

Displaying additional information related to a shared media item (e.g., a person who shared the media item, a time that the media item was shared, an identifier of an application used to share the media item) while also displaying the shared media item provides the user with real-time visual feedback regarding how the media item was shared and provides additional information to the user without needing to navigate through complex menu hierarchies. Providing improved visual feedback to the user, and (e.g., automatically) providing additional control options when a set of conditions has been met without cluttering the user interface with additional displayed controls and without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, while concurrently displaying the enlarged representation of the media item and the information about a source of the media item, the computer system detects (734) an input directed to a selectable user interface object that includes the information about the source of the media item (e.g., user input 584, FIG. 5R). In some embodiments, in response to detecting an input directed to the selectable user interface object that includes the information about the source of the media item, the computer system initiates a process for displaying, in the communication application, a communication history for a conversation in which the shared item was shared (e.g., as described with reference to FIGS. 5R and 5U). For example, in response to a user input selecting the option to view information about how the media item was shared, the computer system automatically displays the communication application in which the media item was shared (e.g., including displaying a portion of a communication thread within the communication application that includes when the media item was shared, or displaying a most recent portion of the communication thread within the communication application (even if the most recent portion of the communication thread does not include the shared media item)). In some embodiments, the input is a selection of the indication. In some embodiments, the input is a tap on a portion of a user interface that pops up when you tap the indication (e.g., a first user input causes a menu to pop up in at least a portion of the user interface, the menu including an option to view information of how the media item was shared, and a second user input selects the option to view the information of how the media item was shared). In some embodiments, the indication includes an identifier of the person who shared the media item (e.g., sharing information 566 includes "Tom" and a representation of Tom (e.g., the circle with "T")).

Providing a control option that is displayed for a shared media item to allow a user to navigate directly to a conversation in another application in which the media item was shared provides visual feedback to the user that indicates a particular application and communication history in which the media item was shared and provides additional control options to the user without needing to navigate through complex menu hierarchies. Providing improved visual feedback to the user, and (e.g., automatically) providing additional control options without cluttering the user interface with additional displayed controls and without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the media application includes (736) a plurality of sections (e.g., wherein the plurality of sections includes a section for displaying the media library, a For You section, an Albums section, and/or a search section (e.g., as described with reference to FIG. 5K). In some embodiments, while displaying a first section of the plurality of sections of the media application, the computer system automatically (e.g., without additional user input) displays the first shared media item in the first section of the plurality of sections of the media application. For example, the plurality of sections includes a For You section (e.g., that is automatically generated and/or curated from media items in the media library and/or shared media items not in the media library). In some embodiments, the first section is the "For You" section, and the first section is divided into one or more subsections. In some embodiments, the one or more subsections includes a "Memories" subsection. In some embodiments, the one or more subsections includes a "Shared With You" section, a "Featured Photos" section, and/or a section of suggested media to be shared with others. In some embodiments, the first section is a "Memories" section (e.g., a highlights section). In some embodiments, shared media item(s) are displayed in their own subsection (or section). For example, the "For You" section includes a "Shared With You" subsection that displays the plurality of shared media item(s) that have been shared (e.g., whether they have been added to the media library or not). For example, as described with reference to FIGS. 5N-5O, a first shared media item 517 is displayed in the "For You" section (e.g., and within the "Memories" subsection 550).

Automatically displaying shared media items within a distinct section of the media application provides the user with real-time visual feedback that the media item is a shared media item without requiring the user to navigate through complex menu hierarchies to obtain information about a particular media item to determine if it is a shared media item. Providing improved visual feedback to the user without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, in response to a user input requesting to display the plurality of shared media items, the computer system displays (738) the set of one or more (shared) media items that have not been added to the media library. In some embodiments, the user input requesting to display the plurality of shared media items is a user input selecting the first section (or an option to expand the first section). For example, as described with reference to FIGS. 5N-5P, user input 560 on "See All" option 558 causes the device 100 to display "Shared With You" user interface. In some embodiments, the computer system only displays unsaved shared photos (e.g., as described with reference to toggle switch 590, FIGS. 5V-5X) without displaying shared photos that have been saved to the media library (e.g., or photos that are not shared that are saved in the media library).

Providing a control option that, when selected, displays all of the shared media items in a same user interface improves the user experience by providing visual feedback that organizes the shared media items in a distinct user interface (e.g., or a distinct portion of the user interface). Providing improved visual feedback to the user without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the set of one or more (shared) media items that have not been added to the media library that are displayed in response to the user input requesting to display the plurality of shared media items are displayed (740) without a visually distinguished appearance. For example, sharing indication 562 (e.g., shown in FIG. 5P) is optionally not displayed on the shared media items in the "Shared With You" user interface.

Displaying shared media items, in response to a user input to specially display shared media items, without applying visual effects to the displayed shared media items avoids cluttering the user interface with sharing indicators that may not be useful to the user when all the displayed media items are shared media items, and avoids distracting the user with information that may not be useful in the context of displaying only shared media items. Performing an operation (e.g., automatically) when a set of conditions has been met, and providing improved visual feedback to the user, without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, in response to the user input requesting to display the plurality of shared media items, the computer system displays (742) the plurality of shared media items, including the set of the one or more media items that have not been added to the media library and a set of one or more (shared) media items that have been added to the media library. For example, as described with reference to FIG. 5X, photo 517 has been added to the media library and device 100 continues to display photo 517 concurrently with photos 527, 526, and 563 that have not been added to the media library in the "Shared With You" user interface.

Providing a control option that, when selected, displays all of the shared media items concurrently, regardless of whether the shared media item has already been saved to the media library, in a same user interface improves the user experience by providing visual feedback that allows the user to view all (e.g., or at least a subset, less than all) of the media items that were shared with the user, even after the user has saved one or more of the shared media items to the media library. Providing improved visual feedback to the user without requiring further user input enhances the operability of the system and makes the user-device interface more efficient (e.g., by helping the user to achieve an intended result and reducing user mistakes when operating/ interacting with the system), which, additionally, reduces power usage and improves battery life of the device by enabling the user to use the device more quickly and efficiently.

In some embodiments, media items in the set of the one or more media items that have not been added to the media library are visually distinguished (744) from media items in the set of one or more media items that have been added to the media library based on a visual feature that is separate from content of the media items. For example, as illustrated in FIG. 5X, photo 517 (e.g., that has been added to the media library) is displayed without a sharing indication, while photos 527, 526, and 563 are displayed with a sharing indication (e.g., the graphical element displayed in the bottom left corner of each photo).

Displaying shared media items that have not been saved to the media library with a different visual effect than the shared media items that have already been saved to the media library makes it easy for the user to see which media items have not yet been saved the user's media library, which improves the visual feedback to the user such that the user may easily select items to be saved to the media library. Performing an operation (e.g., automatically) when a set of conditions has been met, and providing improved visual feedback to the user, without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the display criteria include (746) relevance criteria. For example, in some embodiments, the relevance criteria is based on a plurality of factors, such as two or more of: an age of the media item (e.g., recency criteria indicating how recently the media item was captured and/or shared), location criteria, and a user identification criteria. For example, as described with reference to FIGS. 5X-5AB, photo 563 in not initially displayed in the "All Photos" view (e.g., of FIG. 5K), because photo 563 does not meet relevance criteria.

Automatically selecting a set of media items that satisfy relevance criteria improves the user experience and provides improved visual feedback to the user by displaying, for the user, only those media items that are likely to be relevant the user. Performing an operation (e.g., automatically) when a set of conditions has been met, and providing improved visual feedback to the user, without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the display criteria include (748) location criteria indicating that a user of the computer system was located at a same location corresponding to the shared media item. For example, the location criteria is based on whether the user was at the same location (e.g., at the same time, or within a predetermined time window) at which the media item was captured. For example, the location criteria may be based on device location data for a device associated with the user or based on whether the user has photos in their photo library from that location. In some embodiments, a predetermined time window (e.g., 1 hour, 2 hours, 1 day, etc.) is used to compare when the photo was taken as compared to the location of the user (or a device associated with the user) to determine whether there is overlap (e.g., that the user was at the location). For example, as illustrated in FIG. 5Y, photo 563 was taken in "London, England" and thus does not meet display criteria (e.g., wherein the user of the device (e.g., at the time the photo was taken) is located at a different location (e.g., in California)).

Automatically selecting a set of media items that satisfy location criteria improves the user experience and provides improved visual feedback to the user by displaying, for the user, only those media items that were taken or shared at a location that is associated with the user (e.g., because the user was at the location). Performing an operation (e.g., automatically) when a set of conditions has been met, and providing improved visual feedback to the user, without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently In some embodiments, the display criteria include (750) user identification criteria that indicates if a user of the computer system appears in the media item. For example, the user identification criteria indicates whether the user (e.g., the user of device 100) is captured in the media item (e.g., if the user is in the photo). In some embodiments, the display criteria include identification criteria that indicates if a particular person (e.g., a contact, such as Tom) or other identified being (e.g., a pet) is detected (e.g., appears) in the media item and/or in your photo library (e.g., a pet that is in your photo library is detected in the photo).

Automatically selecting a set of media items that satisfy criteria based on the user appearing within the media item improves the user experience and provides improved visual feedback to the user by displaying, for the user, only those media items that include the user within the media item. Performing an operation (e.g., automatically) when a set of conditions has been met, and providing improved visual feedback to the user, without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the computer system receives (752), by the first application, a request to delete a communication thread in which the first media item that has not been added to the media library was shared. In some embodiments, in response to receiving the request to delete the communication thread, the computer system forgoes displaying the first shared media item in the collection of media items (e.g., deleting the first shared media item from the collection of media items) when the collection of media items is displayed. For example, as described with reference to FIGS. 5AI-5AM, in response to deleting "BFF Group" message thread in the messaging application, the photos shared in "BFF Group" message thread are no longer displayed in the photos application. For example, in response to a request to display the portion of the collection of media items with which the first media item was displayed, the portion of the collection of media items with which the first media item was displayed is displayed without displaying a representation of the first media item. In some embodiments, if the first media item was already saved (e.g., added) to the media library, deleting the communication thread does not delete the first media item from the media library. For example, only unsaved shared media items are deleted from the collection of media items in response to deleting the communication thread in which the media item was shared.

Automatically deleting a media item that was shared via a communication thread in response to the communication thread being deleted improves the user experience and provides improved visual feedback to the user by no longer displaying the shared media item after the communication thread has been deleted, thereby indicating that the thread and the media item are no longer available to save to the media library. Additionally, automatically deleting the media item reduces the number of inputs required by the user by automatically removing the media item from display in the media application as well as from the communication application in response to deleting the communication thread that shared the media item within the communication application. Performing an operation (e.g., automatically) when a set of conditions has been met, and providing improved visual feedback to the user, without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently In some embodiments, the display criteria include (754) recency criteria to display media items that have been shared within a predetermined threshold amount of time. For example, the set of one or media items that have not been added to the media library meets display criteria in accordance with a determination that the set of one or more media items have been shared within the last 30 days (e.g., or within the last year, month, or other time period). In some embodiments, the predetermined threshold amount of time is based on a user-defined setting. For example, a user who agrees to use a photo sharing feature extends the predetermined threshold amount of time from 30 days to a year (or longer). In some embodiments, the predetermined threshold amount of time is measured from the date/time at which the user enabled a media sharing option.

Automatically including shared media items in the media application that were shared within a predetermined preceding time period without requiring the user to select or save the shared media items to be displayed in the media application improves the user experience and provides improved visual feedback to the user by automatically updating the media application to display shared media items. Performing an operation (e.g., automatically) when a set of conditions has been met, and providing improved visual feedback to the user, without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

It should be understood that the particular order in which the operations in FIGS. 7A-7E have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 800) are also applicable in an analogous manner to method 700 described above with respect to FIGS. 7A-7E. For example, the user interface objects described above with reference to method 700 optionally have one or more of the characteristics of the user interface objects described herein with reference to other methods described herein (e.g., method 800). For brevity, these details are not repeated here.

FIGS. 8A-8B are flow diagrams illustrating method 800 of displaying search results for media items in an application, including concurrently displaying media items saved in the application with shared media items that are received via a distinct application in accordance with some embodiments. Method 800 is performed at a computer system (e.g., device 300, FIG. 3, or portable multifunction device 100, FIG. 1A) that is in communication with a display generation component (e.g., a display) and one or more input devices. The computer system optionally includes (e.g., or is in communication with) a touch-sensitive surface, and optionally includes one or more sensors to detect intensity of contacts with the touch-sensitive surface. In some embodiments, the display generation component is a touch-screen display and the touch-sensitive surface is on or integrated with the display generation component. In some embodiments, the display generation component is separate from the touch-sensitive surface. Some operations in method 800 are, optionally, combined and/or the order of some operations is, optionally, changed.

As described herein, method 800 searches a media library to display media items that meet search criteria, including automatically displaying, in the search results, media items that are stored within the media library and media items that have been shared with the user but are not stored within the media library. Performing an operation (e.g., automatically) when a set of conditions has been met without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

The computer system receives (802), by a first application (e.g., a communication application such as a messaging application, a mail application, or a social media application), a plurality of shared media items. For example, as described with reference to FIGS. 5A-5I, the plurality of shared media items includes shared photos (e.g., received via a messaging application).

After receiving the plurality of shared media items, the computer system receives (804), via the one or more input devices, a request to search a media library of a second application that is different from the first application for media items in the media library that meet search criteria. In some embodiments, the request defines the search criteria; wherein the search criteria comprises one or more features of the media item, including: a person in the media item, a person who shared the media item, a place, an object in the media item. For example, in FIG. 6E, user input 610 requests to search for "Tom." For example, in some embodiments, the search criteria comprises a place (e.g., location), as described with reference to FIGS. 6K-6L.

In response to receiving the request to search the media library, the computer system concurrently displays (806), via the one or more display generation components, two or more media items that meet the search criteria. For example, as illustrated in FIG. 6F, the search results matching the user request (e.g., user input 610) to search for "Tom" is displayed.

The two or more media items include (808): one or more media items from the media library of the second application that meet the search criteria, and one or more of the shared media items that are not stored within the media library of the second application and that meet the search criteria. In some embodiments, the media items that are stored within the media library of the first application and the shared media items are displayed concurrently (e.g., as search results, displayed in response to the search request). For example, as illustrated in FIG. 6F, the search results include at least two sections, "Photos of Tom" which includes photo 531 (e.g., which is stored in the media library and is not a shared media item) and "Photos Shared by Tom" which includes photo 520 (e.g., which is a shared media item that is not stored in the media library). In some embodiments, a shared media item in the displayed search results is not stored within a media library of a second application (e.g., the photos application) and/or is not locally saved by the computer system in the second application.

In some embodiments, the request to search the media library comprises (810) a request to search for an individual (e.g., a request to search for "Tom") and the two or more media items include at least one media item including the individual and at least one media item shared by the individual, as illustrated in FIG. 6F. For example, the search results include photos shared by Tom in a message conversation with Tom, as described with reference to FIGS. 5A through 5D-1.

Automatically selecting a set of media items that satisfy search criteria based on the user, or other specified individual, appearing within the media item improves the user experience and provides improved visual feedback to the user by displaying within search results, for the user, only those media items that include the user, or other specified individual, within each of the media items. Performing an operation (e.g., automatically) when a set of conditions has been met, and providing improved visual feedback to the user, without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the search criteria are satisfied (812) by a message conversation and the two or more media items include one or more media items that have been shared in the message conversation. For example, the search may be satisfied by all or any messages in the message conversation, one or more participants in the message conversation, and/or a name/title/subject of the message conversation. In some embodiments, in accordance with a determination that a message conversation satisfies the search criteria, the computer system selects the entire communication thread for purposes of determining what shared media items to display in the search results (e.g., including media items shared by a user of the computer system and/or media items shared with (e.g., from another person) the user of the computer system). For example, as described with reference to FIGS. 6I-6J, a user requests to search for "#smile" and the message thread with Tom matches the search criteria (e.g., because "#smile" appears in the messages with Tom), so device 100 displays at least one search result (e.g., photo 517) that was shared in the messages with Tom.

Automatically selecting a set of media items that satisfy search criteria based on the whether a media item had been shared within a particular conversation improves the user experience and provides improved visual feedback to the user by displaying within search results, for the user, only those media items that satisfy the search criteria, and enables the user to easily navigate to media items that were shared in the conversation that satisfies the search criteria. Performing an operation (e.g., automatically) when a set of conditions has been met, and providing improved visual feedback to the user, without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the computer system displays (814) a first user-selectable option that, when selected, filters the concurrently displayed two or more media items to only display one or more of the plurality of shared media items that were shared by a first user-specified individual. In some embodiments, in response to detecting selection of the first user-selectable option, the computer system displays the one or more of the plurality of shared media items that were shared by the first user-specified individual without displaying other media items associated with the first user-specified individual (e.g., without displaying one or more media items that include the individual within the media item, but were not shared by individual). In some embodiments, the search criteria includes an identifier of an individual and the first user-selectable option further filters the results to only display the shared media items that were received from (e.g., shared by) the individual when the first user-selectable option is selected. For example, as described with reference to FIGS. 6F-6H, the user is able to filter the search results using buttons 614, 616 and 618 to cause the device to switch between display of Photos of Tom, Photos Shared by Tom, or both.

Providing a control option that allows a user to filter search results according to media items that were shared by a particular individual provides improved visual feedback to the user that indicates which media items, within the search results, were shared by the particular individual versus media items that are otherwise associated with the particular individual and provides additional control options to the user without needing to navigate through complex menu hierarchies. Providing improved visual feedback to the user, and (e.g., automatically) providing additional control options without cluttering the user interface with additional displayed controls and without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the computer system displays (816) a second user-selectable option that, when selected, filters the concurrently displayed two or more media items to display one or more media items that include a second user-specified individual within the media item. In some embodiments, in response to detecting selection of the second user-selectable option, the computer system displays one or more media items that include the second user-specified individual within the media item without displaying other media items associated with the second user-specified individual (e.g., without displaying media items that were shared by the individual, but that do not include the individual within the media items). For example, as described with reference to FIGS. 6F-6H, the user is able to filter the search results using buttons 614, 616 and 618 to cause the device to switch between display of Photos of Tom, Photos Shared by Tom, or both.

Providing a control option that allows a user to filter search results according to media items that include a particular individual within the media item provides improved visual feedback to the user by only showing media items that include the particular individual without displaying media items that are otherwise associated with the particular individual but do not include the particular individual within the media item, and provides additional control options to the user without needing to navigate through complex menu hierarchies. Providing improved visual feedback to the user, and (e.g., automatically) providing additional control options without cluttering the user interface with additional displayed controls and without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the computer system displays (818) a third user-selectable option that, when selected, filters the concurrently displayed two or more media items to display one or more of the plurality of shared media items that were shared within one or more groups that include a third user-specified individual. In some embodiments, in response to detecting selection of the third user-selectable option, the computer system displays one or more of the plurality of shared media items that were shared by one or more groups (e.g., in a group communication thread) that include the third user-specified individual. For example, as illustrated in FIG. 6D, a "Group Sharing" portion of the Search user interface is provided. In some embodiments, the "Group Sharing" portion of the Search user interface includes representations of one or more groups that have shared media items (e.g., BFF Group, Family Group). In some embodiments, in response to a user selecting a group of the one or more groups, the computer system displays search results that include media items shared in the selected group. In some embodiments, the user provides an identifier of a group as search criteria, as described with reference to FIGS. 6O-6P. In some embodiments, the first user-selectable option, the second user-selectable option, and/or the third user-selectable option are concurrently displayed (e.g., the user can filter the search results using any of the user-selectable options). In some embodiments, one or more of the user-selectable options may be selected concurrently such that the user can filter the search results to display any combination of (i) the one or more of the plurality of shared media items that were shared by the first user-specified individual (ii) one or more media items that include the second user-specified individual within the media item and (iii) one or more of the plurality of shared media items that were shared by one or more groups that include the third user-specified individual. In some embodiments, the first, second and third user-specified individual are the same individual. In some embodiments, the first, second, and/or third user-selectable options are displayed concurrently with the search results. In some embodiments, the first, second, and/or third user-selectable options are displayed in response to receiving the search input (e.g., and a request to search).

Providing a control option that allows a user to filter search results according to media items that were shared in a group communication, where the group includes a particular individual, provides improved visual feedback to the user by only showing media items that were shared by the group, and provides additional control options to the user without needing to navigate through complex menu hierarchies. Providing improved visual feedback to the user, and (e.g., automatically) providing additional control options without cluttering the user interface with additional displayed controls and without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

It should be understood that the particular order in which the operations in FIGS. 8A-8B have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 700) are also applicable in an analogous manner to method 800 described above with respect to FIGS. 8A-8B. For example, the user interface objects described above with reference to method 700 optionally have one or more of the characteristics of the user interface objects described herein with reference to other methods described herein (e.g., method 700). For brevity, these details are not repeated here.

The operations described above with reference to FIGS. 7A-7E and 8A-8B are, optionally, implemented by components depicted in FIGS. 1A-1B. For example, receiving operation 704, displaying operation 708, receiving operation 802, and displaying operation 806 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
    at a computer system that is in communication with a display generation component and one or more input devices:
        receiving, by a first application, a plurality of shared media items;
        after receiving the plurality of shared media items, receiving, via the one or more input devices, a request to display a view of a media application wherein the media application includes a media library that includes a first plurality of media items, and the plurality of shared media items includes a set of one or more media items that have not been added to the media library; and
        in response to receiving the request to display the view of the media application, displaying, via the display generation component, a collection of media items in the media application that are selected based on first criteria, wherein displaying the collection of media items includes:
            displaying a second plurality of media items selected from the media library based on the first criteria; and
            in accordance with a determination that a first shared media item from the set of one or more media items that have not been added to the media library meets display criteria, the display criteria including the first criteria, displaying the first shared media item in the collection of media items concurrently with the second plurality of media items, wherein the first shared media item is visually distinguished from the second plurality of media items based on a visual feature that is separate from content of the first shared media item.

2. The method of claim 1, wherein displaying the collection of media items includes, in accordance with a determination that a second shared media item from the set of one or media items that have not been added to the media library meets the first criteria, displaying the second shared media item in the collection of media items concurrently with the second plurality of media items, wherein the second shared media item is visually distinguished from the second plurality of media items based on the visual feature that is separate from content of the second shared media item.

3. The method of claim 1, wherein displaying the first shared media item that is visually distinguished from the second plurality of media items comprises displaying the first shared media item with changed appearance of at least a portion of a border region of the first shared media item.

4. The method of claim 1, wherein displaying the first shared media item that is visually distinguished from the second plurality of media items comprises displaying the first shared media item with a content obscuring effect applied to at least a portion of the first shared media item.

5. The method of claim 1, wherein displaying the first shared media item that is visually distinguished from the second plurality of media items comprises displaying the first shared media item with a graphical element that is overlaid on at least a portion of the first shared media item.

6. The method of claim 1, further comprising,
receiving a sequence of one or more user inputs including a user input selecting a media item in the displayed collection of media items; and
in response to receiving the sequence of one or more user inputs, displaying an enlarged representation of the selected media item and a plurality of controls for performing operations associated with the selected media item, wherein:
in accordance with a determination that the selected media item is a media item in the second plurality of media items selected from the media library, the plurality of controls displayed with the enlarged representation of the selected media item include a first set of controls; and
in accordance with a determination that the selected media item is a shared media item from the set of one or more media items that have not been added to the media library, the plurality of controls displayed with the enlarged representation of the selected media item include a second set of controls distinct from the first set of controls.

7. The method of claim 6, wherein the first set of controls includes a control for marking the selected media item as a favorite and/or a control for deleting the selected media item.

8. The method of claim 6, wherein the second set of controls includes an indication that the selected media item is a shared media item.

9. The method of claim 6, wherein the second set of controls includes a control for adding the selected media item to the media library.

10. The method of claim 9, further comprising:
while displaying the enlarged representation of the selected media item and the plurality of controls for interacting with the selected media item, receiving an input selecting the control for adding the selected media item to the media library; and
in response to receiving the input selecting the control for adding the selected media item to the media library: adding the selected media item to the media library.

11. The method of claim 10, including, in response to receiving the input selecting the control for adding the selected media item to the media library,
ceasing to display one or more controls for performing operations associated with the selected media item that were displayed prior to receiving the input selecting the control for adding the selected media item to the media library.

12. The method of claim 10, including, in response to receiving the input selecting the control for adding the selected media item to the media library, ceasing display of the control for adding the selected media item to the media library.

13. The method of claim 10, including, in response to receiving the input selecting the control for adding the selected media item to the media library,
displaying one or more controls for performing operations associated with the selected media item in the media library that were not displayed prior to receiving the input selecting the control for adding the selected media item to the media library.

14. The method of claim 6, including displaying, concurrently with the enlarged representation of the selected media item, information about a source of the selected media item.

15. The method of claim 14, including:
while concurrently displaying the enlarged representation of the selected media item and the information about a source of the selected media item, detecting an input directed to a selectable user interface object that includes the information about the source of the selected media item; and
in response to detecting an input directed to the selectable user interface object that includes the information about the source of the selected media item, initiating a process for displaying, in the first application, a communication history for a conversation in which the selected media item was shared.

16. The method of claim 1, wherein:
the media application includes a plurality of sections; and
the method further comprises, while displaying a first section of the plurality of sections of the media application, automatically displaying the first shared media item in the first section of the plurality of sections of the media application.

17. The method of claim 1, further comprising, in response to a user input requesting to display the plurality of shared media items, displaying the set of one or more media items that have not been added to the media library.

18. The method of claim 17, wherein the set of one or more media items that have not been added to the media library that are displayed in response to the user input requesting to display the plurality of shared media items, are displayed without a visually distinguished appearance.

19. The method of claim 17, further comprising, in response to the user input requesting to display the plurality of shared media items, displaying the plurality of shared media items, including the set of the one or more media items that have not been added to the media library and a set of one or more media items that have been added to the media library.

20. The method of claim 19, wherein media items in the set of the one or more media items that have not been added to the media library are visually distinguished from media items in the set of one or more media items that have been added to the media library based on a visual feature that is separate from content of the media items.

21. The method of claim 1, wherein the display criteria include one or more of the criteria selected from the group consisting of relevance criteria, location criteria indicating that a user of the computer system was located at a same location corresponding to the first shared media item, user identification criteria that indicates if a user of the computer system appears in the first shared media item, and recency criteria to display media items that have been shared within a predetermined threshold amount of time.

22. The method of claim 1, further comprising:
receiving, by the first application, a request to delete a communication thread in which the first shared media item that has not been added to the media library was shared; and
in response to receiving the request to delete the communication thread, forgoing display of the first shared media item in the collection of media items when the collection of media items is displayed.

23. A computer system, comprising:
a display generation component;
one or more input devices;
one or more processors; and
memory storing one or more programs, wherein the one or more programs are configured to be executed by the one or more processors, the one or more programs including instructions for:
receiving, by a first application, a plurality of shared media items;
after receiving the plurality of shared media items, receiving, via the one or more input devices, a request to display a view of a media application wherein the media application includes a media library that includes a first plurality of media items, and the plurality of shared media items includes a set of one or more media items that have not been added to the media library; and
in response to receiving the request to display the view of the media application, displaying, via the display generation component, a collection of media items in the media application that are selected based on first criteria, wherein displaying the collection of media items includes:
displaying a second plurality of media items selected from the media library based on the first criteria; and
in accordance with a determination that a first shared media item from the set of one or more media items that have not been added to the media library meets display criteria, the display criteria including the first criteria, displaying the first shared media item in the collection of media items concurrently with the second plurality of media items, wherein the first shared media item is visually distinguished from the second plurality of media items based on a visual feature that is separate from content of the first shared media item.

24. A non-transitory computer readable storage medium storing one or more programs, the one or more programs comprising instructions, which, when executed by a computer system with a display generation component and one or more input devices, cause the computer system to:
receive by a first application, a plurality of shared media items;
after receiving the plurality of shared media items, receive, via the one or more input devices, a request to display a view of a media application wherein the media application includes a media library that includes a first plurality of media items, and the plurality of shared media items includes a set of one or more media items that have not been added to the media library; and
in response to receiving the request to display the view of the media application, display, via the display generation component, a collection of media items in the media application that are selected based on first criteria, wherein displaying the collection of media items includes:
displaying a second plurality of media items selected from the media library based on the first criteria; and
in accordance with a determination that a first shared media item from the set of one or more media items that have not been added to the media library meets display criteria, the display criteria including the first criteria, displaying the first shared media item in the collection of media items concurrently with the second plurality of media items, wherein the first shared media item is visually distinguished from the second plurality of media items based on a visual feature that is separate from content of the first shared media item.

25. The computer system of claim 23, wherein displaying the collection of media items includes, in accordance with a determination that a second shared media item from the set of one or media items that have not been added to the media library meets the first criteria, displaying the second shared media item in the collection of media items concurrently with the second plurality of media items, wherein the second shared media item is visually distinguished from the second plurality of media items based on the visual feature that is separate from content of the second shared media item.

26. The computer system of claim 23, wherein displaying the first shared media item that is visually distinguished from the second plurality of media items comprises displaying the first shared media item with changed appearance of at least a portion of a border region of the first shared media item.

27. The computer system of claim 23, wherein displaying the first shared media item that is visually distinguished from the second plurality of media items comprises displaying the first shared media item with a content obscuring effect applied to at least a portion of the first shared media item.

28. The computer system of claim 23, wherein displaying the first shared media item that is visually distinguished from the second plurality of media items comprises displaying the first shared media item with a graphical element that is overlaid on at least a portion of the first shared media item.

29. The computer system of claim 23, wherein the one or more programs include instructions for:
receiving a sequence of one or more user inputs including a user input selecting a media item in the displayed collection of media items; and
in response to receiving the sequence of one or more user inputs, displaying an enlarged representation of the selected media item and a plurality of controls for performing operations associated with the selected media item, wherein:
in accordance with a determination that the selected media item is a media item in the second plurality of media items selected from the media library, the plurality of controls displayed with the enlarged representation of the selected media item include a first set of controls; and in accordance with a determination that the selected media item is a shared media item from the set of one or more media items that have not been added to the media library, the plurality of controls displayed with the enlarged representation of the selected media item include a second set of controls distinct from the first set of controls.

30. The computer system of claim 29, wherein the second set of controls includes an indication that the selected media item is a shared media item.

31. The computer system of claim 29, wherein the second set of controls includes a control for adding the selected media item to the media library.

32. The computer system of claim 31, wherein the one or more programs include instructions for:

while displaying the enlarged representation of the selected media item and the plurality of controls for interacting with the selected media item, receiving an input selecting the control for adding the selected media item to the media library; and in response to receiving the input selecting the control for adding the selected media item to the media library:

adding the selected media item to the media library.

33. The computer system of claim 32, wherein the one or more programs include instructions for:

in response to receiving the input selecting the control for adding the selected media item to the media library, ceasing to display one or more controls for performing operations associated with the selected media item that were displayed prior to receiving the input selecting the control for adding the selected media item to the media library.

34. The computer system of claim 32, wherein the one or more programs include instructions for:

in response to receiving the input selecting the control for adding the selected media item to the media library, displaying one or more controls for performing operations associated with the selected media item in the media library that were not displayed prior to receiving the input selecting the control for adding the selected media item to the media library.

35. The computer system of claim 29, wherein the one or more programs include instructions for displaying, concurrently with the enlarged representation of the selected media item, information about a source of the selected media item.

36. The computer system of claim 35, wherein the one or more programs include instructions for:

while concurrently displaying the enlarged representation of the selected media item and the information about a source of the selected media item, detecting an input directed to a selectable user interface object that includes the information about the source of the selected media item; and in response to detecting an input directed to the selectable user interface object that includes the information about the source of the selected media item, initiating a process for displaying, in the first application, a communication history for a conversation in which the selected media item was shared.

37. The computer system of claim 23, wherein:
the media application includes a plurality of sections; and
the one or more programs include instructions for:

while displaying a first section of the plurality of sections of the media application, automatically displaying the first shared media item in the first section of the plurality of sections of the media application.

38. The computer system of claim 23, wherein the one or more programs include instructions for: in response to a user input requesting to display the plurality of shared media items, displaying the set of one or more media items that have not been added to the media library.

39. The computer system of claim 38, wherein the set of one or more media items that have not been added to the media library that are displayed in response to the user input requesting to display the plurality of shared media items, are displayed without a visually distinguished appearance.

40. The computer system of claim 23, wherein the display criteria include one or more of the criteria selected from the group consisting of relevance criteria, location criteria indicating that a user of the computer system was located at a same location corresponding to the first shared media item, user identification criteria that indicates if a user of the computer system appears in the first shared media item, and recency criteria to display media items that have been shared within a predetermined threshold amount of time.

41. The computer system of claim 23, wherein the one or more programs include instructions for:

receiving, by the first application, a request to delete a communication thread in which the first shared media item that has not been added to the media library was shared; and in response to receiving the request to delete the communication thread, forgoing display of the first shared media item in the collection of media items when the collection of media items is displayed.

42. The non-transitory computer readable storage medium of claim 24, wherein displaying the collection of media items includes, in accordance with a determination that a second shared media item from the set of one or media items that have not been added to the media library meets the first criteria, displaying the second shared media item in the collection of media items concurrently with the second plurality of media items, wherein the second shared media item is visually distinguished from the second plurality of media items based on the visual feature that is separate from content of the second shared media item.

43. The non-transitory computer readable storage medium of claim 24, wherein displaying the first shared media item that is visually distinguished from the second plurality of media items comprises displaying the first shared media item with changed appearance of at least a portion of a border region of the first shared media item.

44. The non-transitory computer readable storage medium of claim 24, wherein displaying the first shared media item that is visually distinguished from the second plurality of media items comprises displaying the first shared media item with a content obscuring effect applied to at least a portion of the first shared media item.

45. The non-transitory computer readable storage medium of claim 24, wherein displaying the first shared media item that is visually distinguished from the second plurality of media items comprises displaying the first shared media item with a graphical element that is overlaid on at least a portion of the first shared media item.

46. The non-transitory computer readable storage medium of claim 24, wherein the one or more programs include instructions that, when executed by the computer system, cause the computer system to:

receive a sequence of one or more user inputs including a user input selecting a media item in the displayed collection of media items; and in response to receiving the sequence of one or more user inputs, display an enlarged representation of the selected media item and a plurality of controls for performing operations associated with the selected media item, wherein:

in accordance with a determination that the selected media item is a media item in the second plurality of media items selected from the media library, the plurality of controls displayed with the enlarged representation of the selected media item include a first set of controls; and in accordance with a determination that the selected media item is a shared media item from the set of one or more media items that have not been added to the media library, the plurality of controls displayed with the enlarged representation of the selected media item include a second set of controls distinct from the first set of controls.

47. The computer system of claim 46, wherein the second set of controls includes an indication that the selected media item is a shared media item.

48. The computer system of claim 46, wherein the second set of controls includes a control for adding the selected media item to the media library.

49. The computer system of claim 48, wherein the one or more programs include instructions that, when executed by the computer system, cause the computer system to:

while displaying the enlarged representation of the selected media item and the plurality of controls for interacting with the selected media item, receive an input selecting the control for adding the selected media item to the media library; and in response to receiving the input selecting the control for adding the selected media item to the media library: add the selected media item to the media library.

50. The computer system of claim 49, wherein the one or more programs include instructions that, when executed by the computer system, cause the computer system to:

in response to receiving the input selecting the control for adding the selected media item to the media library:

cease to display one or more controls for performing operations associated with the selected media item that were displayed prior to receiving the input selecting the control for adding the selected media item to the media library.

51. The computer system of claim 49, wherein the one or more programs include instructions that, when executed by the computer system, cause the computer system to:

in response to receiving the input selecting the control for adding the selected media item to the media library:

display one or more controls for performing operations associated with the selected media item in the media library that were not displayed prior to receiving the input selecting the control for adding the selected media item to the media library.

52. The computer system of claim 46, wherein the one or more programs include instructions that, when executed by the computer system, cause the computer system to:

display, concurrently with the enlarged representation of the selected media item, information about a source of the selected media item.

53. The computer system of claim 52, wherein the one or more programs include instructions that, when executed by the computer system, cause the computer system to:

while concurrently displaying the enlarged representation of the selected media item and the information about a source of the selected media item, detect an input directed to a selectable user interface object that includes the information about the source of the selected media item; and in response to detecting an input directed to the selectable user interface object that includes the information about the source of the selected media item, initiate a process for displaying, in the first application, a communication history for a conversation in which the selected media item was shared.

54. The non-transitory computer readable storage medium of claim 24, wherein:

the media application includes a plurality of sections; and
the one or more programs include instructions that, when executed by the computer system, cause the computer system to:

while displaying a first section of the plurality of sections of the media application, automatically display the first shared media item in the first section of the plurality of sections of the media application.

55. The non-transitory computer readable storage medium of claim 24, wherein the one or more programs include instructions that, when executed by the computer system, cause the computer system to: in response to a user input requesting to display the plurality of shared media items, display the set of one or more media items that have not been added to the media library.

56. The computer system of claim 55, wherein the set of one or more media items that have not been added to the media library that are displayed in response to the user input requesting to display the plurality of shared media items, are displayed without a visually distinguished appearance.

57. The non-transitory computer readable storage medium of claim 24, wherein the display criteria include one or more of the criteria selected from the group consisting of relevance criteria, location criteria indicating that a user of the computer system was located at a same location corresponding to the first shared media item, user identification criteria that indicates if a user of the computer system appears in the first shared media item, and recency criteria to display media items that have been shared within a predetermined threshold amount of time.

58. The non-transitory computer readable storage medium of claim 24, wherein the one or more programs include instructions that, when executed by the computer system, cause the computer system to:

receive, by the first application, a request to delete a communication thread in which the first shared media item that has not been added to the media library was shared; and in response to receiving the request to delete the communication thread, forgo display of the first shared media item in the collection of media items when the collection of media items is displayed.

* * * * *

UNITED STATES PATENT AND TRADEMARK OFFICE
CERTIFICATE OF CORRECTION

PATENT NO. : 11,875,016 B2
APPLICATION NO. : 17/745788
DATED : January 16, 2024
INVENTOR(S) : Ryan et al.

It is certified that error appears in the above-identified patent and that said Letters Patent is hereby corrected as shown below:

In the Specification

Column 26, Line 23, please delete "FIG. 3A" and insert -- FIG. 3 --.

Signed and Sealed this
Tenth Day of September, 2024

Katherine Kelly Vidal
*Director of the United States Patent and Trademark Office*